(12) United States Patent
Wood et al.

(10) Patent No.: US 11,668,236 B2
(45) Date of Patent: *Jun. 6, 2023

(54) ACOUSTIC LINERS WITH LOW-FREQUENCY SOUND WAVE ATTENUATING FEATURES

(71) Applicant: General Electric Company, Schenectady, NY (US)

(72) Inventors: Trevor Howard Wood, Clifton Park, NY (US); Nikolai N. Pastouchenko, Glenville, NY (US); Kishore Ramakrishnan, Rexford, NY (US); Timothy Richard DePuy, Liberty Township, OH (US); Wendy Wenling Lin, Montgomery, OH (US); Robert William Davidoff, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 396 days.

This patent is subject to a terminal disclaimer.

(21) Appl. No.: 16/938,150

(22) Filed: Jul. 24, 2020

(65) Prior Publication Data

US 2022/0025814 A1    Jan. 27, 2022

(51) Int. Cl.
*F02C 7/045* (2006.01)
*F02K 1/82* (2006.01)
(Continued)

(52) U.S. Cl.
CPC ............ *F02C 7/045* (2013.01); *B32B 3/12* (2013.01); *F02K 1/827* (2013.01); *G10K 11/172* (2013.01); *F05D 2250/282* (2013.01)

(58) Field of Classification Search
CPC ......... B32B 3/12; F02K 1/827; G10K 11/172; F05D 2250/282
See application file for complete search history.

(56) References Cited

U.S. PATENT DOCUMENTS 3,035,657 A    5/1962   Lemon
3,070,198 A    12/1962  Haskell
(Continued)

FOREIGN PATENT DOCUMENTS

EP    0405581 B1    10/1993
EP    0839101 B1    5/1998
(Continued)

OTHER PUBLICATIONS

Bertolucci, An Experimental Investigation of the Grazing Flow Impedance Duct at the University of Florida for Acoustic Liner Applications, University of Florida Dissertation, 2012, 217 Pages.
(Continued)

*Primary Examiner* — Forrest M Phillips
(74) *Attorney, Agent, or Firm* — McGarry Bair PC

(57) ABSTRACT

An acoustic core includes an array of resonant cells. The array may include a plurality of coupled resonant cells respectively defining an antecedent resonant space and a subsequent resonant space, with at least one cell wall having one or more wall-apertures defining a pathway between the antecedent resonant space and the subsequent resonant space. The array may include a plurality of high-frequency resonant cells respectively defining a high-frequency resonant space and being matched with respective ones of the plurality of coupled resonant cells. A cross-sectional dimension of the one or more wall-apertures defining the pathway between the antecedent resonant space and the subsequent resonant space may be less than a cross-sectional dimension of the antecedent resonant space and/or a cross-sectional dimension of the subsequent resonant space. The array may include a plurality of partitioned resonant cells that have a partition integrally formed with at least one of a corresponding one or more cell walls and transecting the corresponding resonant space with at least one surface of the partition (Continued)

having an interface angle that is oblique or perpendicular relative to a plane parallel to a top face and/or a bottom face of the array of resonant cells.

20 Claims, 26 Drawing Sheets

(51) Int. Cl.
  *B32B 3/12* (2006.01)
  *G10K 11/172* (2006.01)

(56) References Cited

U.S. PATENT DOCUMENTS

| | | | |
|---|---|---|---|
| 3,232,371 A | 2/1966 | Reichert et al. | |
| 3,734,234 A | 5/1973 | Wirt | |
| 3,803,754 A | 4/1974 | Fischer | |
| 3,819,009 A | 6/1974 | Mot | |
| 3,831,710 A | 8/1974 | Wirt | |
| 3,850,261 A | 11/1974 | Hehmann et al. | |
| 3,905,443 A | 9/1975 | Sieuzac | |
| 3,913,702 A | 10/1975 | Wirt et al. | |
| 4,001,473 A | 1/1977 | Cook | |
| 4,035,535 A | 7/1977 | Taylor | |
| 4,074,496 A | 2/1978 | Fischer | |
| 4,141,433 A | 2/1979 | Warnaka | |
| 4,243,117 A | 1/1981 | Warnaka | |
| 4,265,955 A | 5/1981 | Harp et al. | |
| 4,291,080 A | 9/1981 | Ely et al. | |
| 4,298,090 A | 11/1981 | Chapman | |
| 4,339,018 A | 7/1982 | Warnaka | |
| 4,551,110 A | 11/1985 | Selvage et al. | |
| 4,676,762 A | 6/1987 | Ballard | |
| 5,353,502 A | 10/1994 | Hattori et al. | |
| 5,445,861 A | 8/1995 | Newton et al. | |
| 5,480,729 A | 1/1996 | Hattori et al. | |
| 5,690,035 A | 11/1997 | Hatayama et al. | |
| 5,959,264 A | 9/1999 | Brück et al. | |
| 6,182,787 B1 | 2/2001 | Kraft et al. | |
| 6,200,664 B1 | 3/2001 | Figge et al. | |
| 6,203,656 B1 | 3/2001 | Syed | |
| 6,206,136 B1 | 3/2001 | Swindlehurst et al. | |
| 6,209,679 B1 | 4/2001 | Hogeboom et al. | |
| 6,256,959 B1 | 7/2001 | Palmersten | |
| 6,630,093 B1 | 10/2003 | Jones | |
| 6,772,857 B2 | 8/2004 | Porte et al. | |
| 6,840,349 B2 | 1/2005 | Andre et al. | |
| 6,871,725 B2 | 3/2005 | Johnson | |
| 6,884,486 B2 | 4/2005 | Estrin et al. | |
| 6,913,570 B2 | 7/2005 | Kehrle | |
| 7,410,455 B2 | 8/2008 | Akishev et al. | |
| 7,484,592 B2 | 2/2009 | Porte et al. | |
| 7,510,052 B2 | 3/2009 | Ayle | |
| 7,866,377 B2 | 1/2011 | Slaughter | |
| 7,906,205 B2 | 3/2011 | Meres | |
| 7,921,966 B2 | 4/2011 | Chiou et al. | |
| 7,935,205 B2 | 5/2011 | Bogue et al. | |
| 7,954,224 B2 | 6/2011 | Douglas | |
| 7,963,362 B2 | 6/2011 | Lidoine | |
| 7,967,108 B2 | 6/2011 | Harper | |
| 7,971,684 B2 | 7/2011 | Gantie et al. | |
| 8,016,230 B2 | 9/2011 | Fogarty et al. | |
| 8,047,326 B2 | 11/2011 | Valleroy et al. | |
| 8,464,831 B2 | 6/2013 | Olander Burak et al. | |
| 8,579,076 B2 | 11/2013 | Ayle et al. | |
| 8,689,936 B2 | 4/2014 | Richter | |
| 8,784,592 B2 | 7/2014 | Kolax et al. | |
| 8,789,652 B2 | 7/2014 | Swallowe et al. | |
| 8,905,189 B2 | 12/2014 | Ayle et al. | |
| 8,985,513 B2 | 3/2015 | Dean et al. | |
| 8,997,923 B2 | 4/2015 | Ichihashi | |
| 9,175,474 B2 | 11/2015 | May et al. | |
| 9,222,229 B1 | 12/2015 | Chang et al. | |
| 9,284,726 B2 | 3/2016 | Tien | |
| 9,290,274 B2 | 3/2016 | Roach et al. | |
| 9,296,044 B2 | 3/2016 | Douglas | |
| 9,302,869 B2 | 4/2016 | Kendrick et al. | |
| 9,365,022 B2 | 6/2016 | Kendrick et al. | |
| 9,378,721 B2 | 6/2016 | Zalewski et al. | |
| 9,514,734 B1 | 12/2016 | Jones et al. | |
| 9,546,602 B2 | 1/2017 | Julliard et al. | |
| 9,607,600 B2 | 3/2017 | Swallowe et al. | |
| 9,693,166 B2 | 6/2017 | Herrera et al. | |
| 9,752,595 B2 * | 9/2017 | Alonso-Miralles | F04D 29/522 |
| 9,759,447 B1 | 9/2017 | Mathur | |
| 9,909,471 B2 | 3/2018 | Mattia | |
| 9,978,354 B2 | 5/2018 | Nampy | |
| 10,032,445 B1 | 7/2018 | Linch et al. | |
| 10,040,535 B2 * | 8/2018 | Futatsugi | G10K 11/172 |
| 10,107,139 B1 | 10/2018 | Jones et al. | |
| 10,174,675 B2 * | 1/2019 | Martinez | G10K 11/168 |
| 11,059,559 B2 * | 7/2021 | Cedar | E04B 1/86 |
| 11,348,565 B2 * | 5/2022 | Ravise | G10K 11/168 |
| 11,428,191 B1 * | 8/2022 | Alonso-Miralles | F02K 1/80 |
| 2004/0048027 A1 | 3/2004 | Hayes et al. | |
| 2010/0307867 A1 | 12/2010 | Ogawa et al. | |
| 2011/0100749 A1 | 5/2011 | Nonogi et al. | |
| 2011/0244213 A1 | 10/2011 | Jones | |
| 2013/0306402 A1 | 11/2013 | Todorovic | |
| 2014/0133964 A1 | 5/2014 | Ayle | |
| 2014/0251481 A1 | 9/2014 | Kroll et al. | |
| 2014/0305529 A1 | 10/2014 | Kroll et al. | |
| 2014/0341744 A1 | 11/2014 | Cazuc et al. | |
| 2015/0027629 A1 | 1/2015 | Butler et al. | |
| 2015/0044413 A1 | 2/2015 | Vauchel et al. | |
| 2015/0064015 A1 | 3/2015 | Perez | |
| 2015/0110603 A1 | 4/2015 | Biset et al. | |
| 2015/0292413 A1 | 10/2015 | Soria et al. | |
| 2015/0373470 A1 | 12/2015 | Herrera et al. | |
| 2016/0010863 A1 | 1/2016 | Ott et al. | |
| 2016/0017775 A1 | 1/2016 | Mattia | |
| 2016/0017810 A1 | 1/2016 | Lord et al. | |
| 2016/0067938 A1 | 3/2016 | Goodrich | |
| 2016/0109130 A1 | 4/2016 | Stastny et al. | |
| 2016/0123160 A1 | 5/2016 | Strock et al. | |
| 2016/0319690 A1 | 11/2016 | Lin et al. | |
| 2017/0043550 A1 | 2/2017 | Coïc et al. | |
| 2017/0045059 A1 | 2/2017 | Care et al. | |
| 2017/0072638 A1 | 3/2017 | Hayes et al. | |
| 2017/0191414 A1 | 7/2017 | Martinez et al. | |
| 2018/0016987 A1 | 1/2018 | Howarth et al. | |
| 2018/0162542 A1 | 6/2018 | VanDeMark et al. | |
| 2018/0174568 A1 | 6/2018 | Porte et al. | |
| 2018/0218723 A1 | 8/2018 | Lin et al. | |
| 2018/0245516 A1 | 8/2018 | Howarth et al. | |
| 2019/0080679 A1 | 3/2019 | Alstad | |
| 2019/0270504 A1 * | 9/2019 | Cedar | B64C 1/066 |
| 2020/0049068 A1 | 2/2020 | Lin et al. | |
| 2020/0109664 A1 | 4/2020 | Herman et al. | |
| 2020/0202830 A1 * | 6/2020 | Brossard | B32B 3/08 |

FOREIGN PATENT DOCUMENTS

| | | | |
|---|---|---|---|
| EP | 2960023 A1 | 12/2015 | |
| EP | 3232434 A1 | 10/2017 | |
| JP | S58156052 U | 10/1983 | |
| JP | H0333897 A | 2/1991 | |
| WO | WO2016/133501 A1 | 8/2016 | |
| WO | WO-2020174192 A1 * | 9/2020 | B29D 24/005 |

OTHER PUBLICATIONS

Bielak et al., Advanced Nacelle Acoustic Lining Concepts Development, NASA, CR-2002-211672, Aug. 2002, Total pp. 203.
Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.
Dannemann et al., Experimental Study of Advanced Helmholtz Resonator Liners with Increased Acoustic Performance by Utilising Material Damping Effects, Applied Sciences, 2018, 18 Pages.

(56) References Cited

OTHER PUBLICATIONS

Jones, et al., Evaluation of Parallel-Element, Variable-Impedance, Broadband Acoustic Liner Concepts, AIAA-2012-2194, Jun. 2012, 17 Pages.

Kraft et al., Acoustic Treatment Design Scaling Methods, vol. 2: Advanced Treatment Impedance Models for High Frequency Ranges, NASA, CR-1999-209120, vol. 2, 1999, Total pp. 98.

Lawn, Acoustic Pressure Losses in Woven Screen Regenerators, ResearchGate, Applied Acoustics, vol. 77, Mar. 2014, pp. 42-48.

Malmary et al., Acoustic Impedance Measurement with Grazing Flow, AIAA-2001-2193, $7^{th}$ AIAA/CEAS Aeroacoustics Conference, May 2001, Netherlands, 9 Pages.

Martinson, Mechanical Design for 3D Printing, Nov. 2012, 15 pages. http://eikimartinson.com/engineering/3dparts/#dovetail.

Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.

Nark et al., Acoustic Liner Overview, Acoustics Technical Working Group Meeting, Nasa Langley Research Center, Cleveland, Oct. 22-23, 2019, pp. 1-25.

Primus et al., ONERA-NASA Cooperative Effort on Liner Impedance Education, AIAA 2013-2273, Research Gate, $19^{th}$ AIAA/CEAS Aeroacoustics Conference, May 2013, Germany, 16 Pages.

Schiller et al., Experimental Evaluation of Acoustic Engine Liner Models Developed with COMSOL Multiphysics, $23^{rd}$ American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.

Sellen et al., Noise Reduction In a Flow Duct: Implementation of a Hybrid Passive/Active Solution, Science Direct, Journal of Sound and Vibration, vol. 297, 2006, pp. 492-511.

Soderman et al., Design and Development of a Deep Acoustic Lining for the 40-by 80 Foot Wind Tunnel Test Station, NASA TP-2002-211850, Nov. 2002, 61 Pages.

Syed et al., Paper No. 07ATC-43 Development of the Acousti-Cap TM Technology Double-Layer Acoustic Liners in Aircraft Engine Nacelles, Research Gate, 2007 SAE International, 23 Pages.

Tam et al., Experimental Validation of Numerical Simulations for An Acoustic Liner in Grazing Flow, 30 Pages. https://ntrs.nasa.gov/archive/nasa/casi.ntrs.nasa.gov/20130014086.pdf.

Tam et al., Numerical Simulation of a Slit Resonator in a Grazing Flow, AIAA 2006-799, $44^{th}$ AIAA Aerospace Meeting and Exhibit, Nevada, 2006, 20 Pages.

U.S. Appl. No. 16/370,124, filed Mar. 29, 2019.

Zhang, Numerical Simulation of Two-Dimensional Acoustic Liners with High Speed Grazing Flow, MS Thesis, Urbana, Illinois, 2010, 90 Pages.

Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015, 70 Pages. http://www.diva-portal.org/smash/record.jsf?pid=diva2:813073.

\* cited by examiner

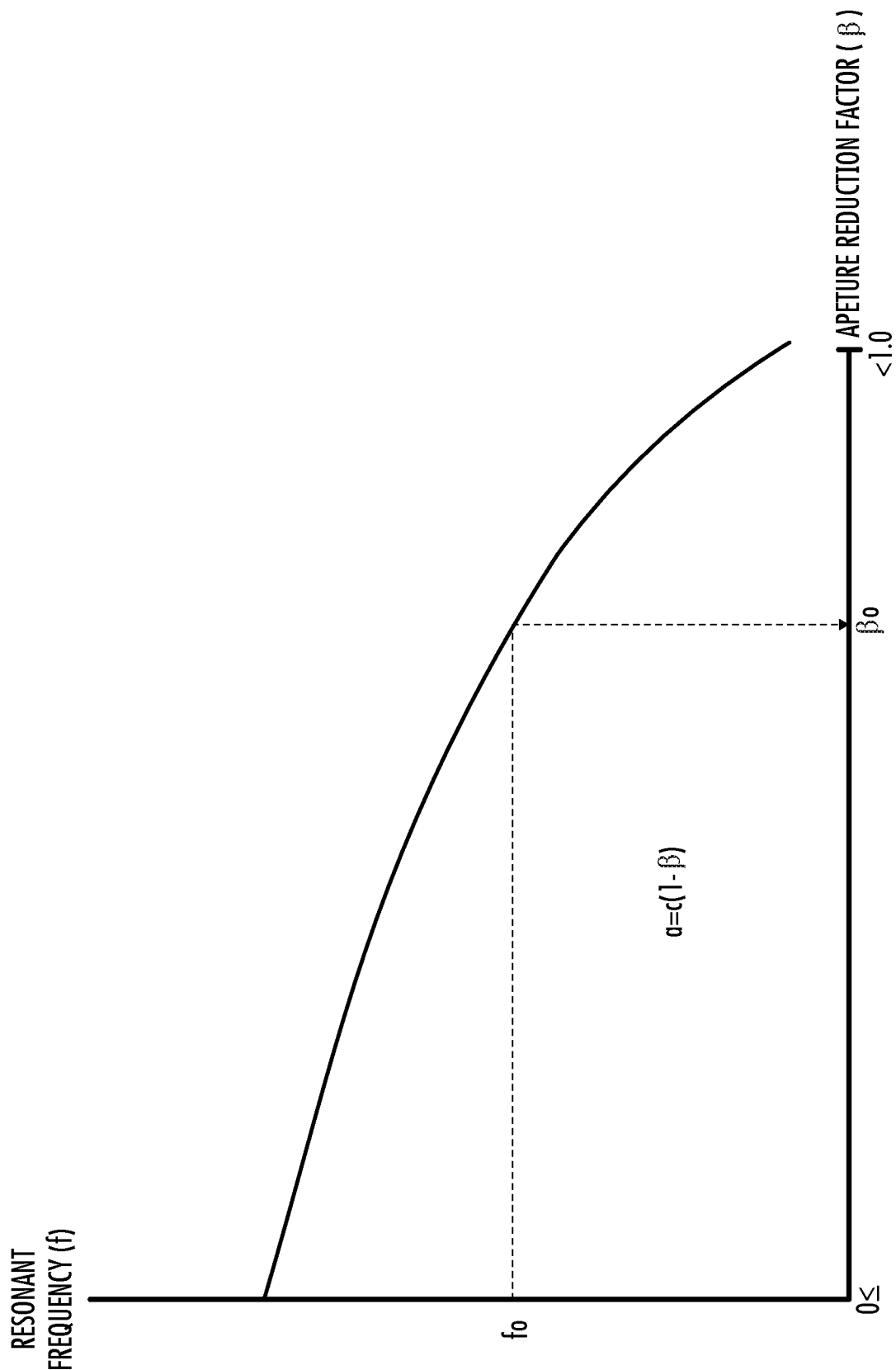

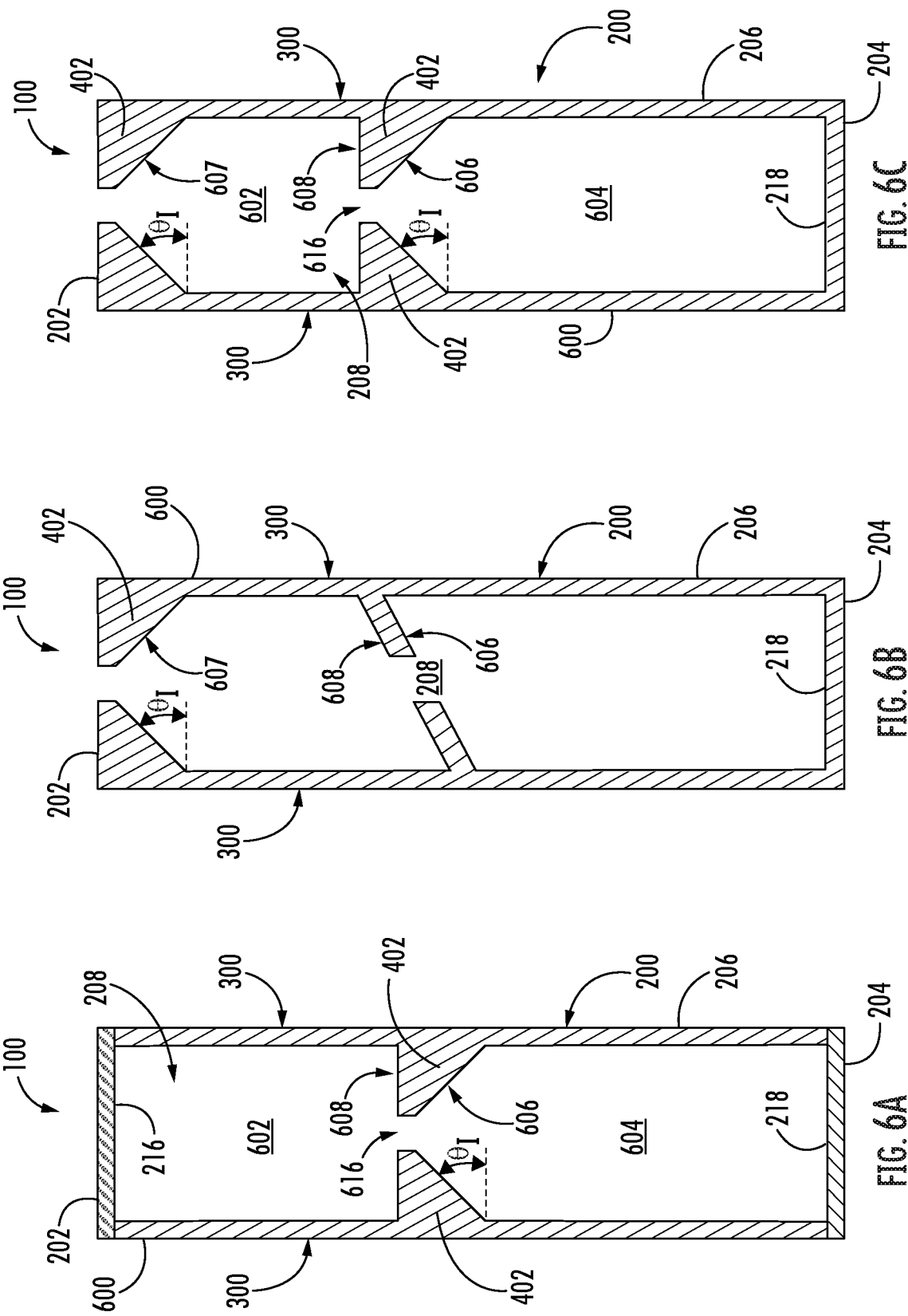

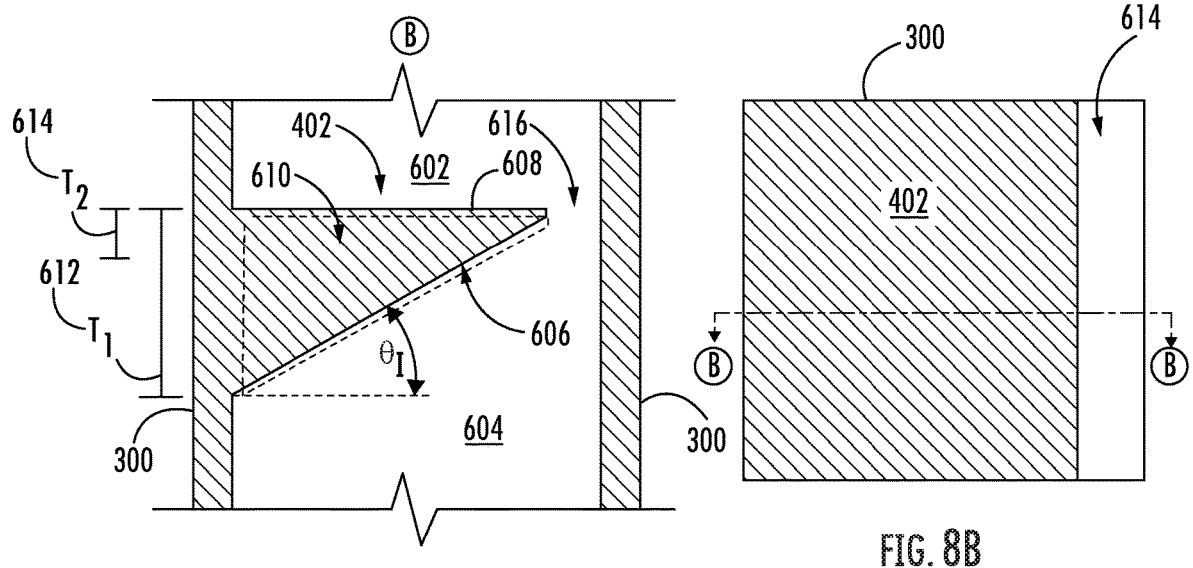
FIG. 8A
FIG. 8B
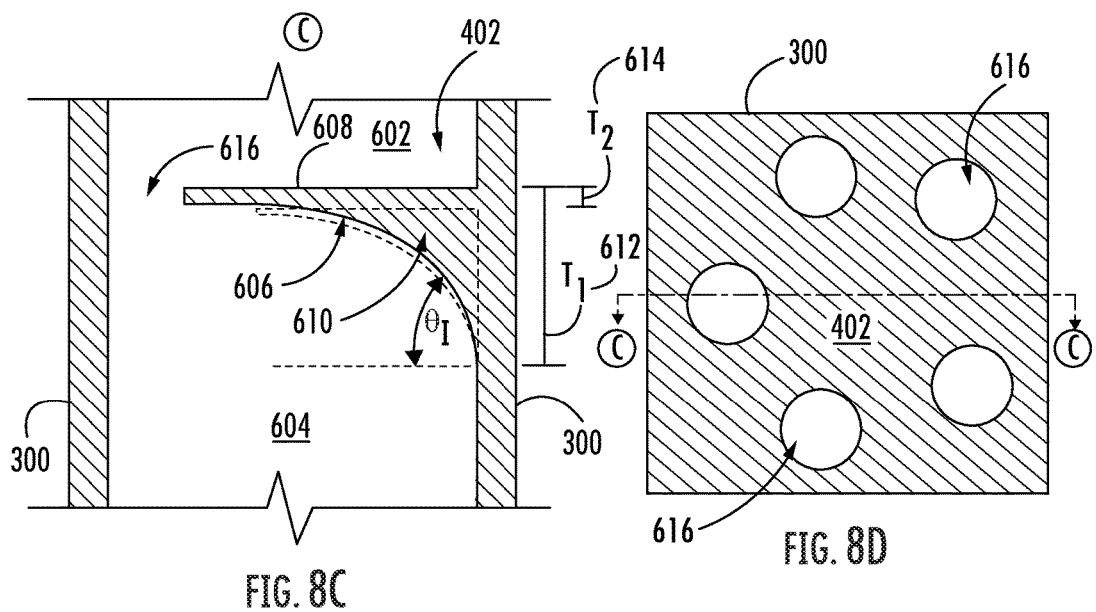
FIG. 8C
FIG. 8D

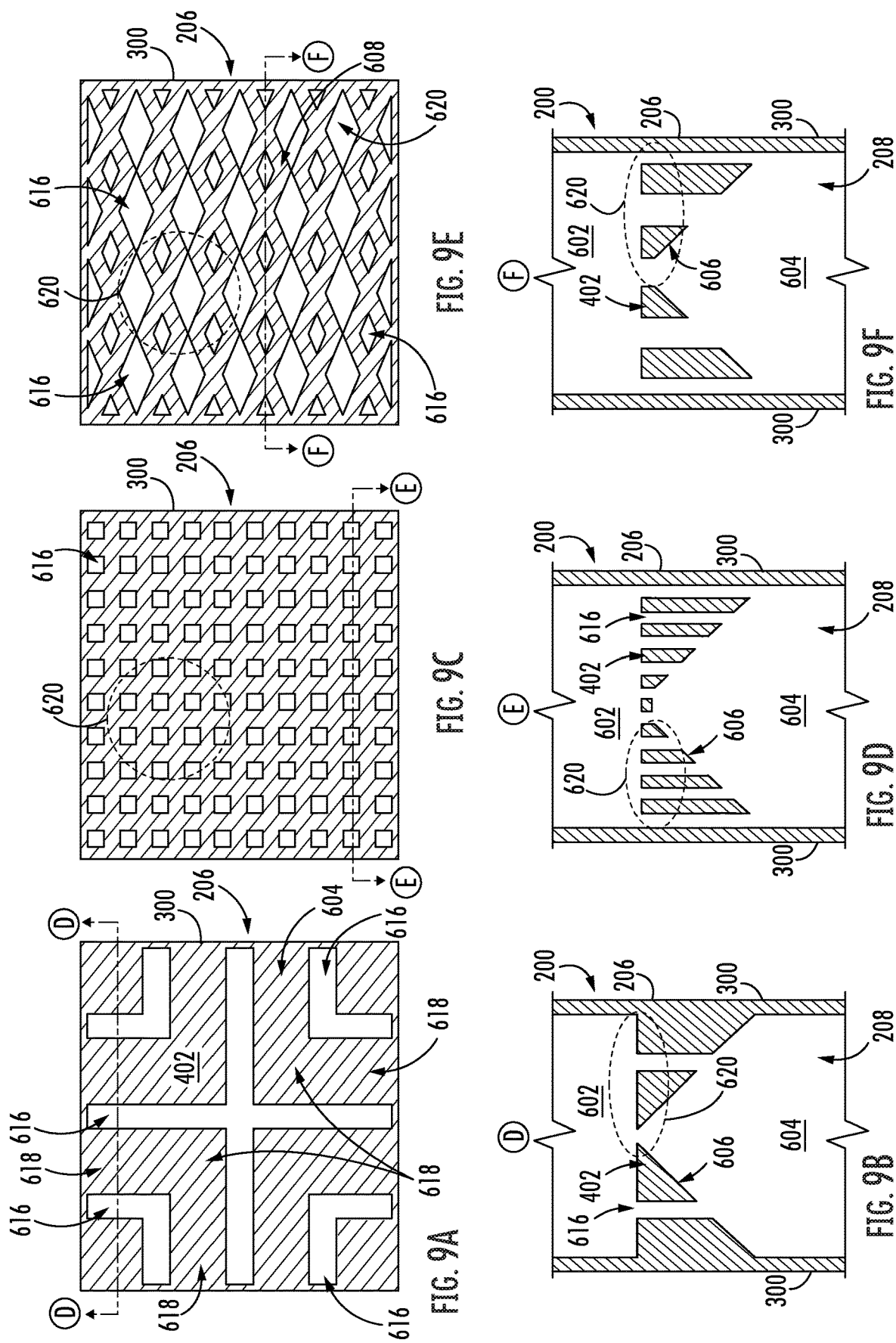

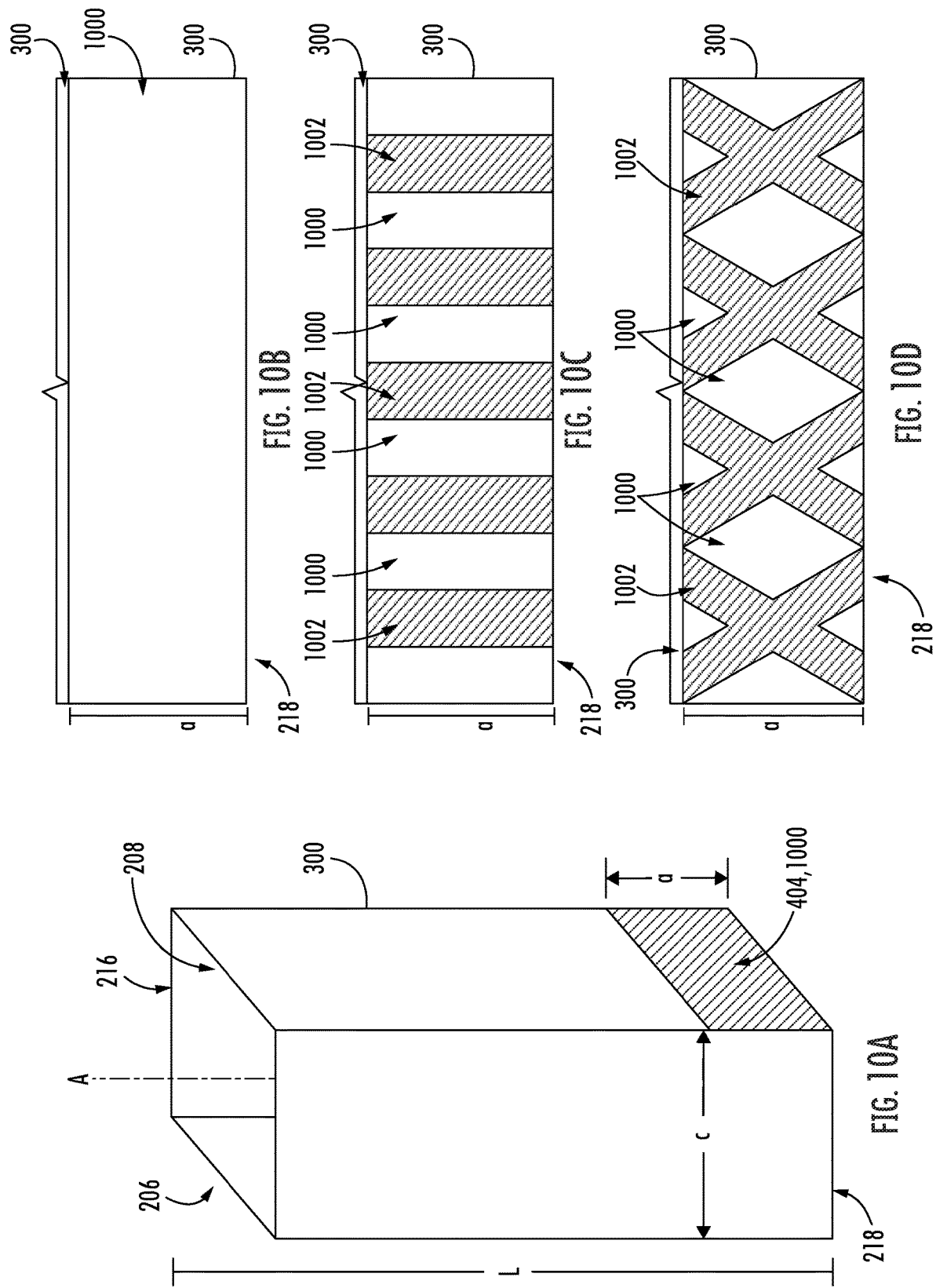

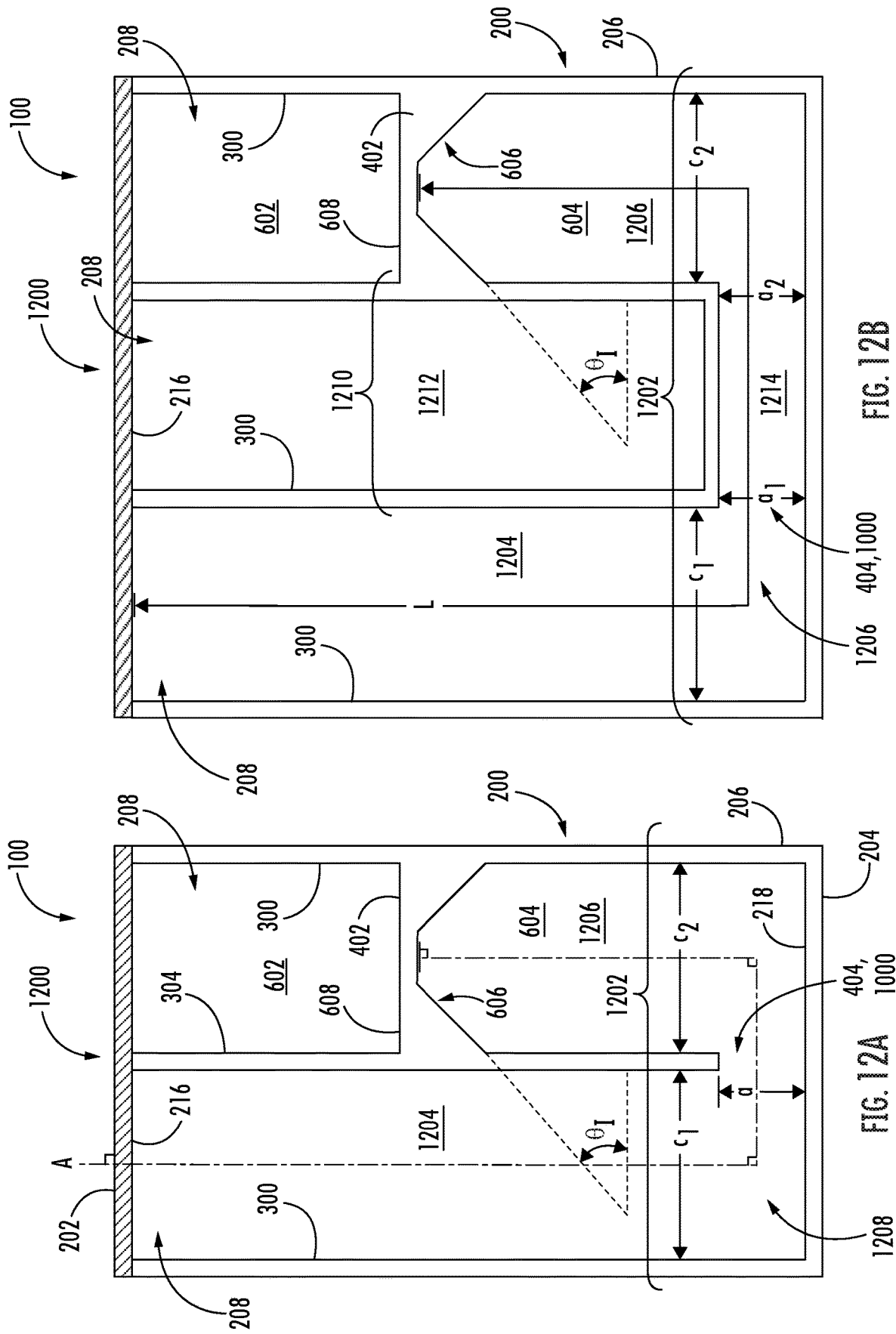

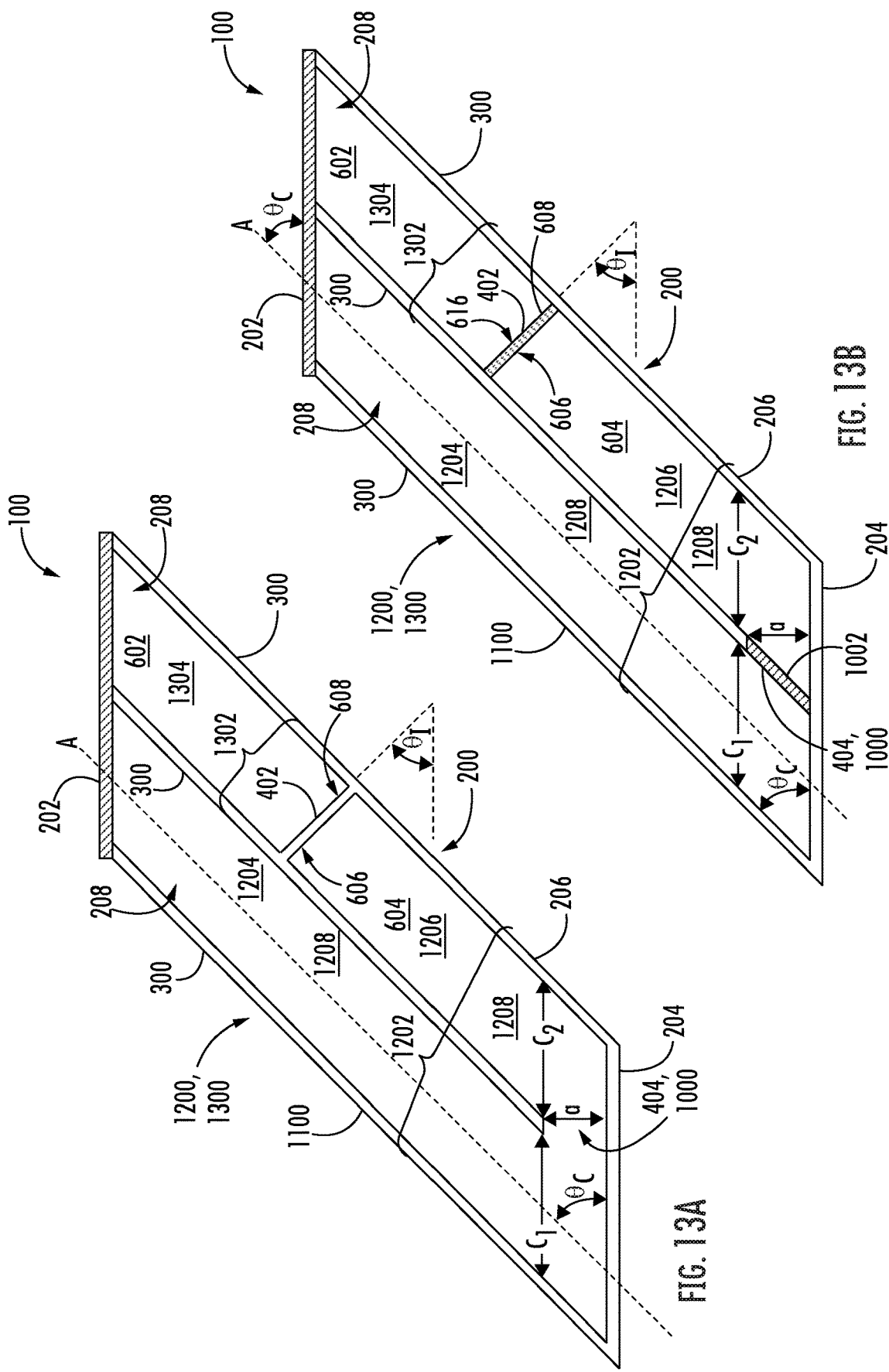

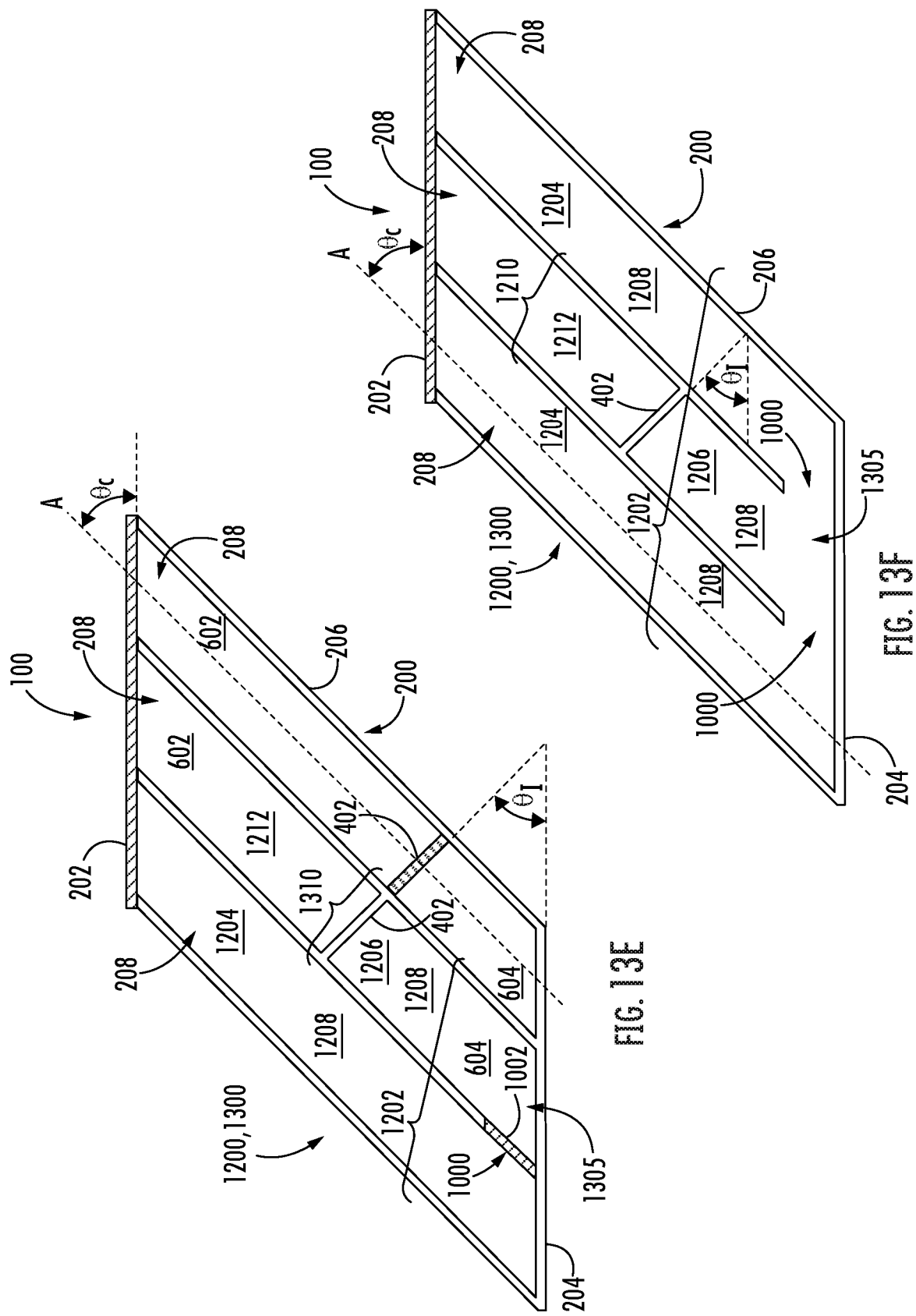

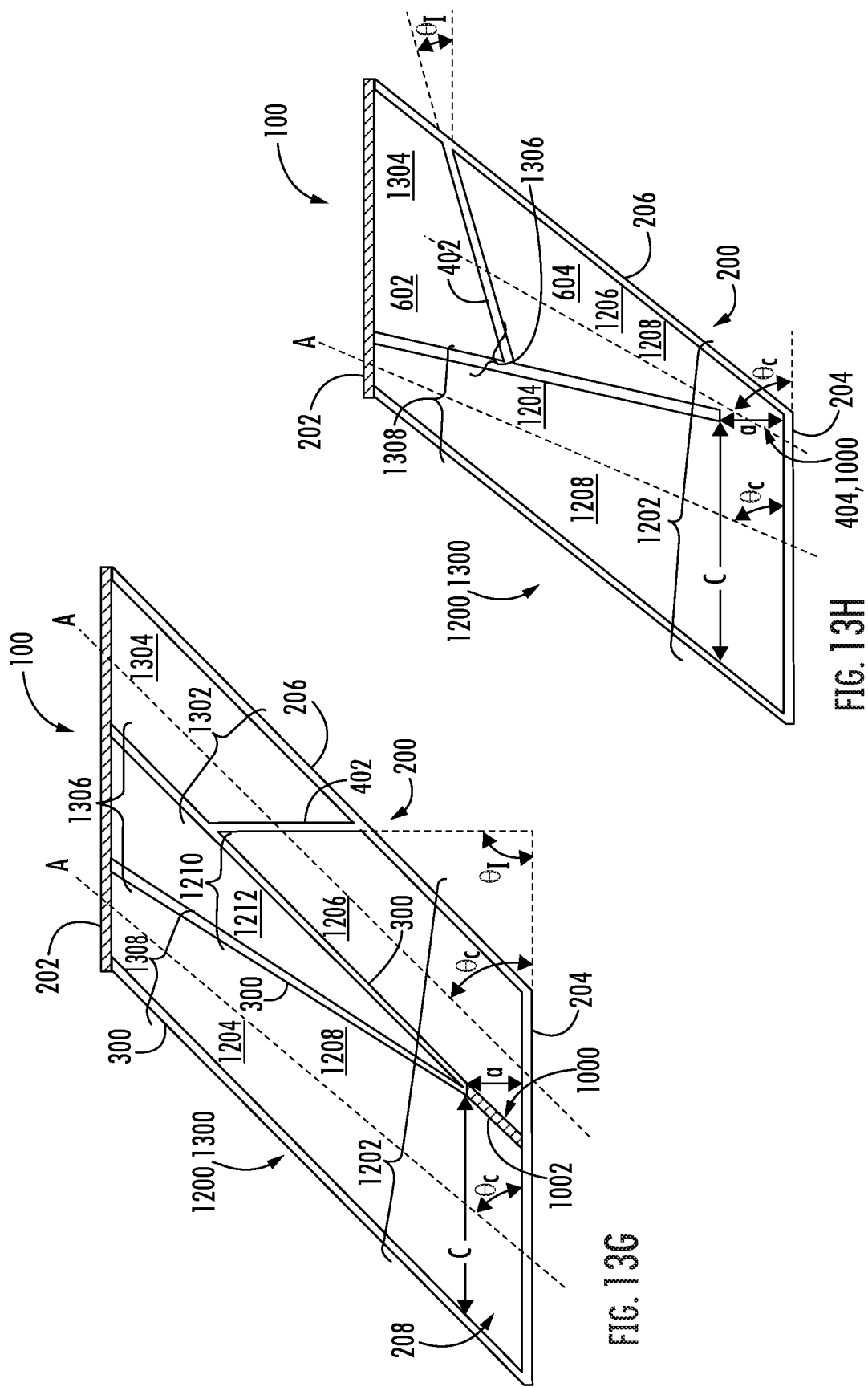

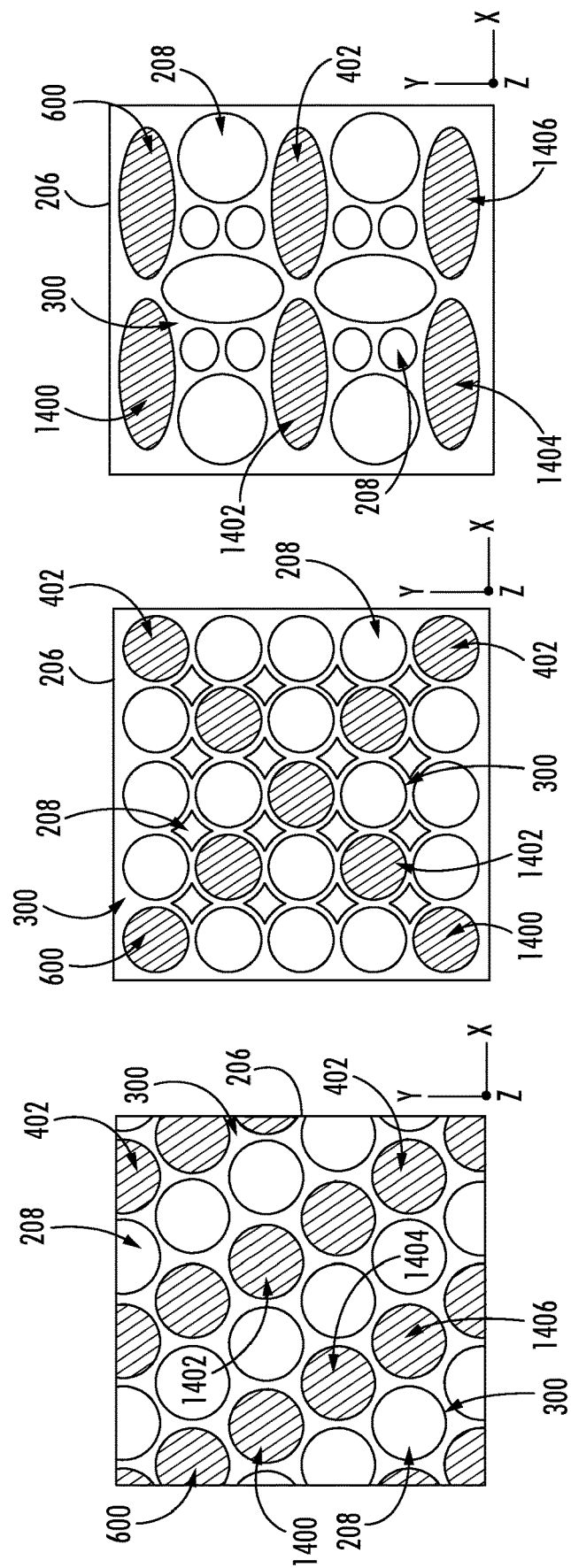

ACOUSTIC LINERS WITH LOW-FREQUENCY SOUND WAVE ATTENUATING FEATURES

FEDERALLY SPONSORED RESEARCH

This invention was made with government support under contract number DTFAWA-15-A-80013 awarded by the United States Department of Transportation Federal Aviation Administration (FAA). The government has certain rights in the invention.

FIELD

The present disclosure pertains to acoustic cores for attenuating noise, such as noise from a turbomachine.

BACKGROUND

Acoustic liners may be used to dampen or attenuate sound waves. For example, acoustic liners are used to dampen or attenuate noise from turbomachines such as turbofan engines as well as noise from other devices such as wind turbine blades.

Exemplary acoustic liners include an acoustic core positioned between a perforated or otherwise porous acoustic screen and a substantially imperforate back sheet. The acoustic screen may be coupled to an acoustic core that includes a plurality of resonant cells. The perforated or otherwise porous acoustic screen allows sound waves to enter the acoustic core and emanate in such a way as to dampen or attenuate sound waves.

Industry trends in aircraft turbomachine design are moving towards engines with increasingly higher bypass ratios, for example, in an effort to reduce fuel consumption and emissions. Turbofan engines with higher bypass ratios tend to have nondimensionally slimmer, shorter nacelles, which reduces the volume available for acoustic liners for noise attenuation. Additionally, industry trends are moving towards turbofan engines with fewer fan blades and lower rotational speeds, which increases the proportion of lower frequency sound waves within the noise spectrum generated by the engine. An acoustic liner may benefit from relatively deeper resonant cells in order for the acoustic liner to sufficiently attenuate lower frequency sound waves. However, available space for acoustic liners is becoming increasingly constrained as engine designs continue to trend towards increasingly higher bypass ratios, fewer fan blades, and lower rotational speeds. Similarly core liners aft of a turbine seek to attenuate comparatively low frequency core noise in comparatively reduced volume available for liners.

With wind turbines, industry trends are moving towards higher per-turbine energy capture, which corresponds to higher turbine diameters, for which maintaining lower rotational speeds for reduced noise operation presents design constraints that increase the cost of energy captured by the wind turbine. Acoustic liners may be added to wind turbine blades, allowing for either quieter noise levels during operations or higher tip speeds at a given noise level, thus reducing net system costs for wind turbine operations. However, the available space on wind turbine blades is also constrained, which in turn, constrains the depth of resonant cells and corresponding attenuation of lower frequency sound waves. By placing acoustic liner treatment on the blade in regions where the turbulent flow effects dominate the observable noise radiation, it is possible to scale wind turbine noise below current levels.

Accordingly, there exists a need for improved acoustic liners, including acoustic liners with improved attenuation of low-frequency sound waves within a given spatial volume. Additionally, there exists a need for improved methods of forming acoustic liners that have such improved attenuation of low-frequency sound waves.

BRIEF DESCRIPTION

Aspects and advantages will be set forth in part in the following description, or may be apparent from the description, or may be learned through practicing the presently disclosed subject matter.

In one aspect, the present disclosure embraces acoustic cores. An exemplary acoustic core may include an array of resonant cells. The array of resonant cells may include a plurality of coupled resonant cells that respectively define an antecedent resonant space and a subsequent resonant space and that have at least one cell wall with one or more wall-apertures defining a pathway between the antecedent resonant space and the subsequent resonant space. The array of resonant cells may additionally or alternatively include a plurality of high-frequency resonant cells respectively defining a high-frequency resonant space. Respective ones of the plurality of high-frequency resonant cells may be matched with respective ones of the plurality of coupled resonant cells.

In some embodiments, a cross-sectional dimension of the one or more wall-apertures defining the pathway between the antecedent resonant space and the subsequent resonant space may be less than a cross-sectional dimension of the antecedent resonant space and/or a cross-sectional dimension of the subsequent resonant space. The cross-sectional dimension of the antecedent resonant space and/or the cross-sectional dimension of the subsequent resonant space may be determined adjacent to the one or more wall-apertures.

Additionally, or in the alternative, at least some of the resonant cells may include one or more cell walls and a resonant space defined by the one or more cell walls, and the array of resonant cells may include a plurality of partitioned resonant cells that respectively include a partition integrally formed with at least one of the corresponding one or more cell walls and transecting the corresponding resonant space. At least one surface of the partition may have an interface angle that is oblique or perpendicular relative to a plane parallel to a top face and/or a bottom face of the array of resonant cells.

In another aspect, the present disclosure embraces acoustic liners. Exemplary acoustic liners may include an acoustic core as described herein.

In yet another aspect, the present disclosure embraces methods of making an acoustic core and/or an acoustic liner. An exemplary method may include determining, with an acoustic core configuration system, a configuration for an acoustic core that includes an array of resonant cells. Exemplary methods may include determining a configuration for any acoustic core described herein. By way of example, determining a configuration for an acoustic core may include determining a configuration for a plurality of coupled resonant cells, with respective ones of the plurality of coupled resonant cells defining an antecedent resonant space and a subsequent resonant space and having at least one cell wall with one or more wall-apertures defining a pathway between the antecedent resonant space and the subsequent resonant space. Determining the configuration for the acoustic fore may additionally or alternatively include determining a configuration for a plurality of high-frequency resonant cells respectively defining a high-frequency resonant space, with respective ones of the plurality of high-frequency resonant cells being matched with respective ones of the plurality of coupled resonant cells.

In yet another aspect, the present disclosure embraces acoustic core configuration systems. An exemplary acoustic core configuration system may be configured to determine a configuration for an acoustic core in accordance with any method described herein.

In still another aspect, the present disclosure embraces computer-readable media that have computer-executable instructions. The computer-executable instructions, when executed by a processor, may be configured to cause the processor to perform any method described herein. By way of example, an exemplary computer-readable medium may include computer-executable instructions which, when executed by a process, cause the processor to perform a method that includes determining a configuration for an acoustic core that has an array of resonant cells, and the method may include determining a configuration for a plurality of coupled resonant cells and/or determining a configuration for a plurality of high-frequency resonant cells.

In some embodiments, respective ones of the plurality of coupled resonant cells may define an antecedent resonant space and a subsequent resonant space, and may include at least one cell wall that has one or more wall-apertures defining a pathway between the antecedent resonant space and the subsequent resonant space. Additionally, or in the alternative, respective ones of the plurality of high-frequency resonant cells may be matched with respective ones of the plurality of coupled resonant cells.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 5 schematically depicts a relationship between the resonant frequency of a resonant cell and the size of an aperture included in a partition or cell wall of the resonant cell;

FIGS. 6A-6C schematically depict exemplary side cross-sectional views of resonant cells that may be included in an acoustic core;

FIGS. 8A-8D schematically depict additional exemplary side cross-sectional views of a partition transecting a resonant space of a resonant cell;

FIGS. 9A-9F schematically depict corresponding facing views and a side cross-sectional views of additional exemplary partitions that include a partition-aperture;

FIG. 10A schematically depicts a perspective view of an exemplary wall-aperture defining a pathway through a cell wall;

FIGS. 10B-10D schematically depict facing views of exemplary wall-apertures defining a pathway through a cell wall;

FIGS. 12A and 12B schematically depict exemplary coupled resonant cells;

FIGS. 13A-13H schematically depict side cross-sectional views of respective additional exemplary resonant cell groups;

FIGS. 14A-14F schematically depict top cross-sectional views of exemplary arrays of resonant cells;

Figure 1A:
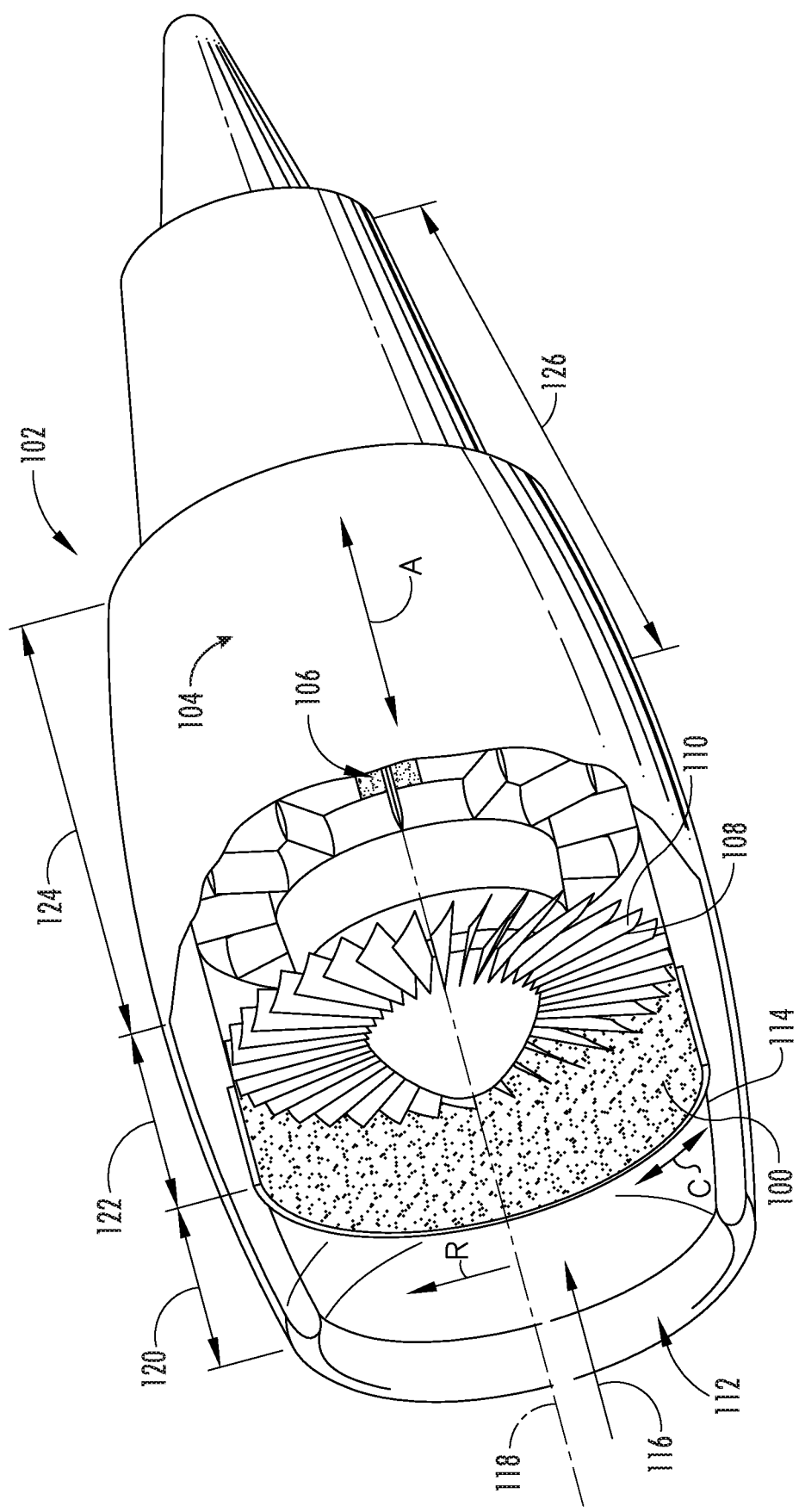
FIG. 1A schematically depicts a perspective partial cutaway view of an exemplary turbomachine that has an acoustic liner.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For example, features illustrated or described as part of one embodiment can be used with another embodiment to yield a still further embodiment. Thus, it is intended that the present disclosure covers such modifications and variations as come within the scope of the appended claims and their equivalents.

Acoustic liners for damping or attenuating sound waves, as well as methods of forming such acoustic liners, are described herein. Acoustic liners may be used, for example, to dampen or attenuate noise generated by or emanating from various aspects or components of turbomachines, such as turbofan engines used in aircraft, including commercial, military, and civilian aircraft. Acoustic liners may be used for damping and attenuating noise from a wide variety of turbomachines, including, turbojets, turbofans, turboprops, turboshafts, ramjets, pulse-jets, turbines, gas turbines, steam turbines, marine engines, and the like. Additionally, or in the alternative, acoustic liners may be used to dampen or attenuate sound waves from other aircraft structures and/or wind turbine structures, including, for example, noise generated by fan blades, turbine blades, and so forth. Acoustic liners may be applied to the trailing edge, leading edge, or elsewhere on turbine blades of a wind turbine as well as fan blades of any other turbomachine, as well as other rotating or stationary vanes or other structures. More broadly, acoustic liners may be used to dampen or attenuate sound waves from any source that might be within the contemplation of those skilled in the art.

The presently disclosed acoustic liners include an acoustic core having an array of resonant cells, that may be configured, for example, to provide improved attenuation of low-frequency sound waves. Additionally, or in the alternative, the array of resonant cells may be configured to attenuate a range of resonant frequencies, including low-frequency sound waves, high-frequency sound waves, and/or intermediate-frequency sound waves. The resonant cells within the array may include one or more cell walls and a resonant space defined by the one or more cell walls.

In some embodiments, the resonant frequency of a resonant cell may be reduced by providing one or more apertures in a cell wall and/or a partition of a resonant cell. Such apertures have been shown to introduce wave propagations that increase wave propagation distance relative to primary wave propagation patterns along the axial length of a resonant space. As a result of such wave propagations, resonant cells with an aperture may exhibit a lower resonant frequency. One or more apertures in a cell wall may define a pathway between an antecedent resonant space and a subsequent resonant space of respective resonant cells. One or more apertures in a partition of a resonant cell may define a pathway between an upper resonant space and a lower resonant space. The one or more apertures provide a combined resonant space that has an axial length that includes the resonant space on opposite sides of the aperture. In some embodiments, the one or more apertures may be selectively configured to down-scale the resonant frequency according to an aperture reduction factor, such that the resonant length of the combined resonant space exceeds the height or axial length of such resonant space (see e.g., FIG. 5).

A resonant cell that has a partition transecting the resonant cell, with or without an aperture defining a pathway through the partition, may be referred to as "partitioned resonant cells." An aperture in a cell wall may be referred to as a "wall-aperture." An aperture in a partition may be referred to as a "partition aperture."

A resonant cell may be configured as a perpendicular resonant cell or an oblique resonant cell. As used herein, the term "perpendicular resonant cell" refers to a resonant cell that has a resonant space with a longitudinal axis that follows a path equidistant from and locally normal to the cell walls, with the longitudinal axis having a perpendicular orientation relative to the top face and/or the bottom face of the resonant cell. As used herein, the term "oblique resonant cell" refers to a resonant cell that has a resonant space with a longitudinal axis, A, that follows a path equidistant from and locally normal to the cell walls, with the longitudinal axis having an oblique orientation relative to the top face and/or the bottom face of the resonant cell. In some embodiments, the resonant frequency of a resonant cell may be reduced by orienting a resonant cell obliquely relative to a top face and/or a bottom face of the acoustic core. An oblique resonant cell may include one or more partitions such that the oblique resonant cell may be a partitioned resonant cell. Additionally or in the alternative, an oblique resonant cell may define a portion of a coupled resonant cell.

An array of resonant cells may include one or more resonant cell groups. The term "resonant cell group" refers to a plurality of resonant cells that are matched or grouped with one another in a recognizable pattern that repeats across at least a portion of an array of resonant cells. The recognizable pattern may include resonant cells that geometrically fit with one another, and/or resonant cells that are tuned to attenuate a complementary range of resonant frequencies. A resonant cell group may include one or more coupled resonant cells. As used herein, the term "coupled resonant cell" refers to a resonant cell that has an aperture in a cell wall adjoining an antecedent resonant space and a subsequent resonant space. A resonant cell group may include one or more reduced-frequency resonant cells, which may be low-frequency resonant cells, high-frequency resonant cells, and/or intermediate-frequency resonant cells. A coupled resonant cell may define a portion of a partitioned resonant cell.

As used herein, the term "reduced-frequency resonant cell" refers to a resonant cell that has one or more structures that reduce the resonant frequency of the cell's resonant space as compared to a corresponding nominal resonant cell. For example, a reduced frequency resonant cell may include a partition with one or more apertures that reduce the resonant frequency of the cell's resonant space. Additionally, or in the alternative, a coupled resonant cell may be a reduced frequency resonant cell when one or more apertures in a cell wall have an aperture reduction factor that reduces the resonant frequency of the combined resonant space, such as an aperture reduction factor from $0 \leq$ to $<1.0$ (see e.g., FIG. 5). A reduced-frequency resonant cell may be tuned to any desired resonant frequency. For example, reduced-frequency resonant cell may be a low-frequency resonant cell, a high-frequency resonant cell, or an intermediate-frequency resonant cell.

The term "nominal resonant cell" refers to a resonant cell that would result from modifying or eliminating the one or more structures of a reduced-frequency resonant cell to which a reduced resonant frequency is attributed. For example, a nominal resonant cell would result from eliminating a partition that contains one or more apertures from a resonant cell. Additionally, or in the alternative, a nominal resonant cell would result from decreasing the aperture reduction factor of one or more apertures in a cell wall so as to eliminate the reduction in resonant frequency attributable to the one or more apertures in the cell wall, such as decreasing the aperture reduction factor to 0.0 (see e.g., FIG. 5).

The term "low-frequency resonant cell" refers to a resonant cell that is tuned to a resonant frequency that has a corresponding resonant length that exceeds the height or axial length of the resonant cell or the height of the acoustic core in which the low-frequency resonant cell is included. The term "high-frequency resonant cell" refers to a resonant cell in a resonant cell group that is tuned to a resonant frequency that is greater than a low-frequency resonant cell" in the resonant cell group. The term "intermediate-frequency resonant cell" refers to a resonant cell in a resonant cell group that is tuned to a resonant frequency that is less than a high-frequency resonant cell in the resonant cell group and greater than a low-frequency resonant cell in the resonant cell group.

As used herein, the term "resonant length," with respect to a subject resonant cell, refers to the axial length along the longitudinal axis of a resonant space of a nominal resonant cell that would provide a resonant frequency corresponding to the resonant space of the subject resonant cell. For a reduced-frequency resonant cell, the cell's resonant length exceeds the height or axial length of the cell's resonant space. For a nominal resonant cell, the axial length of the resonant space equals the resonant length. The longitudinal axis, A, of a resonant space generally refers to an axis transecting a resonant space equidistant from the cell walls defining the resonant space and oriented in the direction of wave propagation through the resonant space. For example, a resonant space with a perpendicular orientation relative to a top face and/or a bottom face of a resonant cell would have a longitudinal axis that also has a perpendicular orientation relative to a top face and/or a bottom face, whereas a resonant space with an oblique orientation relative to the top face and/or the bottom face would have a longitudinal axis that has a corresponding oblique orientation relative to the top face and/or the bottom face. For a curvilinear or irregular resonant space, including a combined resonant space of a coupled resonant cell, the longitudinal axis, A, follows a path equidistant from and locally normal to the cell walls defining the resonant space. As used herein, the term "axial length" with respect to a resonant cell or resonant space refers to a distance, L, along a longitudinal axis, A, that follows a path equidistant from and locally normal to the respective cell walls. As used herein, the term "height" with respect to a resonant cell, resonant space, and/or an acoustic core refers to a distance along a normal line oriented perpendicularly or radially relative to the top face and/or the bottom face. It will be appreciated that the resonant length of a resonant cell may differ from the axial length and/or height of the resonant cell depending on the configuration of the resonant cell.

The "resonant frequency" of a resonant cell refers the frequency with the greatest absorption coefficient for the resonant cell. It will be appreciated that the exemplary frequency values for low-frequency, high-frequency, and intermediate-frequency resonant cells herein are provided by way of example only and not to be limiting. Exemplary low-frequency resonant cells may be tuned, for example, to a resonant frequency of from about 200 Hz to about 3,000 Hz, such as from about 250 Hz to about 2,000 Hz, or such as from about 200 Hz to about 1,500 Hz. A low-frequency resonant cell may be tuned, for example, to a resonant frequency of less than about 2,500 Hz, such as less than 2,000 Hz, such as less than 1,500 Hz, such as less than 1,000 Hz, or such as less than 500 Hz. A low-frequency resonant cell may be tuned, for example, to a resonant frequency of at least 250 Hz, such as at least 500 Hz, such as at least 1,000 Hz, such as at least 1,500 Hz, or such as at least 2,000 Hz.

Exemplary high-frequency resonant cells may be tuned, for example, to a resonant frequency of from about 1,000 Hz to about 10,000 Hz, such as from about 1,000 Hz to about 6,000 Hz, such as from about 2,500 Hz to about 5,000 Hz, such as from about 3,000 Hz to about 4,500 Hz, or such as from about 4,000 Hz to 8,000 Hz. A high-frequency resonant cell may be tuned, for example, to a resonant frequency of less than about 10,000 Hz, such as less than about 8,000 Hz, such as less than about 6,000 Hz, such as less than about 5,000 Hz, such as less than 4,500 Hz, such as less than 4,000 Hz, such as less than 3,000 Hz, or such as less than 2,500 Hz. A high-frequency resonant cell may be tuned, for example, to a resonant frequency of at least 1,000 Hz, such as at least 2,000 Hz, such as at least 2,500 Hz, such as at least 3,000 Hz, such as at least 4,000 Hz, such as at least 4,500 Hz, such as at least 5,000 Hz, such as at least 6,000 Hz, or such as at least 8,000 Hz.

Exemplary intermediate-frequency resonant cells may be tuned, for example, to a resonant frequency of from about 400 Hz to about 6,000 Hz, such as from about 1,000 Hz to about 4,000 Hz, such as from about 1,500 Hz to about 3,500 Hz, or such as from about 1,000 Hz to about 3,000 Hz. An intermediate-frequency resonant cell may be tuned, for example, to a resonant frequency of less than about 6,000 Hz, such as less than about 4,000 Hz, such as less than 3,500 Hz, such as less than 3,000 Hz, such as less than 2,500 Hz, or such as less than 1,000 Hz. An intermediate-frequency resonant cell may be tuned, for example, to a resonant frequency of at least 400 Hz, such as at least 1,000 Hz, such as at least 2,000 Hz, such as at least 2,500 Hz, such as at least 3,000 Hz, such as at least 3,500 Hz, such as at least 4,000 Hz, or such as at least 5,000 Hz.

In some embodiments, the array of resonant cells may be produced using an additive manufacturing technology, which may allow for novel resonant cell configuration, geometries, and/or features described herein that may provide enhanced low-frequency noise attenuation. For example, the use of an additive manufacturing technology may allow for the formation of reduced-frequency resonant cells, including coupled resonant cells and partitioned resonant cells. Adjacent resonant cells may share integrally formed cell walls with one another. Additionally, or in the alternative, a partition may be integrally formed with one or more cell walls. As used herein, the term "integrally formed" means that two or more features are formed concurrently as part of the same process. For example, portions of an acoustic core or acoustic liner that are formed concurrently using an additive manufactured process are considered integrally formed. Portions of an acoustic core or acoustic liner that are first formed and then subsequently assembled or coupled to one another are not considered integrally formed. While additive manufacturing technology may be selected in some embodiments, it will be appreciated that the presently disclosed acoustic liners, acoustic cores, and features thereof, may be formed using other technology and references to additive manufacturing technology does not limit the scope of the present disclosure.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the particular components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without a corresponding change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Figure 1B:
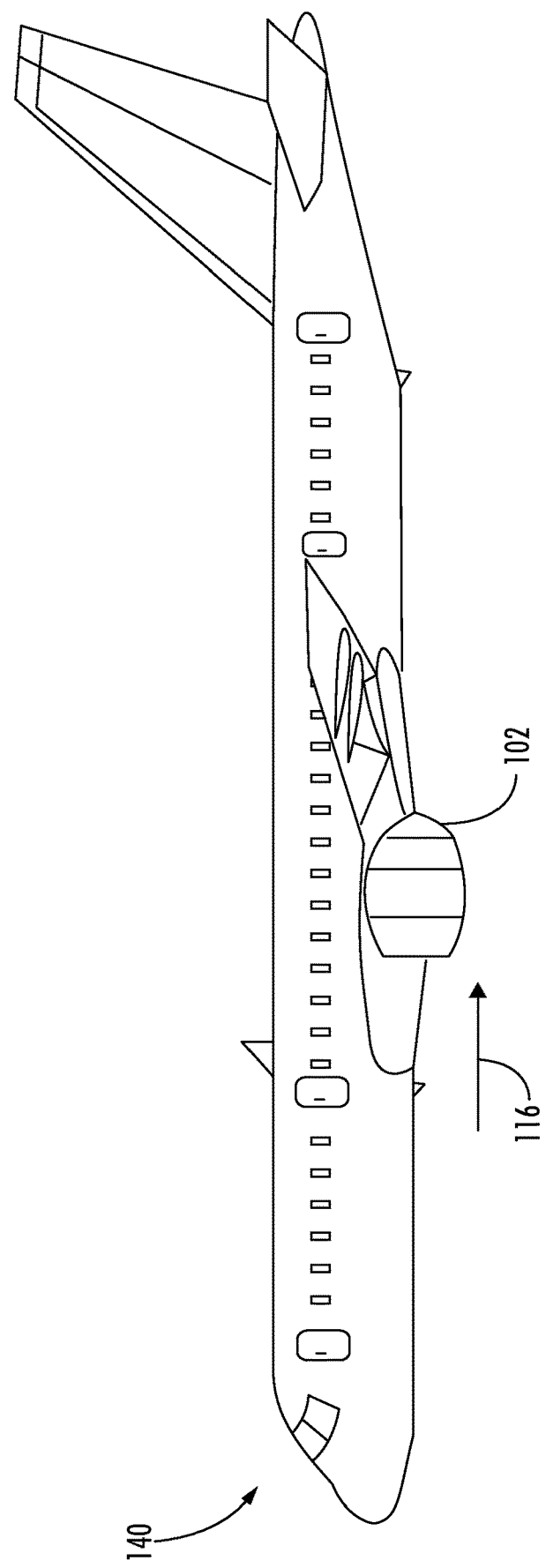
FIG. 1B schematically depicts an aircraft equipped with a turbomachine that has an acoustic liner.
Figure 1C:
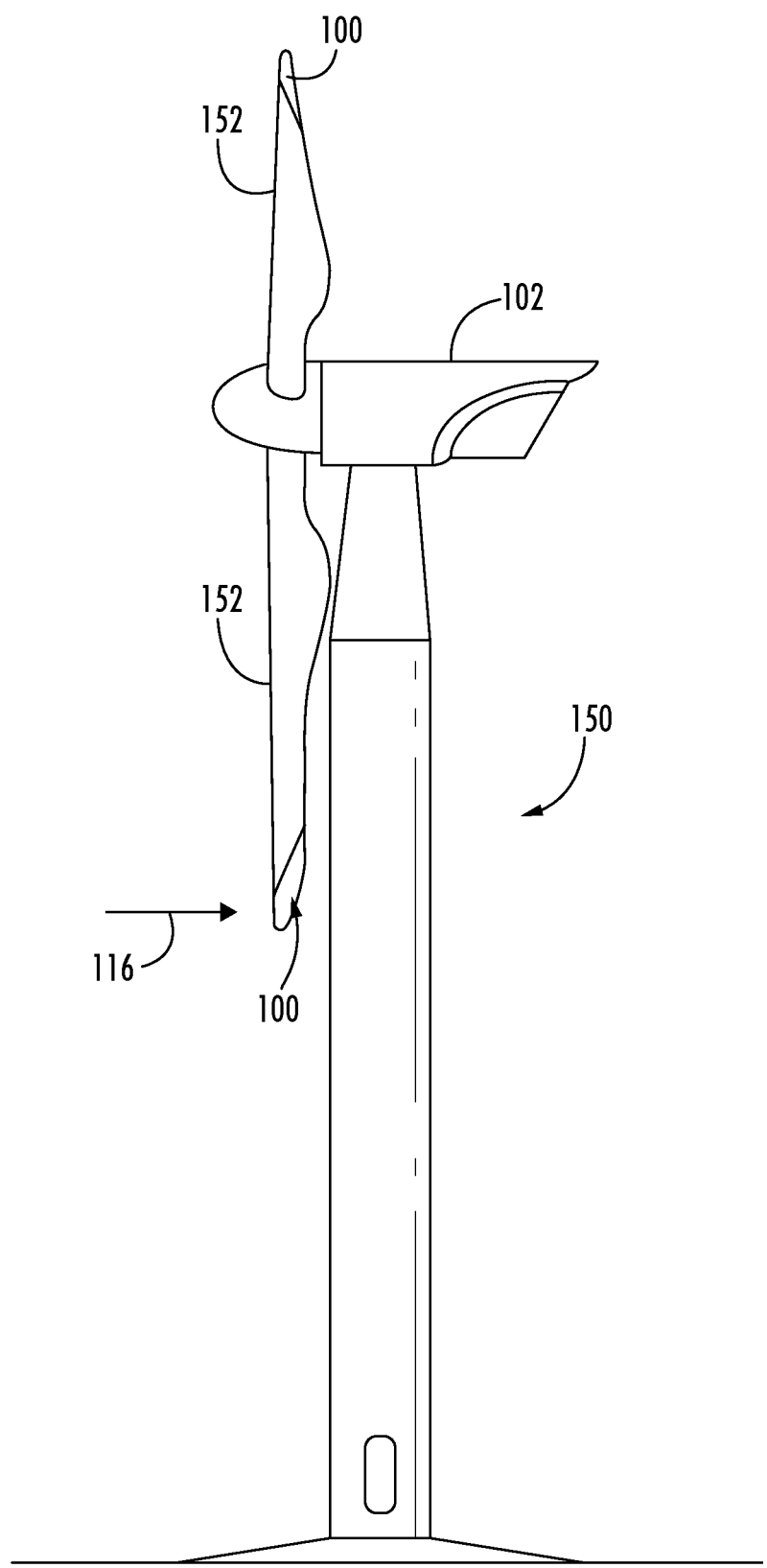
FIG. 1C schematically depicts a wind turbine equipped with an acoustic liner.

Exemplary embodiments of the present disclosure will now be described in further detail. As shown in FIG. 1A, one or more acoustic liners 100 may provide a system for damping or attenuating sound waves, including sound waves associated with a turbomachine 102. In an exemplary embodiment shown in FIG. 1B, an aircraft 140 may include a turbomachine 102 (e.g., a turbofan engine) with one or more acoustic liners 100 configured to attenuate noise from the turbomachine 102. In another exemplary embodiment shown in FIG. 1C, a wind turbine 150 may include turbine blades 152 with one or more acoustic liners 100 applied to one or more portions of the turbine blades 152 to attenuate noise therefrom. For example, an acoustic liner may be applied to the leading edge region and/or the trailing edge region of the turbine blades 152 of the wind turbine 150.

Still referring to FIG. 1A, the turbomachine 102 may include a housing or nacelle 104 surrounding a turbine 106 and/or a fan rotor 108, which includes a plurality of circumferentially spaced fan blades 110 powered by the turbine 106. An exemplary housing or nacelle 104 includes an inlet 112 and a duct having a duct wall 114 that directs airflow 116 downstream through a fan rotor 108, generally along a longitudinal axial centerline 118. The acoustic liners 100 provide a system for damping or attenuating sound waves. An exemplary system may include one or more acoustic liners 100 disposed annularly along the duct wall 114. The one or more acoustic liners 100 may have a position along the duct wall 114 located upstream from the fan blades 110. One or more acoustic liners may also be positioned downstream from the fan blades 110. For example, an acoustic liner may be positioned at or aft of an inner barrel 120 portion of the nacelle 104. Additionally, or alternatively, one or more acoustic liners 100 may be positioned at or aft of a fan casing portion 122 and/or a transcowl portion 124 of a nacelle 104. In some embodiments, a turbomachine 102 may include a plurality of housings 104 surrounding a turbine 106. In some embodiments, a plurality of housings 104 may be configured and arranged annularly relative to one another. Each such housing 104 may include an inner duct wall 114 and an outer duct wall 114. One or more acoustic liners 100 may be positioned about an inner duct wall 114 and/or an outer duct wall 114 of any one or more of a plurality of housings 104. Additionally, one or more acoustic liners 100 may be positioned in proximity to non-rotating portions of the fan casing portion 122 or other components of the turbomachine 102. These positions include ducts or casings within the turbomachine 102 where an acoustic liner may be useful for noise suppression (e.g., damping or attenuation) at various frequency ranges, including across a spectrum of frequency ranges. For example, one or more acoustic liners 100 may be positioned at a core cowl portion 126. Those skilled in the art will appreciate even further areas where acoustic liners 100 may be positioned to dampen or attenuate noise generated by or emanating from various aspects of a turbomachine 102, all of which are within the scope of the present disclosure.

In operation, a turbomachine 102 generates a lot of noise. To illustrate an exemplary source of turbomachine 102 noise, it will be appreciated that the fan rotor 108 rotates within the fan casing portion 122, producing discrete tonal noise predominately at a blade passage frequency (BPF) and multiples thereof, as well as broadband noise over a wide frequency range. During take-off of the aircraft 140, the fan blades 110 can reach transonic and supersonic rotational velocities, generating noise that propagates out of the fan duct into the surrounding environment. In exemplary embodiments, one or more acoustic liners 100 are configured and arranged to suppress noise resonating at the BPF and harmonics of the BPF as well as the dominant broadband noise contributions from the fan. The one or more acoustic liners 100 or various portions thereof may be configured to dampen or attenuate sound waves and thereby reduce the sound at specific frequencies or across a range of frequencies. Some aspects of an acoustic liner 100 may be configured to reflect or propagate incident sound waves multiple times before the sound waves escape the acoustic liner 100. These multiple reflections may reduce the amplitude of the sound waves. Additionally, some aspects of an acoustic liner 100 may be configured to cause sound waves to become out-of-phase because of such reflections or propagations. When sound waves become out-of-phase, various portions of the sound waves tend to cancel one another, thereby reducing at least some of the energy in the sound waves.

Figure 2:
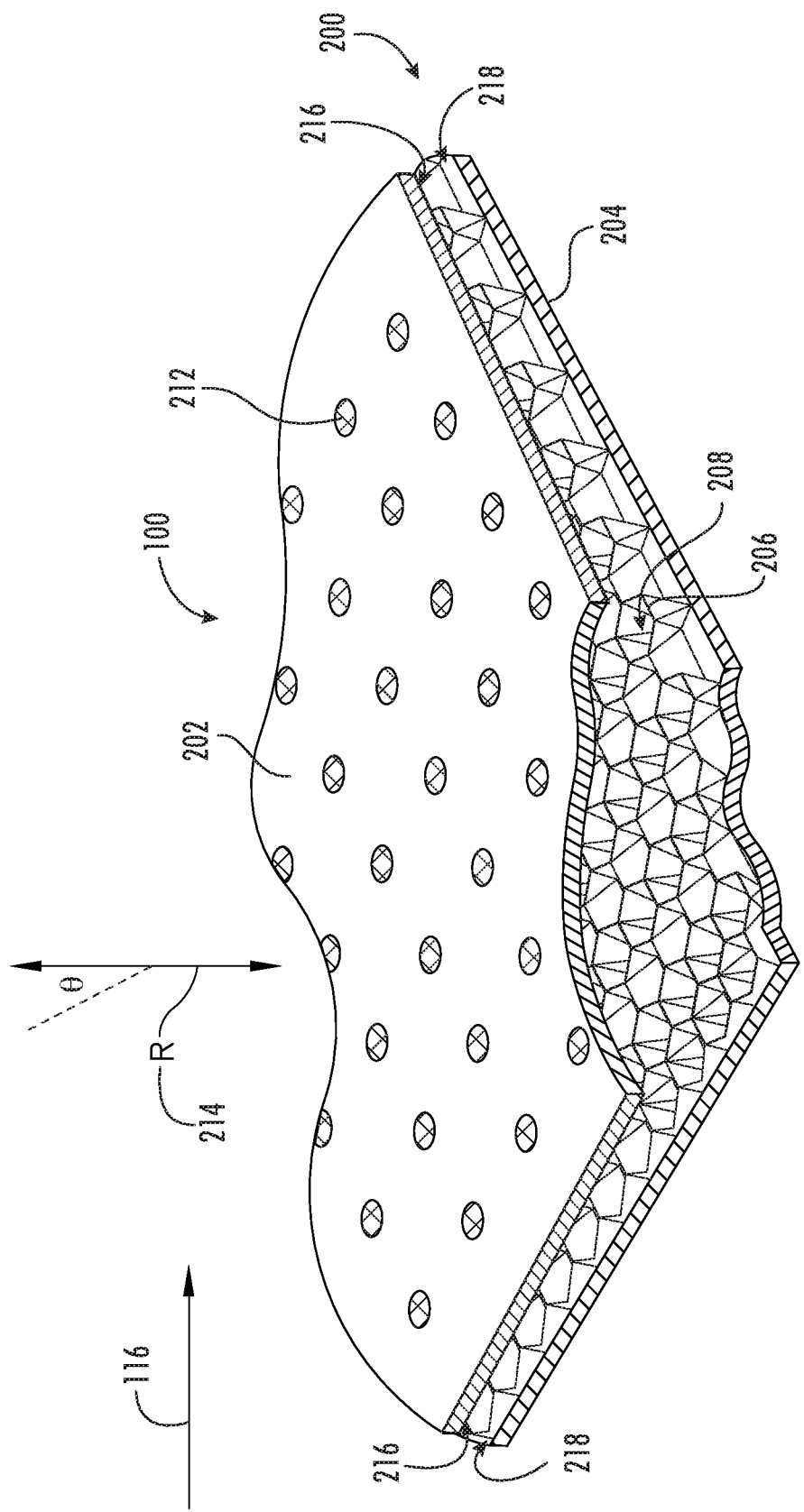
FIG. 2 schematically depicts an isometric partial cutaway view of a portion of an exemplary acoustic liner.

FIG. 2 shows an isometric partial cutaway view of a portion of an exemplary acoustic liner 100. The acoustic liner 100 shown in FIG. 2 may be configured for use with the turbomachine 102 shown in FIG. 1A or for attenuating noise from any other source within the contemplation of those skilled in the art. In some embodiments, the acoustic liner 100 may be disposed proximate to airflow 116 (also shown in FIGS. 1A-1C). The acoustic liner 100 may be secured within the turbomachine 102 by a flange or other attachment with the duct wall 114 and/or the fan casing portion 122. The acoustic liner 100 includes an acoustic core 200 positioned between an acoustic screen 202 and a substantially imperforate back sheet 204. The acoustic screen 202 may include a perforated plate, a mesh (e.g., formed of wire, cloth, fibers, and/or filaments), or a combination thereof. Additionally, or in the alternative, the acoustic screen 202 may include an additively manufactured component. In some embodiments, the acoustic screen 202 and back sheet 204 form planes having a generally parallel orientation relative to one another. The acoustic core 200 is made up of hollow cellular structures or resonant cells 206 disposed between the acoustic screen 202 and the back sheet 204. The resonant cells 206 include a plurality of cell walls that define a hollow resonant space 208.

The acoustic core, the acoustic screen 202, the back sheet 204 may be formed as part of an additive manufacturing technology or any other suitable process, separately or concurrently with one another. The acoustic screen 202 and/or the back sheet 204 may additionally or alternatively be formed as part of an any other manufacturing technology separately or concurrently with the acoustic core 200. Additionally, or in the alternative, the acoustic screen 202 and/or the back sheet 204 may be combined with acoustic core 200, for example, using an adhesive process such as a thermal, sonic, or electric welding process. Alternatively, an adhesive formulation such as a thermosetting or pressure sensitive adhesive or an adhesive tape may be used to secure the acoustic screen 202 and/or the back sheet 204 to the acoustic core 200.

A thickness or height of the acoustic core 200 may be defined by a distance taken along an axis R 214 (also shown in FIG. 1A) between an inside surface of the acoustic screen 202 and an inside surface of the back sheet 204. A top face 216 defines a first linear or curved surface of the acoustic core 200 and a bottom face 218 defines a second linear or curved surface of the acoustic core. The top face 216 resides adjacent to and oriented towards the inside surface of the acoustic screen 202, and the bottom face 218 resides adjacent to and oriented towards the inside surface of the back sheet 204. The axis R 214 represents a normal line relative to the normal surface corresponding to the top face 216 and/or the bottom face 218. The axis R may be a radial or other axis as determined by context. In this exemplary embodiment, the terms "inner" and "outer" refer to the orientation of the respective layers in relation to the longitudinal axial centerline 118 shown in FIG. 1A.

The acoustic screen 202, the back sheet 204, and the acoustic core 200 may together form an acoustic liner 100 that has an arcuate or cylindrical profile (see, e.g., FIG. 1A), or a linear or planar profile (see, e.g., FIG. 2). Of course, an acoustic liner may have any desired curvilinear profile. By way of example, an acoustic liner 100 may surround a noise source, such as fan blades 110 of a turbomachine 102. The acoustic screen 202 is generally oriented along the flow path to form a smooth and efficient pathway for the engine flow, with the back sheet 204 being more distal from the noise source relative to the acoustic screen 202. As another example, an enclosed volume such as a room or an engine casing may contain a noise source such as noisy machinery, and one or more walls or other aspects of such an enclosed volume may be lined with a substantially planar acoustic liner 100. In exemplary embodiments, an acoustic core 200, an acoustic screen 202, and a back sheet 204, and may together form a complexly curved acoustic liner 100, which, for example, may conform to complexly curved walls or other aspects of a nacelle 104 or other noise source-containing room or space may. For example, FIG. 1A shows an exemplary curved acoustic liner 100 that conforms to the contour of a mounting location, such as a location 114, 120, 122, 124, 126 within a nacelle 104 of a turbomachine 102.

In exemplary embodiments, the acoustic core 200, the acoustic screen 202, and/or the back sheet 204 may be formed using an additive manufacturing technology, which may allow for acoustic liners 100 with novel configuration, geometries, and/or features that provide certain improvements and/or avoid certain shortcomings as compared with previous acoustic liners. Such additive manufacturing technology may be utilized, alone or together with other manufacturing technologies, to provide acoustic liners 100 in accordance with the present disclosure.

For example, an acoustic liner 100 may be formed in whole or in part using an additive manufacturing technology. Sequential layers of the acoustic core 200, the acoustic screen 202, and/or the back sheet 204 may be additively manufactured using a suitable additive manufacturing technology. In exemplary embodiments, the acoustic core 200, the acoustic screen 202, and/or the back sheet 204 may be additively manufactured in such a manner so as to be one and the same component without seams or the like separating elements from one another.

Figure 3A:
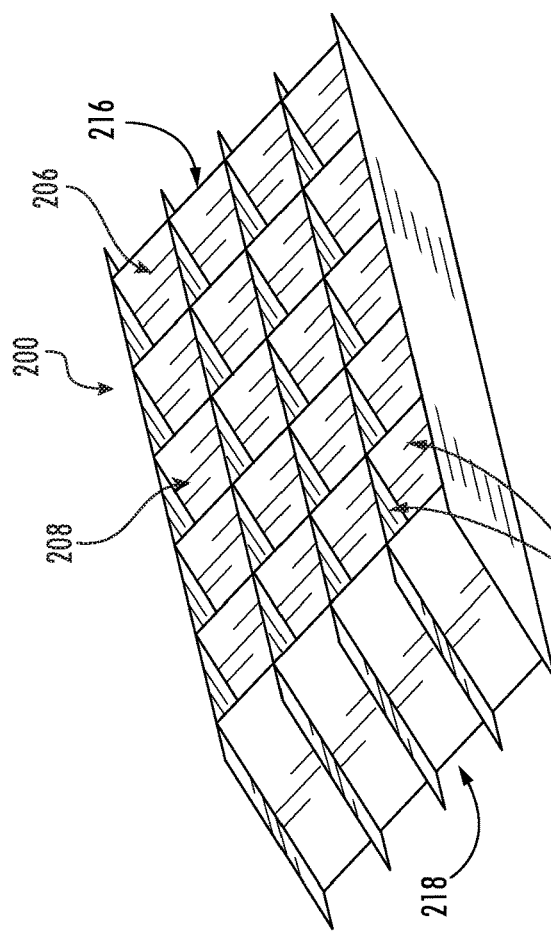
FIGS. 3A-3C respectively depict a top perspective view, a side view, and a bottom perspective view, of an acoustic core.
Figure 3C:
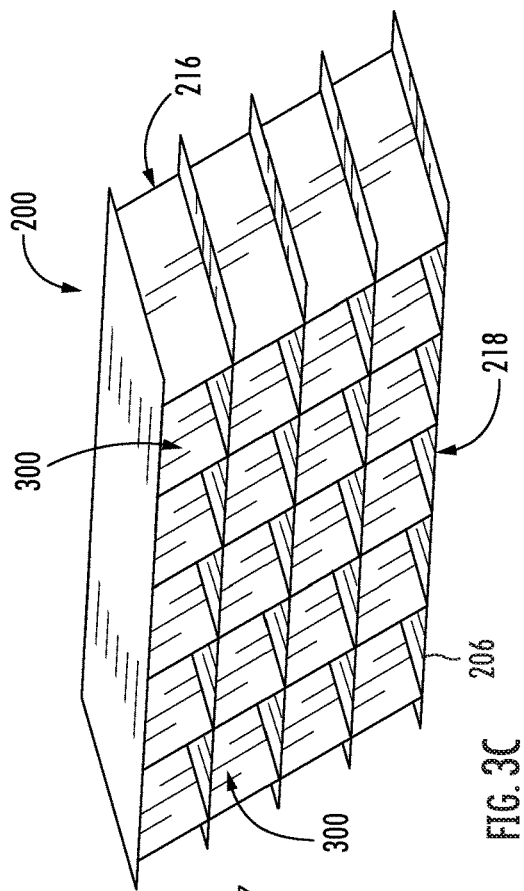
Figure 3B:
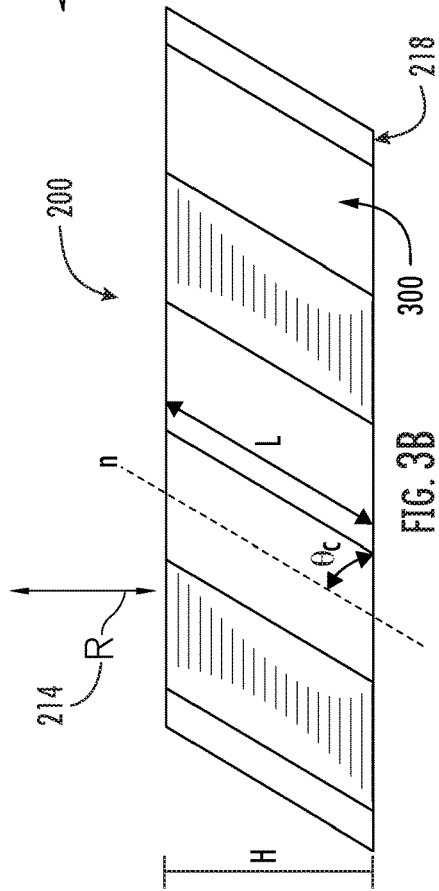

Now turning to FIGS. 3A-3C, exemplary acoustic cores 200 will be described in further detail. As shown, an acoustic core 200 may include an array of resonant cells 206. The resonant cells 206 may have a plurality of cell walls 300 bisected by a top face 216 and a bottom face 218. The resonant cells 206 may have any polyhedral structures or combination of structures, including perpendicular resonant cells and/or oblique resonant cells. Perpendicular resonant cells generally have a longitudinal axis that runs perpendicular to the top face 216 and/or the bottom face 218 and/or substantially parallel to a normal line 214 represented by the axis R. Oblique resonant cells have a resonant space with a longitudinal axis, A, that follows a path equidistant from and locally normal to the cell walls, with the longitudinal axis having an oblique orientation relative to the top face 216 and/or the bottom face 218. The resonant length L of a resonant cell 206 may be determined, for a nominal resonant cell, from the bottom face 218 to the top face 216 as determined along a centerline of the resonant cell. The height H of a resonant cell 206 and/or an acoustic core 200 may be determined from the bottom face 218 to the top face 216 as determined along the normal line 214.

An oblique resonant cell may be oriented obliquely relative to the longitudinal axis, A, of the resonant space at a cell angle $\theta_C$. Oblique resonant cells may include a wide variety of cell angles $\theta_C$ ranging from greater than zero degrees to less than 90 degrees. For example, in exemplary embodiments, an oblique resonant cell may have a cell angle $\theta_C$ of from 5 to 90 degrees, such as from such as from 10 to 85 degrees, such as from 20 to 80 degrees, such as from 30 to 80 degrees, such as from 40 to 80 degrees, such as from 50 to 80 degrees, such as from 60 to 80 degrees, such as from 10 to 45 degrees, such as from 45 to 80 degrees, such as from 30 to 60 degrees, or such as from 35 to 50 degrees. The cell angle $\theta_C$ may be greater than zero degrees, such as such as at least 5 degrees, such as at least 10 degrees, such as at least 20 degrees, such as at least 30 degrees, such as at least 40 degrees, such as at least 50 degrees, such as at least 60 degrees, such as at least 70 degrees, such as at least 80 degrees. The cell angle $\theta_C$ may be less than 90 degrees, such as less than 80 degrees, such as less than 70 degrees, such as less than 60 degrees, such as less than 50 degrees, such as less than 40 degrees, such as less than 30 degrees, such as less than 20 degrees, such as less than 15 degrees, such as less than 10 degrees, such as less than 5 degrees, or such as less than 1 degrees. By comparison, perpendicular resonant cells have a cell angle $\theta_C$ of 90 degrees.

Now referring to FIGS. 4A and 4B, examples of sound wave propagation through one or more apertures will be described. In some embodiments, sound wave propagation characteristics may be tuned to a desired frequency at least in part by the configuration and arrangement of the one or more apertures. An array of resonant cells tuned for attenuation of lower frequency sound waves may include one or more apertures. A reduced-frequency resonant cell may include one or more apertures in a partition and/or a cell wall 300. The one or more apertures may contribute to the reduced-frequency resonant cell exhibiting a lower resonant frequency as compared to a corresponding nominal resonant cell. By way of example, FIGS. 4A and 4B respectively show a partitioned resonant cell 600 with a partition 402 that transects the resonant space 208 and one or more apertures 404 defining a corresponding one or more pathways through the partition 402.

Figure 4A:
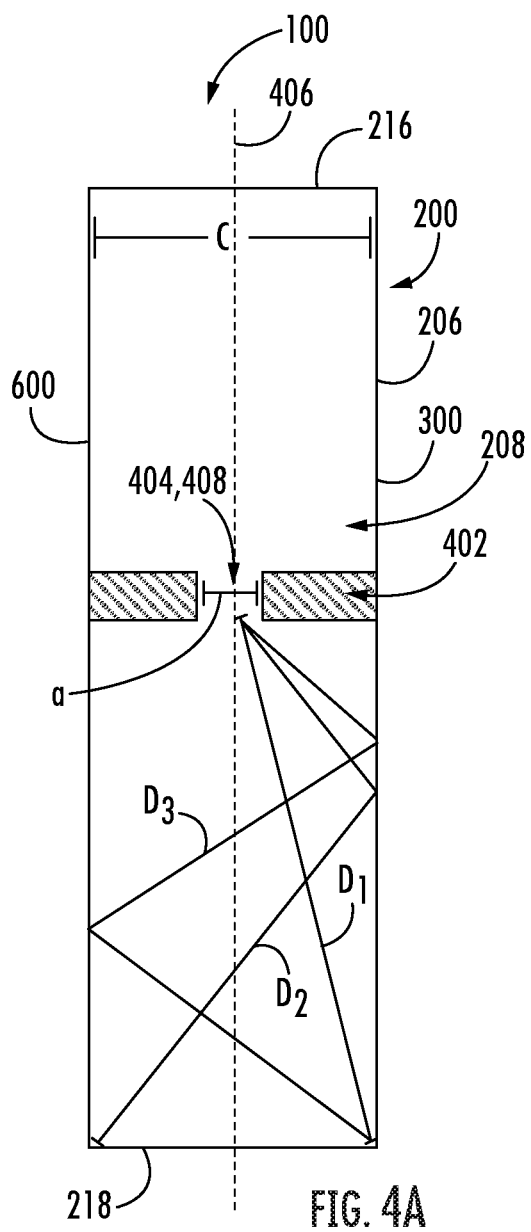
FIGS. 4A and 4B schematically depict exemplary sound paths through an aperture in a resonant cell.
Figure 4B:
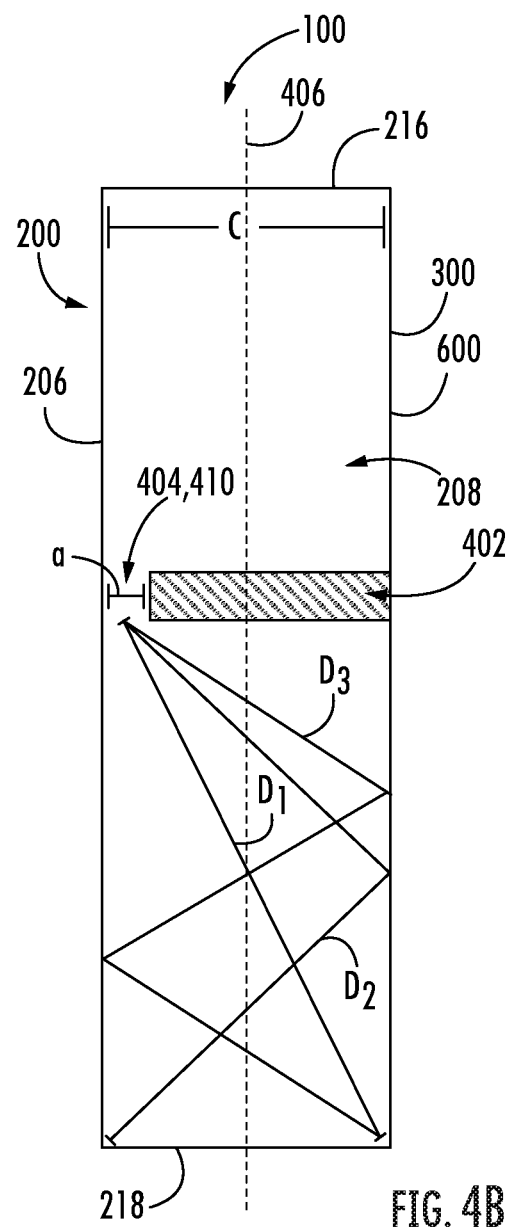

As shown in FIG. 4A, the aperture 404 has a location on the partition 402 aligned with a longitudinal axis 406 of the resonant space 208, which may be referred to as a centered aperture 408. As shown in FIG. 4B, the aperture 404 has a location on the partition 402 offset from the longitudinal axis 406 of the resonant space 208, which may be referred to as an offset aperture 410. The wave propagation distance of a sound wave propagating from an aperture 404 prior to contacting a cell wall 300 or a back sheet 204 can be determined using the Pythagorean theorem. As shown, the propagation distance of a sound wave propagating from an aperture 404 increases when the aperture 404 is offset from the longitudinal axis 406. By way of illustration, exemplary propagation paths show that for a given wave propagation angle, the wave propagation distance ($D_1$, $D_2$ and $D_3$) for an offset aperture 410 exceeds the corresponding wave propagation distance ($D_1$, $D_2$ an $D_3$) for a centered aperture 408. In some embodiments sound waves propagating from an offset aperture 410 may exhibit enhanced reverberation within the resonant space 208 after propagating through the aperture 404.

Additionally, or in the alternative, the resonant frequency of a resonant cell 206 may be reduced by decreasing the cross-sectional area of the aperture 404 relative to the cross-sectional area of the resonant cell. As shown in FIG. 5, the resonant frequency has been shown to depend on an aperture reduction factor β. Resonant cells may be configured to exhibit a resonant frequency selected based at least in part on a relationship between an aperture reduction factor β for an aperture and a resonant frequency of the resonant cell, using the following relationship: $a=c(1-\beta)$, where "a" is the cross-sectional dimension of the aperture 404, "c" is a cross-sectional dimension of the resonant space, and β is a real number selected from the relationship: $0 \leq \beta < 1.0$. The cross-sectional dimension of the aperture, "a" may include a cross-sectional area, or a cross-sectional width. The cross-sectional dimension of the resonant space, "c" may include a cross-sectional area, or a cross-sectional width. Additionally, or in the alternative, for a resonant cell that includes a plurality of apertures 404, the cross-sectional dimension of the aperture 404 "a" may include percent open area.

A relationship between aperture reduction factor β and resonant frequency for a resonant cell configuration may be determined using resonant frequency modeling (e.g., finite element analysis), as will be appreciated by those skilled in the art. The relationship between the aperture reduction factor β and the resonant frequency of a resonant cell and may then be utilized to configure resonant cells with apertures 404 in partitions 402 transecting a resonant space of the resonant cell (e.g., partition-apertures) and/or to configure resonant cells with apertures 404 in cell walls (e.g., wall-apertures). By way of example, such configurations may include selecting a cross-sectional dimension for one or more apertures 404, a cross-sectional dimension for one or more resonant spaces. Such cross-sectional dimensions may be based at least in part on an aperture reduction factor β. In some embodiments, as shown, for example, in FIG. 5, the relationship between the aperture reduction factor β and the resonant frequency of the resonant cell may include a decreasing resonant frequency with increasing aperture reduction factor β. As shown, the relationship may include linear and/or non-linear regions. For example, an initially linear relationship may transition to non-linear relationship (e.g., an asymptotic relationship) with increasing aperture reduction factor β. Other relationships may also be apparent with various resonant cell configurations.

A resonant cell may be configured with any suitable aperture reduction factor β from between 0 to less than 1.0. In exemplary embodiments, an aperture reduction factor β may be from 0.2 to less than 1.0, such as from 0.5 to less than 1.0, such as from 0.7 to less than 1.0, such as from 0.9 to less than 1.0, such as from 0.3 to 0.8, such as from 0.6 to 0.99. A resonant cell may include an aperture 404 with an aperture reduction factor β of at least 0.1, such as at least 0.3, such as at least 0.5, such as at least 0.7, or such as at least 0.9. A resonant cell may include an aperture 404 with an aperture reduction factor β of less than 1.0, such as less than 0.95, such as less than 0.8, such as less than 0.6, or such as less than 0.4.

Now turning to FIGS. 6A-6E, exemplary partition-apertures 404 will be described in further detail. In some embodiments, a resonant cell 206 may include one or more partitions 402 transecting the resonant space 208 of the resonant cell 206. An acoustic core 200 may include an array of resonant cells 206, with at least some of the resonant cells being partitioned resonant cells 600. The partition 402 may transect at least a portion of a resonant space 208, thereby delineating an upper resonant space 602 from a lower resonant space 604. In some embodiments, a partition 402 may be integrally formed with at least one of the one or more cell walls 300 defining the resonant space 208. For example, the resonant cells 206, including the cell walls 300 and the partitions 402 may be produced using an additive manufacturing technology. Additionally, or in the alternative, the resonant cells 206, including the cell walls 300 and/or the partitions 402 may be formed using any other suitable technology.

A partition 402 may transect a corresponding resonant space 208 at an interface angle $\theta_I$ determined from a plane parallel to a bottom face 218 and/or a top face 216 of the acoustic core 200. The partition 402 may include a surface this has an interface angle $\theta_I$ that is parallel, oblique, and/or perpendicular relative to the bottom face 218 and/or a top face 216 of a corresponding resonant cell 206 and/or array of resonant cells 206. As shown in FIGS. 6A and 6C, a partition 402 may transect a resonant space 208 with at least a first surface 606 of the partition 402 having an interface angle $\theta_I$ that is oblique relative to the bottom face 218 and/or the top face 216. Additionally, or in the alternative a partition 402 may transect a resonant space 208 with at least a second surface 608 of the partition 402 having an interface angle $\theta_I$ that is parallel relative to the bottom face 218 and/or the top face 216. For example, as shown in FIGS. 6A and 6C, a partition may include a first surface 606 that has an interface angle $\theta_I$ that is oblique, and a second surface 608 that has an interface angle $\theta_I$ that is parallel, relative to the bottom face 218 and/or the top face 216. In some embodiments, the partition 402 may have a relatively constant cross-sectional thickness, for example, as shown in FIG. 6B.

Figure 6D:
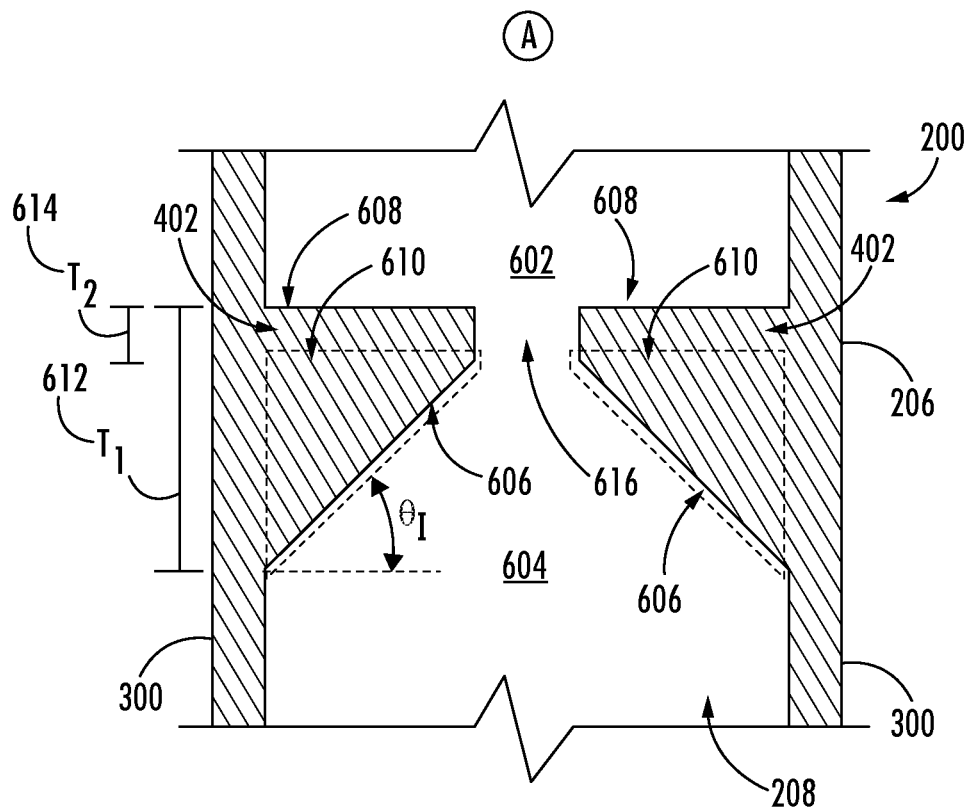
FIGS. 6D and 6E schematically depict enlarged side cross-sectional views of a partition transecting a resonant space of a resonant cell, such as the resonant cell of FIG. 6A or 6C.
Figure 6E:
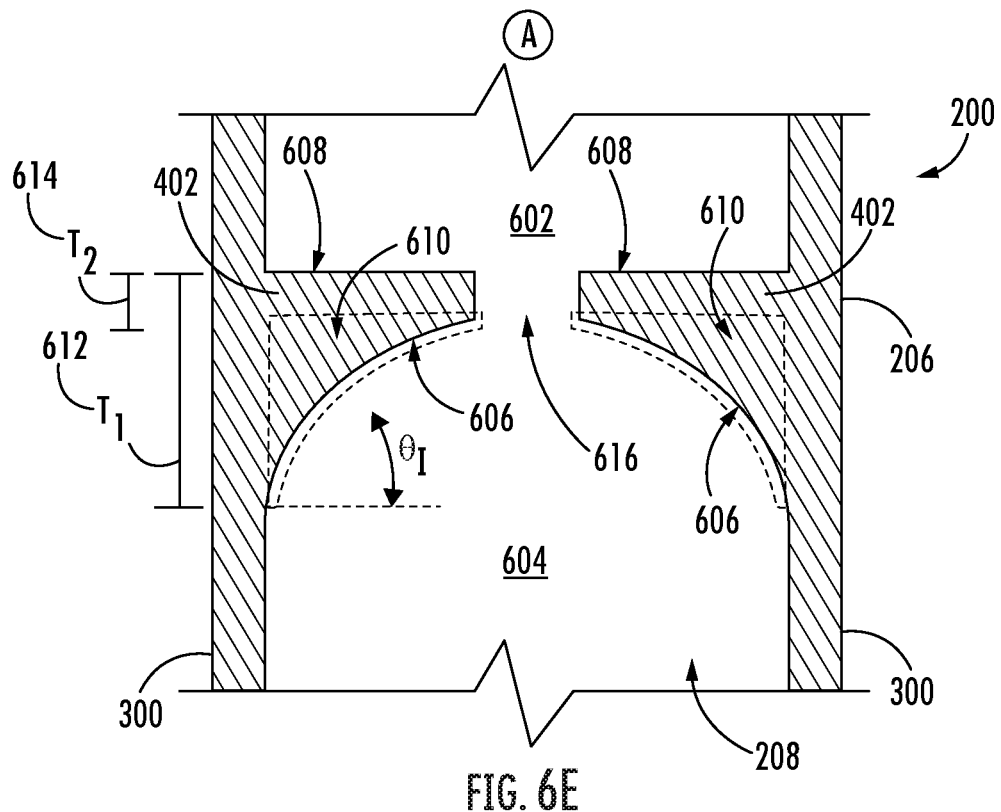

In some embodiments, as shown in FIGS. 6D and 6E, a partition 402 may include at least one buttress 610 such that the partition 402 has a cross-sectional thickness at a region proximal to one or more of the cell walls 300 that exceeds the cross-sectional thickness of the partition 402 at a region distal to the one or more cell walls. The partition 402 may include a cross-sectional thickness that transitions from a proximal cross-sectional thickness $T_1$ 612 at an interface with the cell wall 300 to a distal cross-sectional thickness $T_2$ 614 at a central region of the partition 402. The partition 402 may have a decreasing cross-sectional thickness from the proximal cross-sectional thickness $T_1$ 612 at the interface with the cell wall to the distal cross-sectional thickness $T_2$ 614 at a central region of the partition 402. As shown, the partition 402 may include a first surface 606 that has an oblique interface angle $\theta_I$ oriented towards the back sheet 204 and/or bottom face 218 of the resonant cell 206. Additionally, or in the alternative, a partition 402 may include a second surface 608 that has an oblique interface angle θ$_I$ oriented towards the acoustic screen 202 and/or the top face 216.

In some embodiments, as shown in FIGS. 6A and 6C, a partition 402 may include a first surface 606 that has an oblique interface angle θ$_I$ oriented towards the back sheet 204 and/or bottom face 218 of the resonant cell 206 and a second surface 608 that has a parallel interface angle θ$_I$ oriented towards the acoustic screen 202 and/or the top face 216. Additionally, or in the alternative, as shown in FIG. 6B, a partition 402 may include a first surface 606 that has an oblique interface angle θ$_I$ oriented towards the back sheet 204 and/or bottom face 218 of the resonant cell 206 and a second surface 608 that has an oblique interface angle θ$_I$ oriented towards the acoustic screen 202 and/or the top face 216.

As shown in FIG. 6B, an acoustic screen 202 may be integrally formed with an array of resonant cells 206. The acoustic screen 202 may interface with one or more cell walls 300 of a resonant cell 206 such that at least one surface of the acoustic screen 202 transects the resonant space 208 at an oblique interface angle θ$_I$. Additionally, or in the alternative, a back sheet 204 may be integrally-formed with an array of resonant cells 206. The back sheet 204 may interface with one or more cell walls 300 of a resonant cell 206 such that at least one surface of the back sheet 204 transects the resonant space 208 at an oblique interface angle θ$_I$.

In some embodiments, an acoustic core that was additively manufactured may include partitioned resonant cells 600 with one or more partitions 402 in which a surface 606 facing the direction of the build plane corresponding to the additive manufacturing process transects the resonant space 208 of the resonant cell 206 at an oblique interface angle θ$_I$. The oblique interface angle θ$_I$ may facilitate additively manufacturing the partition 402 despite the partition 402 overhanging the resonant space 208 during the additive manufacturing process.

When additively manufacturing an array of resonant cells 206 from the bottom face 218 to the top face 216 (e.g., in a right-side-up orientation), a partition 402 may be integrally formed with one or more cell walls 300, and the partition 402 may include a surface 606, oriented towards the bottom face 218, transecting the resonant space 208 of the resonant cell 206 at an oblique interface angle θ$_I$, as shown, for example, in FIGS. 6A and 6C. In some embodiments, the additively manufactured array of resonant cells 206 may include a partition 402 with a second surface 608, oriented towards the top face 216, that transects the resonant space 208 at an oblique interface angle θ$_I$, as shown, for example, in FIG. 6B. Additionally, or in the alternative, an array of resonant cells 206 additively manufactured in a right-side-up orientation may include an integrally-formed interface between an acoustic screen 202 and one or more cell walls 300, with a surface 607 of the acoustic screen 202, oriented towards the bottom face 218, that transects the resonant space 208 at an oblique interface angle θ$_I$.

When additively manufacturing an array of resonant cells 206 from the top face 216 to the bottom face 218 (e.g., in an up-side-down orientation), a partition 402 may be integrally formed with one or more cell walls 300, and the partition 402 may include a surface 606, oriented towards the top face 216, transecting the resonant space 208 of the resonant cell 206 at an oblique interface angle θ$_I$. In some embodiments, the additively manufactured array of resonant cells 206 may include a partition 402 with a second surface 608, oriented towards the bottom face 218, that transects the resonant space 208 at an oblique interface angle θ$_I$. Additionally, or in the alternative, an array of resonant cells 206 additively manufactured in an up-side-down orientation may include an integrally-formed interface between a back sheet 204 and one or more cell walls, with a surface of the acoustic screen 202, oriented towards the top face 216, that transects the resonant space 208 at an oblique interface angle θ$_I$.

The interface angle θ$_I$ determined from a plane parallel to a bottom face 218 and/or a top face 216 of the array of resonant cells and/or from a plane parallel to a bottom sheet 204 and/or an acoustic screen 202 of an acoustic core 200. The interface angle θ$_I$ may be selected for suitable buildability of overhanging features using an additive manufacturing technology. However, in some embodiments, all of the interfaces between a partition 402 and a cell wall 300 may be perpendicular. For example, with some additive manufacturing processes and/or with some resonant cell configurations, an oblique interface angle θ$_I$ may be unnecessary. Additionally, or in the alternative, in some embodiments an acoustic core 200 may be manufactured using any other suitable process.

As shown in FIG. 6A, an acoustic screen 202 and/or a back sheet 204 may be attached to the array of resonant cells 206. Additionally, or in the alternative, as shown in FIGS. 6B and 6C, the acoustic screen 202 and/or the back sheet 204 may be at least partially integrally formed with the corresponding one or more cell walls 300 of the resonant cells 206 using an additive manufacturing technology. The acoustic screen 202 and/or the back sheet 204 may be produced using an additive manufacturing technology, with the acoustic screen 202 and/or the back sheet 204 being integrally formed with at least one of the corresponding one or more cell walls 300. Additionally, or in the alternative, the cell walls 300, the acoustic screen 202, and/or the back sheet 204 may be formed using any other suitable technology.

An array of resonant cells 206 may include partitions 402, an acoustic screen 202, and/or a back sheet 204, that transect a resonant space with any desired interface angle θ$_I$. The slope of a partition 402, acoustic screen 202, and/or a back sheet 204 transecting a resonant space 208 may be linear (FIGS. 6D, 7A) or curved (FIGS. 6E, 7B). Various partitions 402 throughout an array of resonant cells 206 may transect respective resonant spaces 208 at respective interface angles θ$_I$ that are uniform or different from one another. Various portions of an acoustic screen 202 and/or back sheet 204 may transect respective resonant spaces 208 at respective interface angles θ$_I$ that are uniform or different from one another.

By way of example, an interface angle θ$_I$ may be from 5 to 90 degrees, such as from such as from 10 to 85 degrees, such as from 20 to 80 degrees, such as from 30 to 80 degrees, such as from 40 to 80 degrees, such as from 50 to 80 degrees, such as from 60 to 80 degrees, such as from 10 to 45 degrees, such as from 45 to 80 degrees, such as from 30 to 60 degrees, or such as from 35 to 50 degrees. The interface angle θ$_I$ may be greater than zero degrees, such as such as at least 5 degrees, such as at least 10 degrees, such as at least 20 degrees, such as at least 30 degrees, such as at least 40 degrees, such as at least 50 degrees, such as at least 60 degrees, such as at least 70 degrees, such as at least 80 degrees. The interface angle θ$_I$ may be less than 90 degrees, such as less than 80 degrees, such as less than 70 degrees, such as less than 60 degrees, such as less than 50 degrees, such as less than 40 degrees, such as less than 30 degrees, such as less than 20 degrees, such as less than 15 degrees, such as less than 10 degrees, such as less than 5 degrees, or such as less than 1 degrees.

As further shown in FIGS. 6A-6D, in some embodiments a partition 402 may include one or more apertures 404 defining a pathway through the partition 402, which may sometimes be referred to as a partition-aperture 616. An array of resonant cells 206 may include at least some resonant cells 206 that have a partition 402, and at least some of the partitions 402 may include one or more partition-apertures 616 defining a pathway between an upper resonant space 602 and a lower resonant space 604. The one or more partition-apertures 616 may be formed in the partition 402 during the additive manufacturing process by leaving areas of unsolidified build material at selected locations of the partition 402. Generally, when additively manufacturing the partitions 402, build material will be solidified in a manner that propagates from the cell walls 300 inward such that the partition 402 is cantilevered from the cell wall 300. The one or more partition-apertures 616 may be configured and arranged in a manner that allows the partition 402 to be sufficiently supported by the cell walls 300. Partitions 402 may be formed in this manner with partition-apertures 616 that have various configurations and arrangements.

Further exemplary partitions 402 with partition-apertures 616 are shown in FIGS. 7A-7D, 8A-8D, and 9A-9F. In some embodiments, a partition 402 may include a single partition-aperture 616. Additionally, or in the alternative, a partition 402 may include a plurality of partition-apertures 616. A partition-aperture 616 may be centered between the cell walls 300 of a resonant cell 206, as shown in FIGS. 7A-7D. Additionally, or in the alternative, a partition-aperture 616 may be offset relative to the center point of the resonant cell 206, as shown in FIGS. 8A-8D. The partition 402 may include a single partition-aperture 616, as shown for example in FIGS. 7A-7D and FIGS. 8A and 8B, or a plurality of partition-apertures 616, as shown for example in FIGS. 8C and 8D, and FIGS. 9A-9F. As compared to a partition-aperture 616 that is centered on the partition 402, a partition-aperture 616 that is offset on the partition 402 may reduce build material while maintaining suitable buildability of overhanging features using an additive manufacturing technology. Additionally, or in the alternative, as compared to a partition-aperture 616 that is centered on the partition 402, a partition-aperture 616 that is offset on the partition 402 may increase wave propagation distance, which may enhance attenuation of low frequency sound waves as described above with reference to FIGS. 4A and 4B and FIG. 5.

Figure 7A:
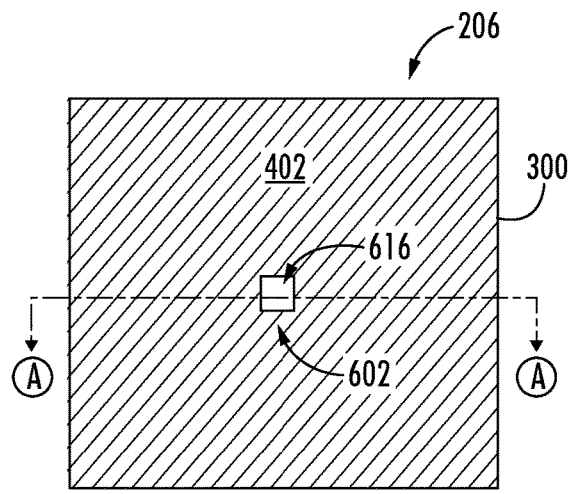
FIGS. 7A-7C schematically depict facing views of exemplary partition-apertures defining a pathway through a partition or exemplary wall-apertures defining a pathway through a cell wall of a resonant cell.
Figure 7B:
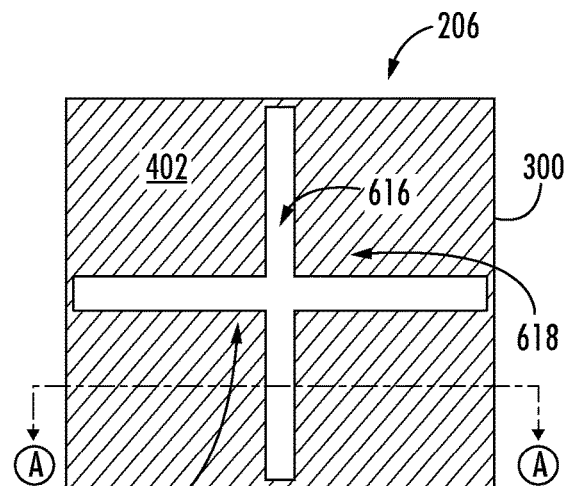
Figure 7C:
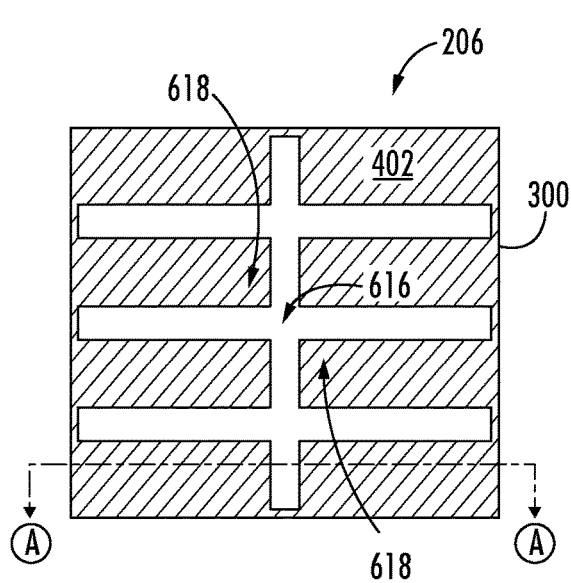
Figure 7D:
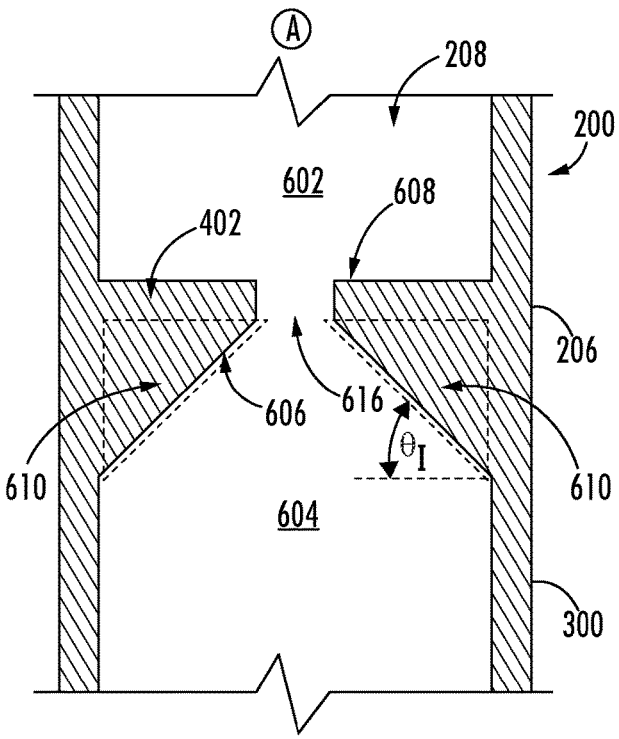
FIG. 7D schematically depicts a side cross-sectional view of an exemplary partition that includes a partition-aperture such as shown in FIGS. 8A-8C.

As shown in FIG. 7A, a partition 402 may have a partition-aperture 616 situated at a midward location 602 of the partition 402, such as at the center of the partition 402. As shown in FIGS. 7B and 7C, a partition 402 may have a partition-aperture 616 configured and arranged in the form of a plurality of slots or grooves defined by respective portions of the partition 402 cantilevered from one or more of the cell walls 300. FIG. 7D shows an exemplary cross-sectional view of the partition-aperture 616 of FIGS. 7A, 7B, or 7C, illustrating the cantilevered portions of the partition 402.

As shown in FIGS. 9A-9F, a partition 402 may include a plurality of partition-apertures 616. Any number of partition-apertures 616 may be provided in a partition 402 by carefully selecting a configuration and arrangement that allows the partition 402 to be adequately supported by the cell walls 300. For example, as shown in FIGS. 7B and 7C, and FIGS. 9A and 9B, a partition 402 may include a plurality of cantilevered portions 618 that extend from adjacent cell walls 300. The cantilevered portions 618 may unite with one another at a midward location 602 of the partition 402.

Additionally, or in the alternative, a partition 402 may include a partition-aperture array 620 defining an array of pathways, as shown, for example in FIGS. 9C and 9D, FIGS. 9E and 9F. The partition-aperture array 620 may have partition-apertures 616 configured and arranged with a uniform pattern or spacing, as shown for example in FIGS. 9C and 9D. Additionally, or in the alternative, the partition-aperture array 620 may have partition-apertures 616 configured and arranged with plurality of shapes and/or sizes, as shown for example in FIGS. 9E and 9F.

Now turning to FIGS. 10A-10D, in some embodiments, an array of resonant cells 206 may include one or more apertures 404 defining a pathway through a cell wall 300. Such an aperture 404 may sometimes be referred to as a wall-aperture 1000. In various embodiments, a wall-aperture 1000 may span all or a portion of a cell wall 300, as shown for example in FIG. 10B. As shown, one or more cell walls 300 or portions thereof may define the perimeter of a wall-aperture 1000. Additionally, or in the alternative, the wall-aperture may include one or more aperture walls 1002, as shown for example in FIGS. 10C and 10D. The one or more aperture walls 1002 may define a plurality of wall-apertures 1000 therebetween. The one or more aperture walls 1002 may be integrally formed with adjacent cell walls 300 using an additive manufacturing technology and/or any other suitable technology. Any number of wall-apertures 1000 may be provided in a cell wall 300 and/or between aperture walls 1002 by carefully selecting a configuration and arrangement that allows the aperture wall 1002 to be adequately supported, and for the aperture wall 1002 to adequately support the cell wall 300. The aperture walls 1002 and corresponding wall-apertures 1000 may be provided with various configurations and arrangements, including, without limitation, the apertures 404 described above with reference to partition-apertures 616.

A wall-aperture adjoining the respective resonant spaces of resonant cells (coupled resonant cells), may be configured as a reduced-frequency resonant cell. In exemplary embodiments, a wall-aperture 1000 may be positioned at an offset location in the cell wall 300 similarly to offset partition-apertures 616, as described above with reference to FIGS. 4A and 4B, and FIG. 5. For example, a wall-aperture 1000 may be located at an offset position in a cell wall 300, such as proximal to the bottom face 218 and/or proximal to the back place 204, as shown in FIGS. 10A-10D. The target resonant frequency for the coupled resonant cells may also be selected based at least in part on the size of the wall-aperture 1000 according to the aperture reduction factor relationship: $a=c(1-\beta)$.

Figure 11:
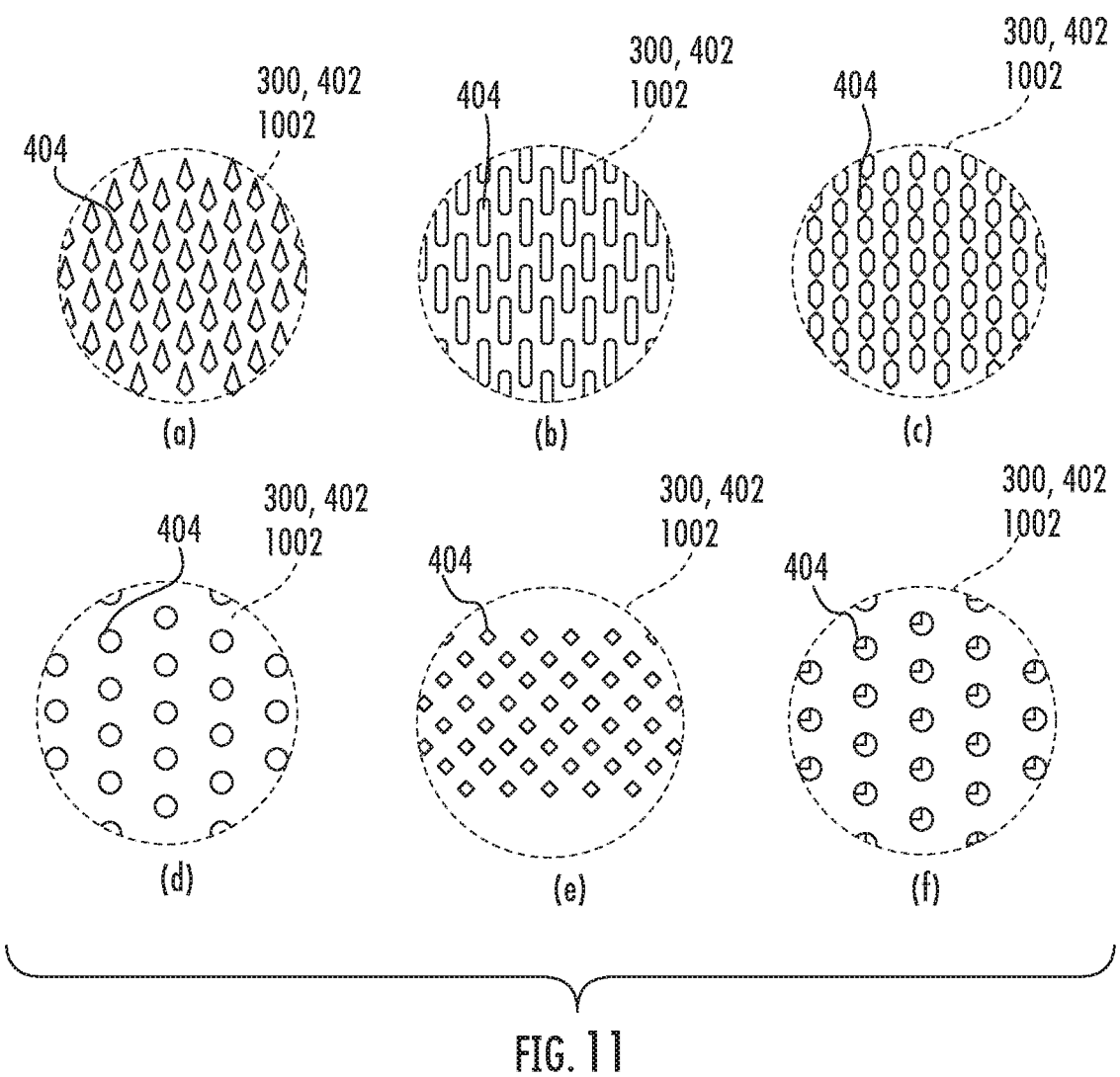
FIG. 11 schematically depict additional exemplary aperture configurations.

FIG. 11 shows several further exemplary configurations and arrangements of apertures 404, any one or more of which may be incorporated into a partition 402, a cell wall 300, and/or aperture wall 1002. As shown, exemplary embodiments may include apertures 404 with polyhedral and/or elliptical cross-sectional shapes. For example, embodiments (a), (c), and (e) include polyhedral apertures 404, and embodiment (b), (d), and (f) include elliptical apertures 404. More particularly, embodiment (e) includes rectangular apertures 404; embodiment (a) includes teardrop apertures 404; embodiment (c) include hexagonal apertures 404; embodiments (b) and (c) include elongate apertures 404; and embodiments (d) and (f) include circular apertures 404. It will be appreciated that combinations of polyhedral and/or elliptical path apertures 404 are also within the scope of the present disclosure. In some embodiments, the apertures 404 may be oriented in an array, or a staggered array. For example, as shown with the embodiment (d), adjacent apertures 404 may be oriented in a perpendicular direction of unequal distance from one another. The apertures 404 may be arranged in any desired orientation about a partition 402, a cell wall 300, and/or aperture wall 1002, including an ordered or random or semi-random orientation.

Now turning to FIGS. 12A and 12B, exemplary resonant cell groups 1200 will be described. As shown, a resonant cell group may include at least one coupled resonant cell 1202 matched or grouped with one or more complementary resonant cells 206, such as a high-frequency resonant cell and/or an intermediate-frequency resonant cell. The coupled resonant cell 1202 and/or the complementary resonant cells 206 of a resonant cell group 1200 may be configured as reduced-frequency resonant cells. As shown, coupled resonant cells 1202 may include at least one cell wall 300 that has one or more apertures 404 (e.g., wall-apertures 1000) defining a pathway between an antecedent resonant space 1204 and a subsequent resonant space 1206. The antecedent resonant space 1204 and the subsequent resonant space 1206 may sometimes be referred to collectively as a coupled resonant space 1208. In some embodiments, the coupled resonant space 1208 may exhibit a relatively low resonant frequency. A coupled resonant cell 1202 may be configured to attenuate any desired resonant frequency. In exemplary embodiments, a coupled resonant cell 1202 may be configured to attenuate a relatively low resonant frequency. A coupled resonant cell 1202 may be configured as a low-frequency resonant cell. A coupled resonant cell 1202 may have a resonant length that exceeds the height or axial length of the coupled resonant cell 1202 and/or the height of the acoustic core 200 that includes the coupled resonant cell 1202.

As shown in FIGS. 12A and 12B, in some embodiments, coupled resonant cells 1202 may include a partition 402 transecting at least a portion of a resonant space 208. For example, a partition 402 may delineate an upper resonant space 602 from a lower resonant space 604. The lower resonant space 604 may define at least a portion of the coupled resonant space 1208. The upper resonant space 602 may exhibit a relatively high resonant frequency. The lower resonant space 604 and/or the coupled resonant space 1208 may exhibit a relatively low resonant frequency. As shown in FIG. 12A, in some embodiments, a resonant cell group 1200 may include a coupled resonant space 1208 grouped or matched with a resonant space 208 that has a relatively high resonant frequency, such as an upper resonant space 602 on an opposite side of a partition 402. Additionally, or in the alternative, as shown in FIG. 12B, a resonant cell group 1200 may include one or more intermediate-frequency resonant cells 1210 respectively defining an intermediate resonant space 1212. As shown, an intermediate-frequency resonant cell may be at least partially adjacent to and/or at least partially surrounded by at least one coupled resonant cell 1202. An intermediate-frequency resonant cell may share one or more cell walls 300 with an antecedent resonant space 1204 and/or a subsequent resonant space of a coupled resonant cell 1202. An intermediate-frequency resonant cell may exhibit a relatively intermediate resonant frequency. When a resonant cell group 1200 includes an intermediate-frequency resonant cell 1210, a coupled resonant space 1208 may include a medial resonant space 1214 disposed between the antecedent resonant space 1204 and the subsequent resonant space 1206. For example, as shown in FIG. 12B, the medial resonant space 1214 may be proximal to the bottom face 218 of an array of resonant cells 206, such as between the intermediate-frequency resonant cell 1210 and the back sheet 204 of an acoustic core 200. As shown in FIG. 12B, the pathway between the antecedent resonant space 1204 and the subsequent resonant space 1206 may transect an intermediate-frequency resonant cell 1210. The intermediate-frequency resonant cell 1210 may include a partition 402 separating the pathway from the intermediate resonant space 1212. The partition 402 separating the pathway from the intermediate resonant space 1212 may delineate the medial resonant space 1214, and the medial resonant space 1214 may define at least part of the pathway between the antecedent resonant space 1204 and the subsequent resonant space 1206. In some embodiments, the partition 402 may be perpendicular to one or more cell walls 300 of the resonant cell group 1200.

As shown, for example, in FIG. 12A, the longitudinal axis, A, of a coupled resonant cell 1202 follows a path equidistant from and locally normal to the cell walls 300 defining the antecedent resonant space 1204 and the subsequent resonant space 1206 of the coupled resonant cell 1202. As shown, for example, in FIG. 12B, the axial length, L, of a coupled resonant cell 1202 may extend from a top face 216 delimiting the antecedent resonant space 1204 to a partition 402 delimiting the subsequent resonant space 1206, along the longitudinal axis, A, equidistant from and locally normal to the respective cell walls 300. In exemplary embodiments, a cross-sectional dimension "a" of a wall-aperture 1000 defining a pathway between the antecedent resonant space 1204 and the subsequent resonant space 1206 may be less than a cross-sectional dimension "$c_1$" of the antecedent resonant space 1204. Additionally, or in the alternative, the cross-sectional dimension "a" of the wall-aperture 1000 may be less than a cross-sectional dimension "$c_2$" of the subsequent resonant space 1206. The cross-sectional dimension "$c_1$" of the antecedent resonant space 1204 and/or the cross-sectional dimension "$c_2$" of the subsequent resonant space 1206 may be determined adjacent to the more wall-aperture 1000. As shown in FIG. 12B, when the resonant cell group 1200 includes an intermediate-frequency resonant cell 1210, the corresponding coupled resonant cell 1202 may include a medial resonant space 1214.

The cross-sectional dimension "$a_1$" of the wall-aperture 1000 and/or the medial resonant space 1214 adjacent to the antecedent resonant space 1204 may be less than a cross-sectional dimension "$c_1$" of the antecedent resonant space 1204. Additionally, or in the alternative, the cross-sectional dimension "$a_2$" of the wall-aperture 1000 and/or the medial resonant space 1214 adjacent to the subsequent resonant space 1206 may be less than a cross-sectional dimension "$c_2$" of the subsequent resonant space 1206.

The cross-sectional dimension of one or more wall-apertures 1000 defining a pathway between an antecedent resonant space 1204 and a subsequent resonant space 1206 may be determined based at least in part on an aperture reduction factor β. Additionally, or in the alternative, a cross-sectional dimension "$c_1$" of the antecedent resonant space 1204 and/or a cross-sectional dimension "$c_2$" of the subsequent resonant space 1206 may be determined based at least in part on an aperture reduction factor β. The aperture reduction factor β may be determined based at least in part on a relationship between the aperture reduction factor β and the resonant frequency of the resonant cell.

Now turning to FIGS. 13A-13H, in some embodiments an array of resonant cells 206 may include oblique resonant cells 1300. Additionally, or in the alternative, a resonant cell group 1200 may include oblique resonant cells 1300. The oblique resonant cells 1300 may include at least one surface oriented obliquely relative to the top face 216 and/or the bottom face 218. Additionally, or in the alternative, the oblique resonant cells 1300 may include at least one surface may be oriented perpendicularly relative to the top face 216 and/or the bottom face 218. The oblique resonant cells 1300 may be configured as reduced-frequency resonant cells. In some embodiments, as shown in FIGS. 13A-13H, oblique resonant cells 1300 may provide for a longer resonant length for a given acoustic core 200 height as compared to resonant cells 206 with cell walls 300 that are oriented perpendicularly or radially relative to the bottom face 218 or top face 216 of the acoustic core 200. An oblique resonant cell 1300 may be configured as low-frequency resonant cell. An oblique resonant cell 1300 may exhibit a resonant length that exceeds the height or axial length of the oblique resonant cell 1300 and/or the height of the acoustic core 200 that includes the oblique resonant cell 1300. FIGS. 13A-13H show the longitudinal axis, A, of the antecedent resonant space 1204. The longitudinal axis, A, of the coupled resonant space 1208 would extend through both the antecedent resonant space 1204 and the coupled resonant space 1208, as shown, for example in FIG. 12A.

As shown, for example, in FIGS. 13A and 13B, oblique resonant cells 1300 may be configured and arranged as coupled resonant cells 1202, providing a coupled resonant space 1208 with a relatively lower resonant frequency. As shown, a coupled resonant space 1208 may be transected by a partition 402. The partition 402 transecting the coupled resonant space 1208 may delineate a high-frequency resonant cell 1302 that defines a high-frequency resonant space 1304. A resonant cell group 1200 may include the coupled resonant cell 1202 grouped or matched with the high-frequency resonant cell 1302. In some embodiments, as shown in FIG. 13B, the partition 402 may include one or more partition-apertures 616 defining a pathway between the coupled resonant space 1208 and the high-frequency resonant space 1304, allowing acoustic interaction between therebetween.

In some embodiments, a partition 402 may be perpendicular to one or more cell walls 300 of the resonant cell group 1200. For example, a partition 402 may be perpendicular to one or more cell walls 300 of the oblique resonant cells 1300. Additionally, or in the alternative, a partition 402 may be perpendicular to a cell wall 300 of a resonant cell 206 that is oriented obliquely relative to the longitudinal axis, A, of the resonant space 208 at a cell angle $\theta_C$. For example, the partition 402 may be perpendicular to a cell wall 300 that has a cell angle $\theta_C$ of from 5 to 90 degrees, such as from such as from 10 to 85 degrees, such as from 20 to 80 degrees, such as from 30 to 80 degrees, such as from 40 to 80 degrees, such as from 50 to 80 degrees, such as from 60 to 80 degrees, such as from 10 to 45 degrees, such as from 45 to 80 degrees, such as from 30 to 60 degrees, or such as from 35 to 50 degrees. The cell angle $\theta_C$ may be greater than zero degrees, such as such as at least 5 degrees, such as at least 10 degrees, such as at least 20 degrees, such as at least 30 degrees, such as at least 40 degrees, such as at least 50 degrees, such as at least 60 degrees, such as at least 70 degrees, such as at least 80 degrees. The cell angle $\theta_C$ may be less than 90 degrees, such as less than 80 degrees, such as less than 70 degrees, such as less than 60 degrees, such as less than 50 degrees, such as less than 40 degrees, such as less than 30 degrees, such as less than 20 degrees, such as less than 15 degrees, such as less than 10 degrees, such as less than 5 degrees, or such as less than 1 degrees. By comparison, perpendicular resonant cells have a cell angle $\theta_C$ of 90 degrees.

Figure 13C:
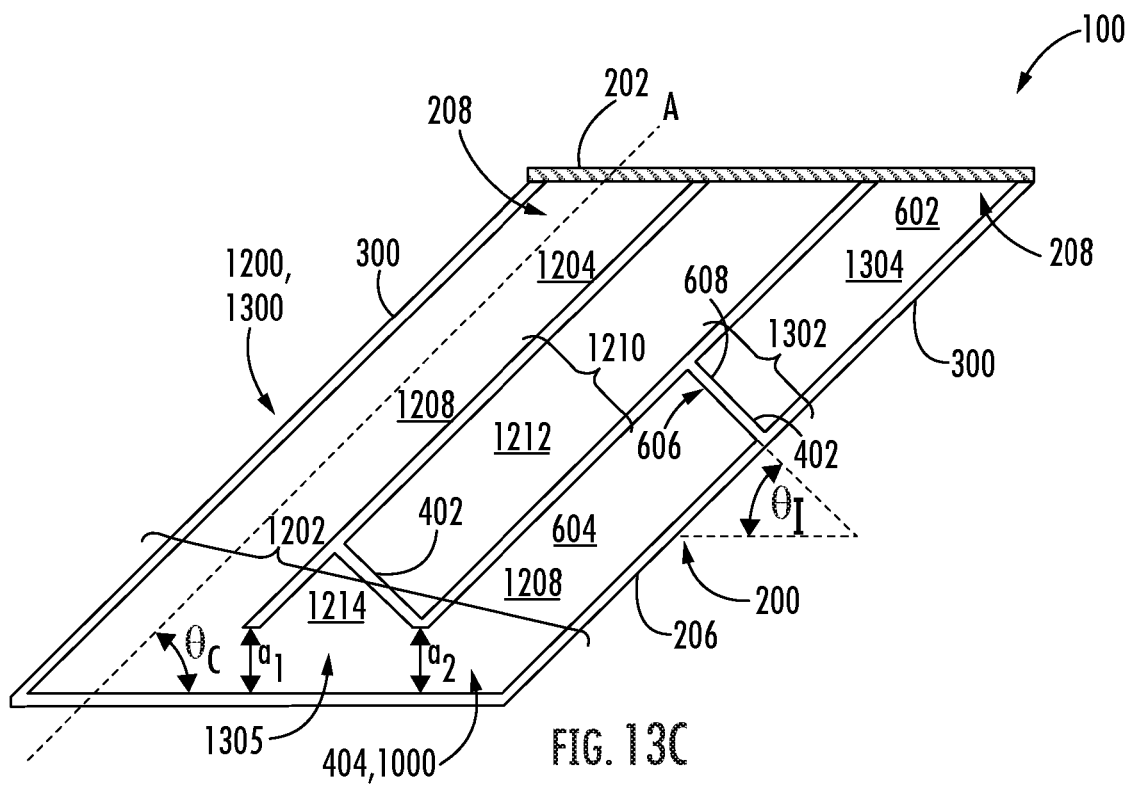
Figure 13D:
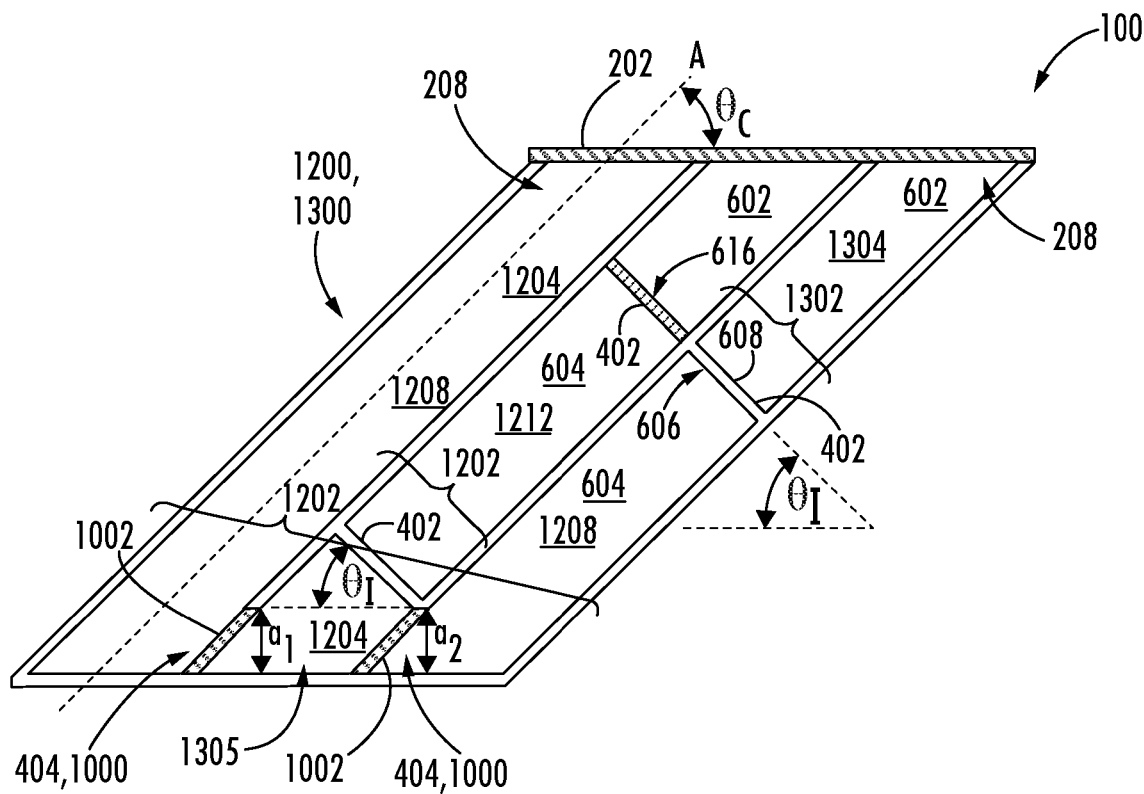

As shown in FIGS. 13C-13F, in some embodiments, an array of resonant cells 206 may include one or more coupled resonant cells 1202 matched with one or more intermediate-frequency resonant cells 1210 and/or one or more high-frequency resonant cells 1302. The intermediate-frequency resonant cell 1210 may include a partition 402 separating a pathway 1305 from the intermediate resonant space 1212. An intermediate-frequency resonant cell 1210 may define an intermediate resonant space 1212, and a high-frequency resonant cell 1302 may define a high-frequency resonant space 1304. The intermediate resonant space 1212 may have a resonant frequency that is greater than the resonant frequency of the coupled resonant space 1208 and/or less than the resonant frequency of a high-frequency resonant space 1304. In some embodiments, as shown, for example, in FIGS. 13D and 13E, an intermediate-frequency resonant cell 1210 may include a partition 402 delineating an upper resonant space 602 from a lower resonant space 604. As shown in FIG. 13D, the partition 402 may include one or more partition-apertures 616 defining a pathway between the upper resonant space 602 and the lower resonant space 604.

In some embodiments, as shown, for example, in FIG. 13F, a plurality of couple resonant cells 1202 may define respective ones of a plurality of antecedent resonant spaces 1204 that converge into a subsequent resonant space 1206. For example, a first wall-aperture 1000 may define a pathway between a first antecedent resonant space 1204 and a subsequent resonant space, and a second wall-aperture 1000 may define a pathway between a second antecedent resonant space 1204 and the subsequent resonant space 1206.

Now turning to FIGS. 13G and 13H, in some embodiments, a resonant cell group 1200 may include one or more converging resonant cells 1306 and/or one or more diverging resonant cell 1308. A converging resonant cell includes one or more cell walls 300 that converge with one another such that the top face 216 of the resonant cell 206 has a larger cross-sectional area than the bottom face 218 of the resonant cell. A diverging resonant cell 1308 includes one or more cell walls 300 that diverge relative to one another such that the top face 216 of the resonant cell has a smaller cross-sectional area than the bottom face 218 of the resonant cell 206. Converging resonant cells 1306 and/or diverging resonant cells 1308 may be described by a convergence ratio, which refers to a ratio of the cross-sectional area of the top face 216 of the resonant cell 206 to the cross-sectional area of the bottom face 218 of the resonant cell 206. Converging resonant cells 1306 have a convergence ratio greater than 1.0, and diverging resonant cells 1308 have a diverging ratio of less than 1.0. In some embodiments, the resonant frequency of a resonant cell 206 may depend at least in part on the convergence ratio of the resonant cell 206. The convergence ratio for a resonant cell 206 may be selected based at least in part on a desired resonant frequency resulting from the convergence ratio. Additionally, or in the alternative, in some embodiments, a convergence ratio may be selected based at least in part on a desired curvature of a resonant cell 206, resonant cell group 1200, and/or acoustic core 200 resulting from the convergence ratio, such as in the case of a curved or complexly curved acoustic core 200. For example, a curved acoustic liner 100 (see, e.g., FIG. 1A) may include an acoustic core 200 with at least some converging resonant cells 1306 and/or at least some diverging resonant cells 1308. Additionally, or in the alternative, converging resonant cells 1306 and/or diverging resonant cells 1308 may have a cell angle $\theta_C$ selected based at least in part on a desired resonant frequency resulting from the cell angle $\theta_C$ and/or based at least in part on desired curvature of a resonant cell 206, resonant cell group 1200, and/or acoustic core 200 resulting from the convergence ratio. The resonant frequency of a resonant cell 206 may depend on a combination of the convergence ratio and cell angle $\theta_C$.

As shown in FIG. 13G, in some embodiments, a resonant cell group 1200 may include one or more intermediate-frequency resonant cells 1210 situated between coupled resonant cells 1202. In some embodiments, an intermediate-frequency resonant cell 1210 may have one or more cell walls 300 that converge and/or adjoin with one another. For example, as shown in FIG. 13G, one or more cell walls 300 may adjoin at an aperture wall 1002 defining a wall-aperture 1000.

It will be appreciated that any combination of resonant cells 206 may be provided that include any one or more of the features described herein as well as combinations thereof. For example, any combination of complementary resonant cells 206 may be provided in accordance with the present disclosure, including any combination of high-frequency resonant cells 1302, intermediate-frequency resonant cells 1210, and/or low-frequency resonant cells (e.g., coupled resonant cells 1202, oblique resonant cells 1300, etc.). Additionally, coupled resonant cells 1202 and oblique resonant cells 1300 may include any combination of high-frequency resonant cells 1302, intermediate-frequency resonant cells 1210, and/or low-frequency resonant cells. In some embodiments, a resonant cell group 1200 may include two, three, four, five, or more resonant cells 206 with configurations that differ from one another. Additionally, or in the alternative, a resonant cell group 1200 may include a plurality of resonant cell subgroups. For example, a first subgroup may include first group of complementary resonant cells, and a second group of complimentary resonant cells, in which the first group of complementary resonant cells is complementary to the second group of complementary resonant cells. By way of example, the first group of complementary resonant cells may include a high-frequency resonant cell 1302, an intermediate-frequency resonant cell 1210, and/or a low-frequency resonant cell (e.g., a coupled resonant cell 1202, an oblique resonant cell 1300, etc.) that are respectively matched or grouped with one another so as to define first a resonant cell group, or a first resonant cell subgroup. The second group of complementary resonant cells may include a high-frequency resonant cell 1302, an intermediate-frequency resonant cell 1210, and/or a low-frequency resonant cell e.g., a coupled resonant cell 1202, an oblique resonant cell 1300, etc.) that are respectively matched or grouped with one another so as to define second a resonant cell group, or a second resonant cell subgroup. At least some of the resonant cells in the first resonant cell group or subgroup may differ from the corresponding resonant cells in the second resonant cell group or subgroup. For example, a first high-frequency resonant cell 1302 in the first resonant cell group or subgroup may differ from a second high-frequency resonant cell 1302 in the second resonant cell group or subgroup, and/or a first intermediate-frequency resonant cell 1210 in the first resonant cell group or subgroup may differ from a second intermediate-frequency resonant cell 1210 in the second resonant cell group or subgroup, and/or a first low-frequency resonant cell in the first resonant cell group or subgroup may differ from a second low-frequency resonant cell in the second resonant cell group or subgroup. Accordingly, a resonant cell group 1200 may include any combination of resonant cells 206 that provides a desired acoustic treatment.

Figure 14A:
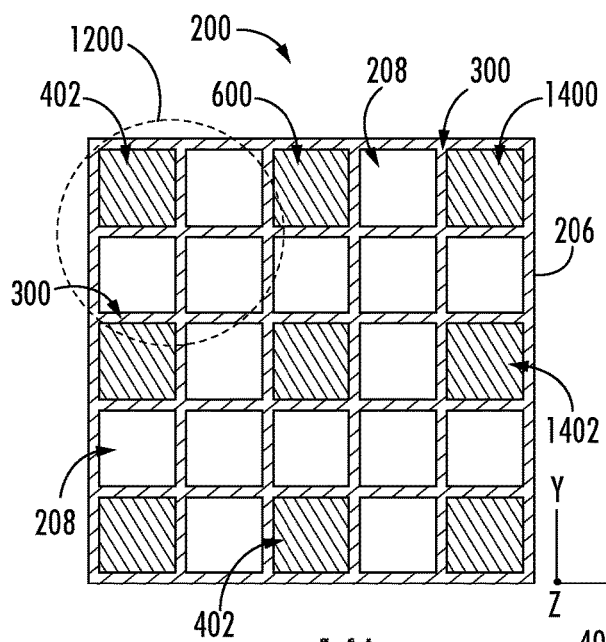
Figure 14B:
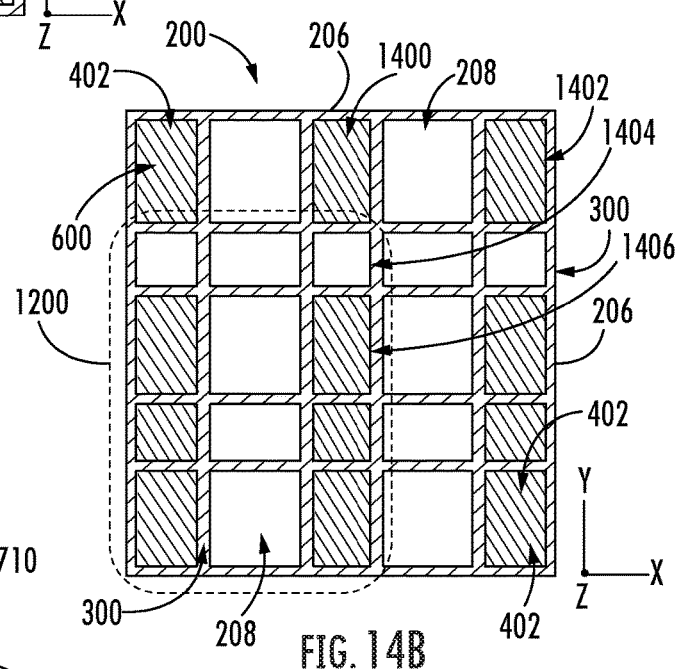
Figure 14C:
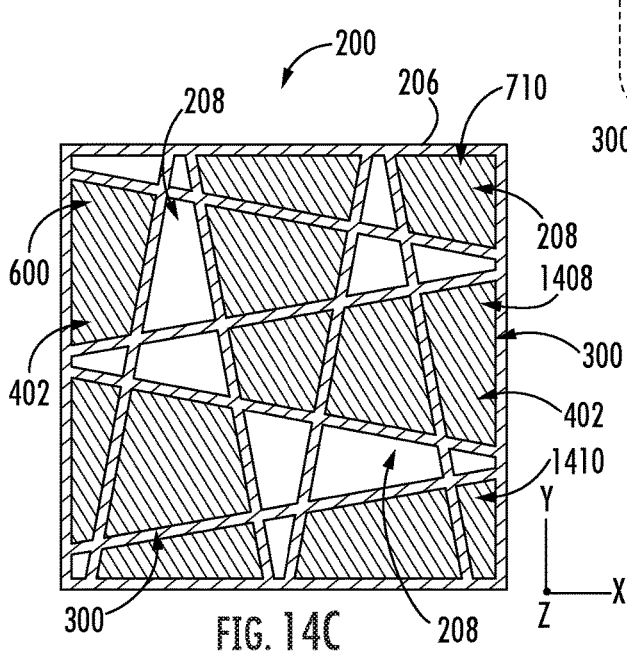

Now turning to FIGS. 14A-14C, exemplary configurations for an array of resonant cells 206 will be further described. When additively manufacturing an array of resonant cells 206, manufacturability and/or build quality may be enhanced in some embodiments by configuring resonant cells 206, cell walls 300, and/or partitions 402 that are aligned with one another such that contour paths followed by an additive manufacturing energy beam and/or additive manufacturing tool extend across at least some adjacent resonant cells 206. For example, an array of resonant cells 206 may include one or more cell walls 300 that are aligned along a linear or curvilinear trajectory that extends across a plurality of resonant cells 206. Additionally, or in the alternative, an array of resonant cells may include one or more partitions 402 that are aligned along a linear or curvilinear trajectory that extends across a plurality of resonant cells 206. Such alignment may allow the additive manufacturing energy beam and/or tool to maintain continuous operation while traversing adjacent cell walls 300 and/or adjacent partitions 402. Such continuous operation may provide for improved integration between adjacent cell walls 300, between adjacent partitions 402, and/or between cell walls 300 and partitions 402. Additionally, such alignment may allow for decreased manufacturing time by reducing transition times between separated contour paths. However, such alignment between resonant cells 206, cell walls 300, and/or partitions 402 is described by way of example and not to be limiting. In fact, other configurations and operating methods are contemplated, including partitions 402 and/or cell walls 300 with staggered, patterned, or random orientations.

By way of example, FIGS. 14A-14F show top views of exemplary arrays of resonant cells 206. As shown, exemplary resonant cells 206 may be aligned with one another in the x-direction and/or in the y-direction. Such alignment of resonant cells 206 may allow for the cell walls 300 of adjacent resonant cells 206 to be integrally formed with one another, such as with interconnected contours. For example, a continuous cell wall 300 may extend across a plurality of resonant cells 206. The cell walls 300 may exhibit a linear cross-section (FIGS. 14A-14C) or curvilinear cross-section (FIGS. 14D-14F). The cross-section of a cell wall 300 may be determined along a curve parallel to the top face 216 and/or the bottom face 218 of the resonant cell. The cell walls 300 may form a grid, with resonant cells 206 having a uniform cross-sectional area (FIGS. 14A, 14D) or non-uniform cross-sectional area (FIGS. 14B, 14C, 14E, 14F). The cross-sectional area of at least some of the resonant cells 206 in an array of may include a partition 402. The resonant cells 206 that include a partition 402 may be staggered or offset relative to one another in the x-direction and/or the y-direction. For example, FIG. 14A shows a plurality of partitioned resonant cells 600 that are staggered or offset relative to one another. As shown, the partitioned resonant cells 600 may include a first partitioned resonant cell 1400 staggered or offset from a second partitioned resonant cell 1402 by at least one adjacent resonant cell 206. The stagger or offset may form a pattern, such as an alternating pattern.

Additionally, or in the alternative, at least some of the partitioned resonant cells 600 may be aligned with one another in the x-direction and/or the y-direction. For example, FIGS. 14B-14F respectively show an exemplary array of resonant cells 206 that includes a plurality of partitioned resonant cells 600 that are aligned with one another. As shown, the partitioned resonant cells 600 may include a third partitioned resonant cell 1404 aligned with a fourth partitioned resonant cell 1406. By way of example, the partitioned resonant cells 600 may be aligned in rows or columns.

In some embodiments, as shown, for example, in FIG. 14C, an array of resonant cells 206 may include a first plurality of partitioned resonant cells 1408 that are staggered or offset from a second plurality of partitioned resonant cells 1410. The first plurality of partitioned resonant cells 1408 may follow an irregular path, and/or the second plurality of partitioned resonant cells 1410 may follow an irregular path.

Referring now to FIGS. 15A-15D, side cross-sectional views of exemplary arrays of resonant cells 206 are shown. As shown, an array of resonant cells 206 may include partitioned resonant cells 600 aligned with one another in the z-direction (e.g., FIG. 15A) and/or partitioned resonant cells 600 staggered relative to one another in the z-direction (e.g., FIG. 15B). In some embodiments, the partitioned resonant cells 600 shown in FIGS. 15A-15D may include apertures 404, including partition-apertures 616 and/or wall-apertures 1000. When at least partially aligned in the z-direction, the partitions 402 and cell walls 300 may be integrally formed with one another, such as with interconnected contours. Such z-directional alignment may allow for uninterrupted contour paths across adjacent partitions 402 and/or across adjacent cell walls 300, which may provide for sufficient integration between adjacent cell walls 300, between cell walls 300 and partitions 402, and/or between adjacent partitions 402. Additionally, such alignment may allow for decreased manufacturing time by reducing transition times between separated contour paths, as well as improved integration between cell walls and partitions.

Figure 15A:
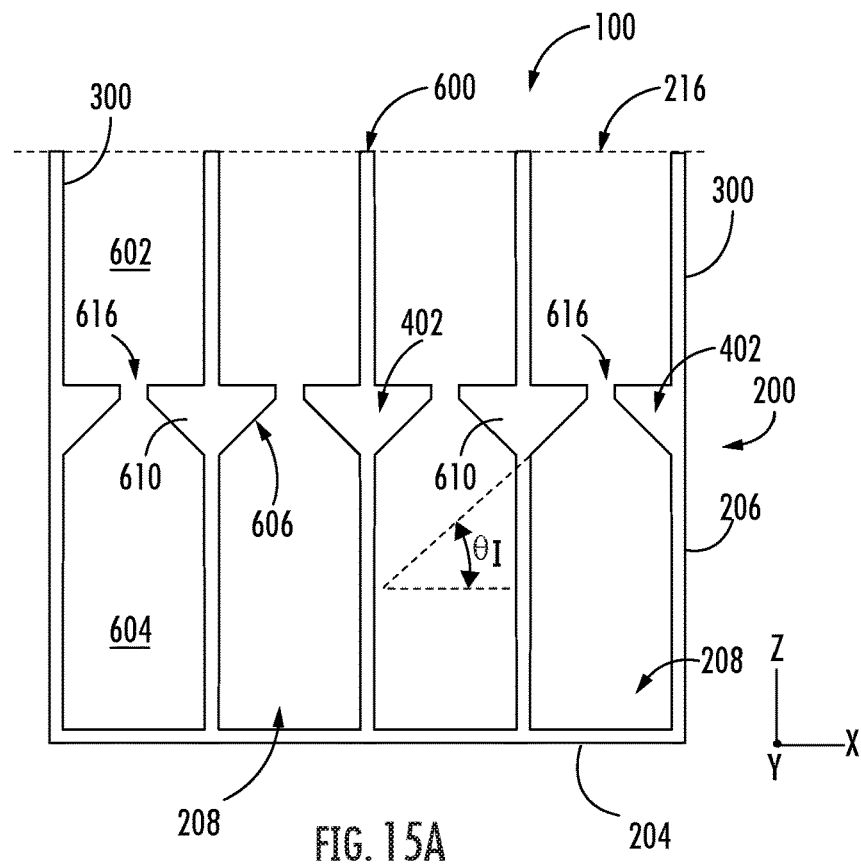
FIGS. 15A-15D schematically depict side cross sectional views of exemplary arrays of resonant cells.
Figure 15B:
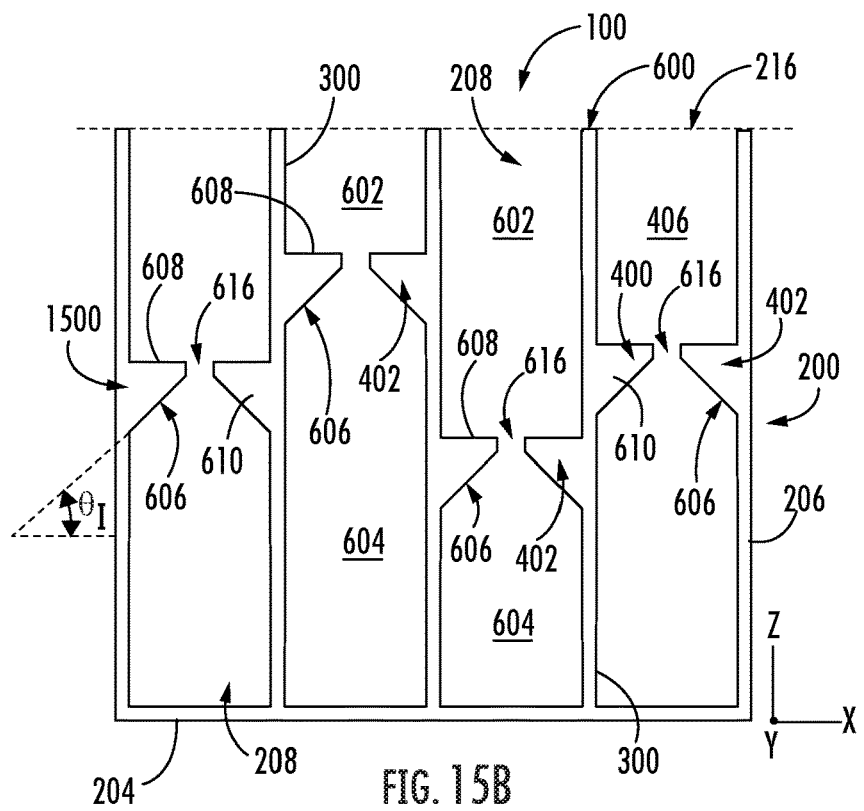

The z-directional location of a partition 402 may be selected, for example, to tune the corresponding resonant space to a desired resonant frequency. As shown in FIG. 15A, a plurality of partitioned resonant cells 600 may have partitions 402 located at least in part at a common z-directional position, such that the plurality of partitioned resonant cells 600 may be tuned to a common resonant frequency. Additionally, or in the alternative, as shown in FIG. 15B, a plurality of partitioned resonant cells 600 may have partitions 402 respectively located at a plurality of different z-directional positions. For example, an array of resonant cells 206 may include a first partitioned resonant cell 600 with a partition 402 located at a first z-directional position, and a second partitioned resonant cell 600 with a partition 402 located at a second z-directional position. The first partitioned resonant cell 600 may be tuned to a first resonant frequency, and the second partitioned resonant cell 600 may be tuned to a second resonant frequency. For example, the resonant frequency of the first partitioned resonant cell 600 and/or the resonant frequency of the second partitioned resonant cell 600, may be tuned at least in part by selecting a z-directional location of the respective partition 402. Additionally, or in the alternative, the resonant frequency may be tuned at least in part by selectively configuring the dimensions of the respective resonant cell 206, partition 402, and/or aperture(s) 404, including by selecting a desired aperture reduction factor $\beta$. A plurality of partitioned resonant cells 600 may be tuned to a desired resonant frequency. Additionally, or in the alternative, an array of resonant cells 206 may include plurality of groups of partitioned resonant cells 600 respectively tuned to a desired resonant frequency.

Figure 15C:
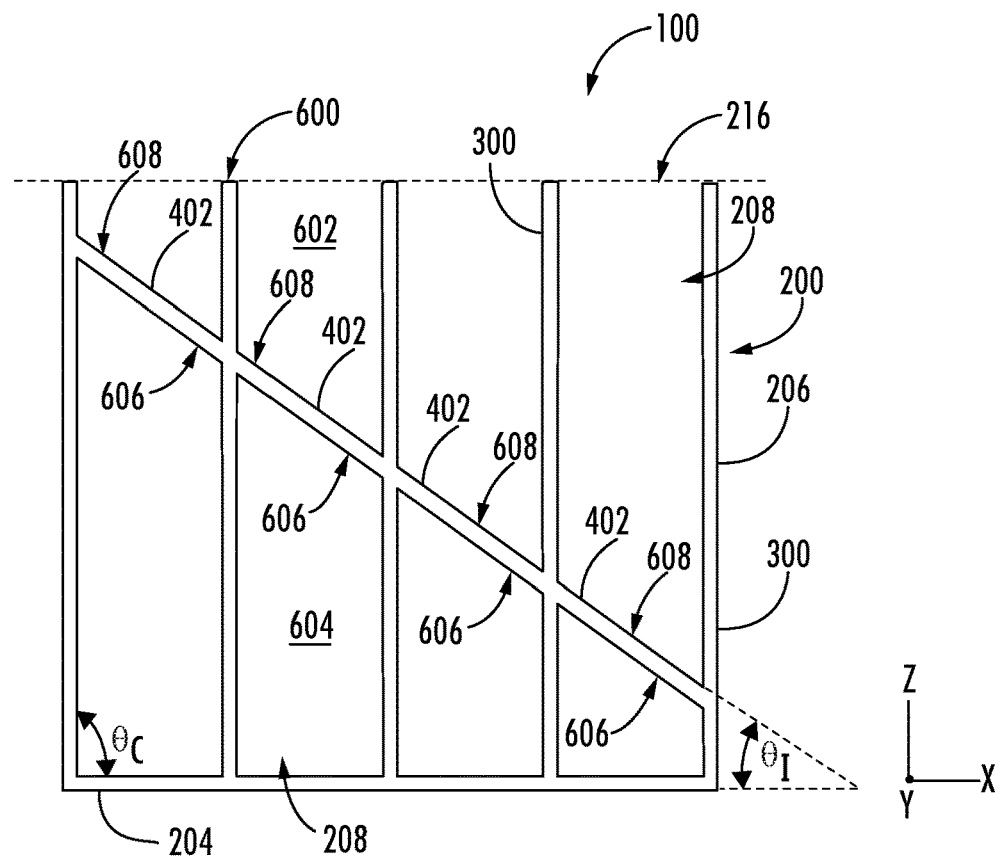
Figure 15D:
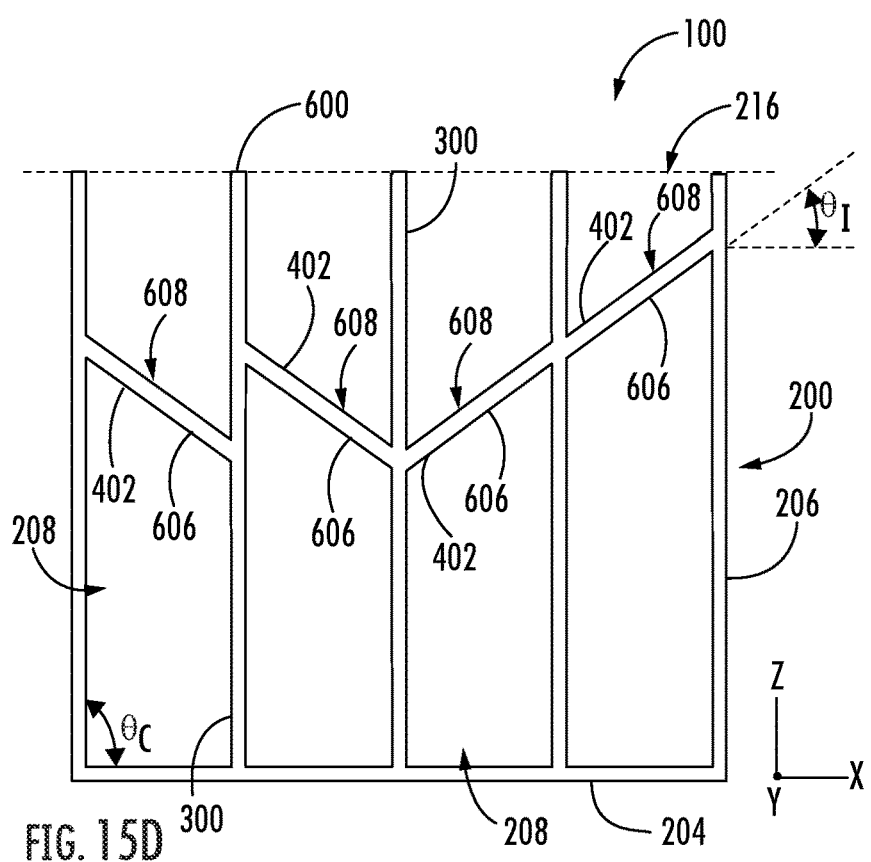

In some embodiments, as shown in FIGS. 15C and 15D, an array of resonant cells 206 may include a plurality of partitioned resonant cells 600 with respective partitions 402 that transects the corresponding resonant space 208 at an interface angle $\theta_I$. The partitions 402 may be aligned with one another, such that the partitions 402 extend across a plurality of partitioned resonant cells 600 that are adjacent to one another. The partitions 402 may follow a linear or curvilinear trajectory across the plurality of partitioned resonant cells 600. The interface angle $\theta_I$ may be selected for suitable buildability of overhanging features using an additive manufacturing technology. In some embodiments, by orienting the partitions 402 at a suitable interface angle $\theta_I$, the partitions 402 may be provided without a buttress 610, thereby saving weight and/or reducing build time. By way of comparison, FIGS. 15A and 15B show partitions 402 that include a buttress 610, providing a generally horizontal surface oriented relative to the top face 216. FIGS. 15C and 15D show partitions 402 without a buttress 610, providing a sloped partition 402 oriented obliquely relative to the top face 216 and the bottom face 218. A partition 402 that does not include a buttress 610 may be recognized, for example, when the partition 402 has a substantially uniform cross-sectional thickness as between a region proximal to one or more of the cell walls 300 and a region distal to the one or more cell walls. For example, a substantially uniform cross-sectional thickness may include dimensions that are identical, or that differ from one another by 10% or less, such as 5% or less, or such as 1% or less.

The cell walls 300 and/or the partitions 402 of an array of resonant cells 206 may have any desired thickness, which may be selected, for example, based at least in part on desired strength and/or ductility properties, and/or based at least in part on balancing strength and/or ductility properties with the corresponding weight of the array of resonant cells 206. The cell walls 300 and the partitions 402 may have a uniform or different thicknesses at various regions and/or at relative to one another. The thickness of a cell wall 300 may be determined at a mid-point of a resonant space 208 defined by the cell wall 300. The thickness of a partition 402 may be determined at a mid-point of the partition 402 between opposing cell walls, or, for a partition 402 that has one or more partition-apertures 616, at a mid-point between the partition-aperture 616 and a cell wall 300, or at a mid-point between partition-apertures 616, respectively. When a cell wall 300 or a partition 402 has a variable thickness, an average, maximum, and/or minimum thickness may be determined. In some embodiments the cell walls 300 and/or the partitions 402 may have a thickness of from 0.002 inches to 0.5 inches, such as from 0.01 inches to 0.5 inches, such as from 0.01 inches to 0.25 inches, such as from 0.01 inches to 0.1 inches, such as from 0.02 inches to 0.08 inches, such as from 0.02 to 0.14 inches. The cell walls 300 and/or the partitions 402 may have a thickness of less than 0.5 inches, such as less than 0.5 inches, such as less than 0.25 inches, such as less than 0.1 inches, such as less than 0.08 inches, such as less than 0.05 inches, such as less than 0.04 inches, such as less than 0.03 inches, such as less than 0.02 inches. The cell walls 300 and/or the partitions 402 may have a thickness of at least 0.002 inches, such as at least 0.01 inches, such as at least 0.02 inches, such as at least 0.03 inches, such as at least 0.04 inches, such as at least 0.05 inches, such as at least 0.08 inches, such as at least 0.1 inches, such as at least 0.25 inches. Such thickness values may be determined with reference to a point (e.g., a mid-point), an average, a maximum, and/or a minimum. Other thickness are also contemplated, and may vary depending on the desired embodiment of the resonant cells 206 and/or acoustic liner 100. For example, cell walls 300 and/or partitions 402 may be configured with a thickness selected based at least in part to provide a desired design intention, such as a thickness selected to provide a certain mechanical stiffness and/or resilience while minimizing weight. For example, in some embodiments, the cell walls may include regions of varying thickness and/or mechanical stiffeners, such as areas of increased thickness relative to a nominal cell wall thickness that act as beams running across the wall to provide a desired stiffness and/or resilience (e.g., with respect to resistance to vibrations, structural loads, etc.).

Figure 16:
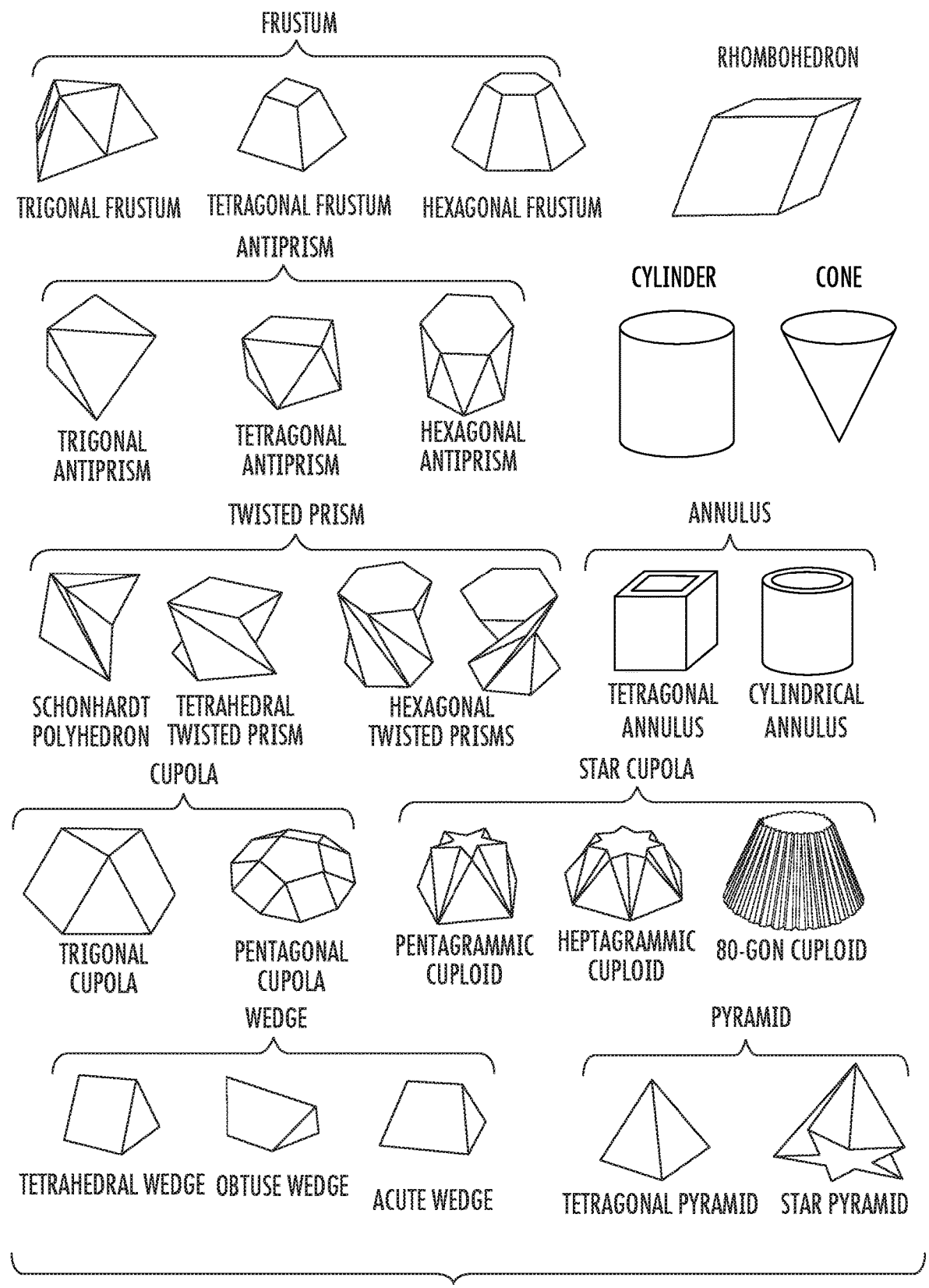
FIG. 16 schematically depicts additional exemplary polyhedral structures that may be included in an array of resonant cells.

In addition to the exemplary resonant cells 206 described above, an acoustic core 200 may include resonant cells with numerous other configurations. For example, FIG. 16 shows numerous exemplary polyhedra from which a configuration for a resonant cell and/or an array of resonant cells may be selected. An exemplary resonant cell and/or array of resonant cells may include all or a portion of any one or more of the polyhedra shown in FIG. 16. By way of example, exemplary resonant cells 206 may include a frustum, a rhombohedron, a cylinder or a cone (e.g., a cylinder or a cone may be described as an n-gonal prism where n is increasingly large, such as where n approaches 100, 1,000, 10,000, or infinity), an antiprism, a twisted prism, an annulus, a cupola (including a star cupola), a wedge, a pyramid, and combinations or portions of these. A frustum may include a trigonal frustum, a tetragonal frustum, a pentagonal frustum, a hexagonal frustum, a heptagonal frustum, an octagonal frustum, a nonagonal frustum, a decagonal frustum, a hendecagonal frustum, a dodecagonal frustum, any other frustal polyhedron, and combinations of these. A frustal polyhedron includes a frustum combined with another polyhedron, including any of the aforementioned frustum shapes combined with another polyhedron. For example, a rhombohedron may be formed from any rhombus, providing a rhombal polyhedron. As a further example, a rhombohedron may be combined with a frustum to form a rhombohedral frustum.

An antiprism includes a polyhedron composed of a polygonal top face 216, a polygonal bottom face 218, and a sequence of adjacent trigonal cell walls 300 with alternating orientations, bisected by the top face 216 and the bottom face 218. An antiprism may include a trigonal antiprism, a tetragonal antiprism, a hexagonal antiprism, an antiprismal polyhedron, and combinations of these. An antiprismal polyhedron includes an antiprism combined with another polyhedron. In some embodiments, an antiprism may include an n-sided top face 216 and an n-sided bottom face 218. Alternatively, an antiprism may include an n-sided top face 216 and a bottom face 218 with greater than or less than n-sided.

A twisted prism includes a polyhedron composed of a polygonal top face 216, a polygonal bottom face 218, and a plurality of cell walls 300 including at least some cell walls 300 bisected on a diagonal, with the top face 216 and the bottom face 218 twisted relative to one another, causing at least some adjacent cell walls 300 to be concave relative to one another. A twisted prism may include a Schönhardt polyhedron, a tetrahedral twisted prism, a hexagonal twisted prism, a twisted prismal polyhedron, and combinations of these. A twisted prism has one or more cell walls 300 bisected on an adjacent diagonal or on a subsequent diagonal.

An annulus may include a polyhedron composed of a polygonal or non-polygonal top face 216, a polygonal or non-polygonal bottom face 218, and one or more cell walls. An annulus may include a tetragonal annulus or a cylindrical annulus (e.g., an n-gonal annulus where n is increasingly large, such as where n approaches 100, 1,000, 10,000, or infinity).

A cupola includes a polyhedron composed of a polygonal top face 216, a polygonal bottom face 218, and a plurality of cell walls 300 including an alternating sequence of trigonal cell walls 300 and tetragonal cell walls. In some embodiments, a cupola has a top face 216 with twice as many edges as that of its bottom face 218, or vice versa. A cupola includes a trigonal cupola, which has a tetragonal top face 216 and a hexagonal bottom face 218, or a hexagonal top face 216 and a tetragonal bottom face 218; and a pentagonal cupola, which has a pentagonal top face 216 and a decagonal bottom face 218, or vice versa. A cupola also includes star cupola, which is a cupola in which tetragonal cell walls 300 are replaced with adjacent concave trigonal cell walls. Star cupola include a pentagrammic cuploid and a heptagrammic cuploid. A pentagrammic cuploid has a pentagonal bottom face 218 and a pentagrammic top face 216, or vice versa. A heptagrammic cuploid has a heptagonal top face 216 and a heptagrammic bottom face 218, or vice versa. As a further example, a cupola includes cuploidal configurations with numerous cell walls, including configurations which approach frustoconical as the number of cell walls 300 increases. For example, a cupola includes an octacontagon, which has eighty cell walls. A cupola also includes a cuploidal polyhedron, which includes a cupola or cuploid combined with another polyhedron.

A wedge includes a polyhedron with a polygonal top face 216 and a plurality of polygonal cell walls 300 that converge into a line. A wedge may include a tetrahedral wedge, an obtuse wedge, an acute wedge, and a wedged polyhedron, and combinations of these. A tetrahedral wedge has two trigonal cell walls 300 and two tetragonal cell walls. The cell walls 300 are bisected by a tetragonal plane on one side and converge into a line on the other. An obtuse wedge converges into a line that is wider than the opposing tetragonal plane. An acute wedge converges into a line that is narrower than the opposing tetragonal plane. A wedged polyhedron includes a wedge combined with another polyhedron.

A pyramid includes a polyhedron with a polygonal base bisected by a plurality of trigonal cell walls 300 that converge into a point. A pyramid includes a tetragonal pyramid composed of a tetragonal face bisected by four trigonal cell walls 300 which converge into a point. A pyramid also includes a star pyramid, composed of a star polygonal base and a plurality of trigonal cell walls 300 that converge into a point. As an example, a star pyramid includes a pentagonal star pyramid.

Figure 17:
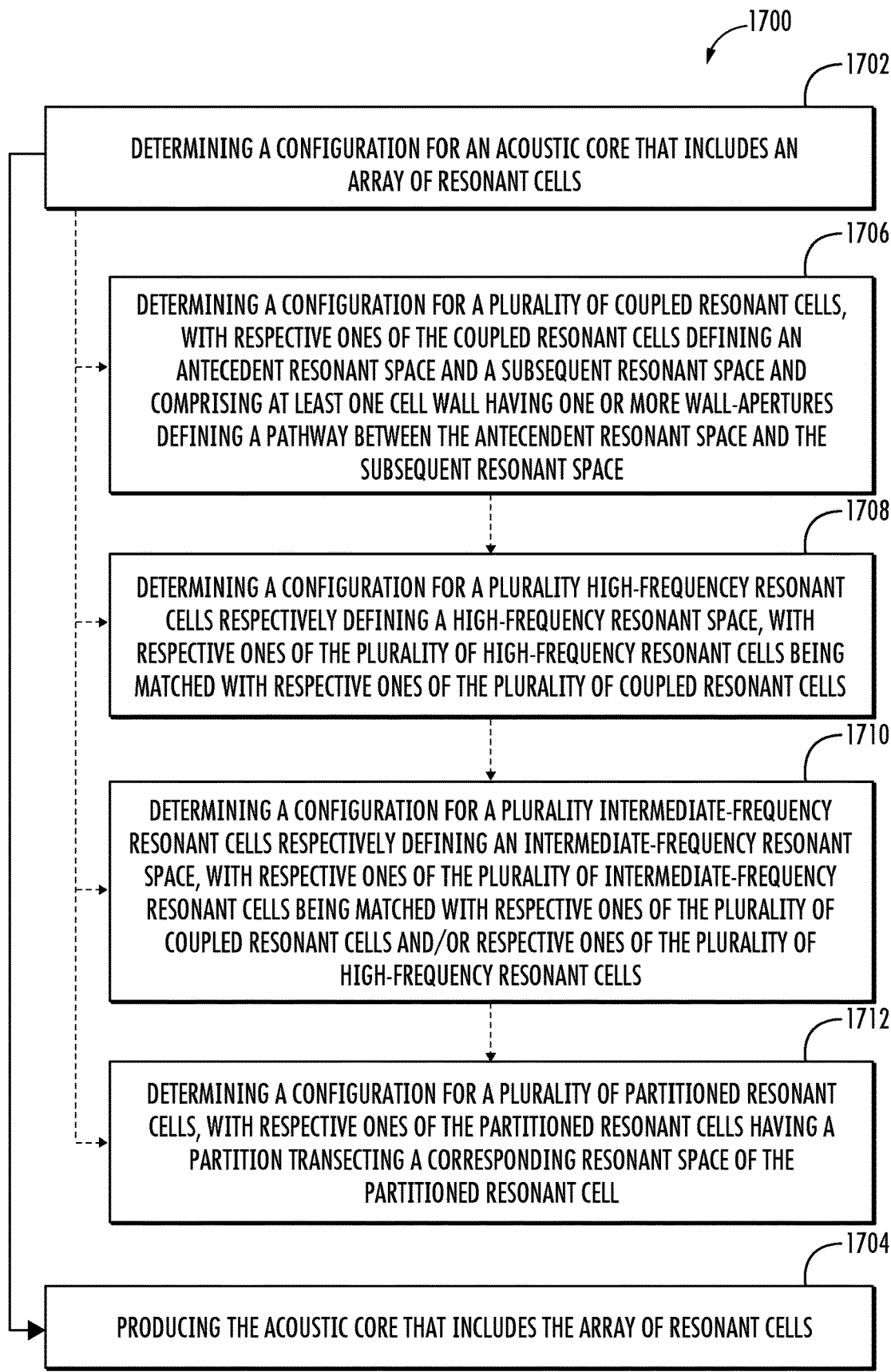
FIG. 17 shows a flow chart depicting an exemplary method of additively manufacturing an acoustic liner.

Now turning to FIG. 17, an exemplary method 1700 of making an acoustic core 200 and/or an acoustic liner will be described. An exemplary method 1700 may include, at bock 1702, determining a configuration for an acoustic core 200 that includes an array of resonant cells. An exemplary method 1700 may include, at bock 1704, producing the acoustic core 200 comprising the array of resonant cells. The acoustic liner may include an acoustic screen and/or a back sheet. Determining a configuration for the acoustic core 200 may include determining a configuration for the acoustic screen and/or the back sheet. Producing the acoustic core 200 may include producing the acoustic screen and/or the back sheet. The acoustic core 200, including the array of resonant cells, the acoustic screen, and/or the back sheet may be produced using an additive manufacturing technology. Any suitable additive manufacturing technology may be used. Respective ones of the resonant cells in the array include one or more cell walls 300 and a resonant space defined by the one or more cell walls. The array of resonant cells may be oriented obliquely relative to a normal line 214 represented by an axis R at a cell angle $\theta_C$ greater than zero degrees. The oblique orientation may improve buildability and build quality of the array of resonant cells.

In some embodiments, the exemplary method 1700 may include, at bock 1706, determining a configuration for a plurality of coupled resonant cells 1202, respective ones of the plurality of coupled resonant cells 1202 defining an antecedent resonant space 1204 and a subsequent resonant space and having at least one cell wall 300 with one or more wall-apertures defining a pathway between the antecedent resonant space 1204 and the subsequent resonant space. A cross-sectional dimension of the one or more wall-apertures defining the pathway between the antecedent resonant space 1204 and the subsequent resonant space may be less than a cross-sectional dimension of the antecedent resonant space 1204 and/or a cross-sectional dimension of the subsequent resonant space. The cross-sectional dimension of the antecedent resonant space 1204 and/or the cross-sectional dimension of the subsequent resonant space may be determined adjacent to the one or more wall-apertures.

In some embodiments, bock 1706 of an exemplary method 1700 may include determining a resonant frequency of low-frequency sound waves desired to be attenuated, and tuning the plurality of coupled resonant cells 1202 to the resonant frequency of the low-frequency sound waves desired to be attenuated, wherein the resonant length of respective ones of the plurality of coupled resonant cells 1202 exceeds the height or axial length of the respective resonant cells 1202 and/or the height of the acoustic core 200. The resonant length of respective ones of the plurality of coupled resonant cells 1202 may exceed the height or axial length of the acoustic core 200 at least in part by the cross-sectional dimension of the one or more wall-apertures defining the pathway between the antecedent resonant space 1204 and the subsequent resonant space being less than the cross-sectional dimension of the antecedent resonant space 1204 and/or the cross-sectional dimension of the subsequent resonant space.

An exemplary method 1700 may additionally or alternatively include, at bock 1708, determining a configuration for a plurality of high-frequency resonant cells 1302 respectively defining a high-frequency resonant space 1304. Respective ones of the plurality of high-frequency resonant cells 1302 may be matched with respective ones of the plurality of coupled resonant cells 1202. In an exemplary method, block 1708 may additionally or alternatively include determining a resonant frequency of high-frequency sound waves desired to be attenuated, and tuning the plurality of high-frequency resonant cells 1302 to the resonant frequency of the high-frequency sound waves desired to be attenuated. In exemplary embodiments, the resonant length of respective ones of the plurality of high-frequency resonant cells 1302 may exceed the height or axial length of the respective high-frequency resonant cell 1302.

An exemplary method 1700 may additionally or alternatively include, at bock 1710, determining a configuration for a plurality intermediate-frequency resonant cells 1210 respectively defining an intermediate-frequency resonant space. Respective ones of the plurality of intermediate-frequency resonant cells 1210 may be matched with respective ones of the plurality of coupled resonant cells 1202 and/or respective ones of the plurality of high-frequency resonant cells 1302. In an exemplary method, block 1710 may additionally or alternatively include determining a resonant frequency of intermediate-frequency sound waves desired to be attenuated, and tuning the plurality of intermediate-frequency resonant cells 1210 to the resonant frequency of the intermediate-frequency sound waves desired to be attenuated. The resonant length of respective ones of the plurality of intermediate-frequency resonant cells 1210 may exceed the height or axial length of the respective intermediate-frequency resonant cell 1210.

An exemplary method 1700 may additionally or alternatively include, at bock 1712, determining a configuration for a plurality of partitioned resonant cells, with respective ones of the plurality of partitioned resonant cells having a partition 402 transecting a corresponding resonant space of the partitioned resonant cell. In some embodiments, a subsequent resonant space of at least some of the plurality of coupled resonant cells 1202 may define a lower resonant space 604 of at least some of the plurality of partitioned resonant cells. Additionally, or in the alternative, a high-frequency resonant space 1304 of at least some of the high-frequency resonant cells 1302 may define an upper resonant space of at least some of the plurality of partitioned resonant cells. Additionally, or in the alternative, an intermediate-frequency resonant space of at least some of the intermediate-frequency resonant cells 1210 may define an upper resonant space of at least some of the plurality of partitioned resonant cells.

In an exemplary method 1700, determining the configuration for the plurality of coupled resonant cells 1202, at bock 1706, may include determining a cross-sectional dimension of the one or more wall-apertures defining the pathway between the antecedent resonant space 1204 and the subsequent resonant space based at least in part on an aperture reduction factor $\beta$. Additionally, or in the alternative, bock 1706 may include determining a cross-sectional dimension of an antecedent resonant space 1204 and/or a cross-sectional dimension of a subsequent resonant space based at least in part on an aperture reduction factor $\beta$. The aperture reduction factor $\beta$ may be determined based at least in part on a relationship between the aperture reduction factor $\beta$ and the resonant frequency of a resonant cell. The relationship between the aperture reduction factor $\beta$ and the resonant frequency may include a decreasing resonant frequency with increasing aperture reduction factor $\beta$. The relationship between the aperture reduction factor $\beta$ and the resonant frequency may include a linear region and a non-linear region (e.g., an asymptotic region). The determined aperture reduction factor $\beta$ may correspond to the non-linear region (e.g., the asymptotic region).

In some embodiments, the presently disclosed methods, including the exemplary method 1700 described with reference to FIG. 17, may be performed at least in part using a computer-implemented solution, such as software or hardware that is configured to use an acoustic core configuration module to determine a configuration for an acoustic core that includes an array of resonant cells and/or one or more resonant cell groups. In some embodiments, exemplary methods may be performed using an acoustic core manufacturing system and/or various features thereof. In some embodiments, an optimization algorithm may be utilized. The algorithm may include an attenuation model. By way of example, the attenuation model may be applied to a baseline noise spectrum in order to evaluate various design parameters for a given configuration of an acoustic core, and/or to evaluate various design parameters for resonant cells and/or resonant cell group that make up the acoustic core.

Figure 18:
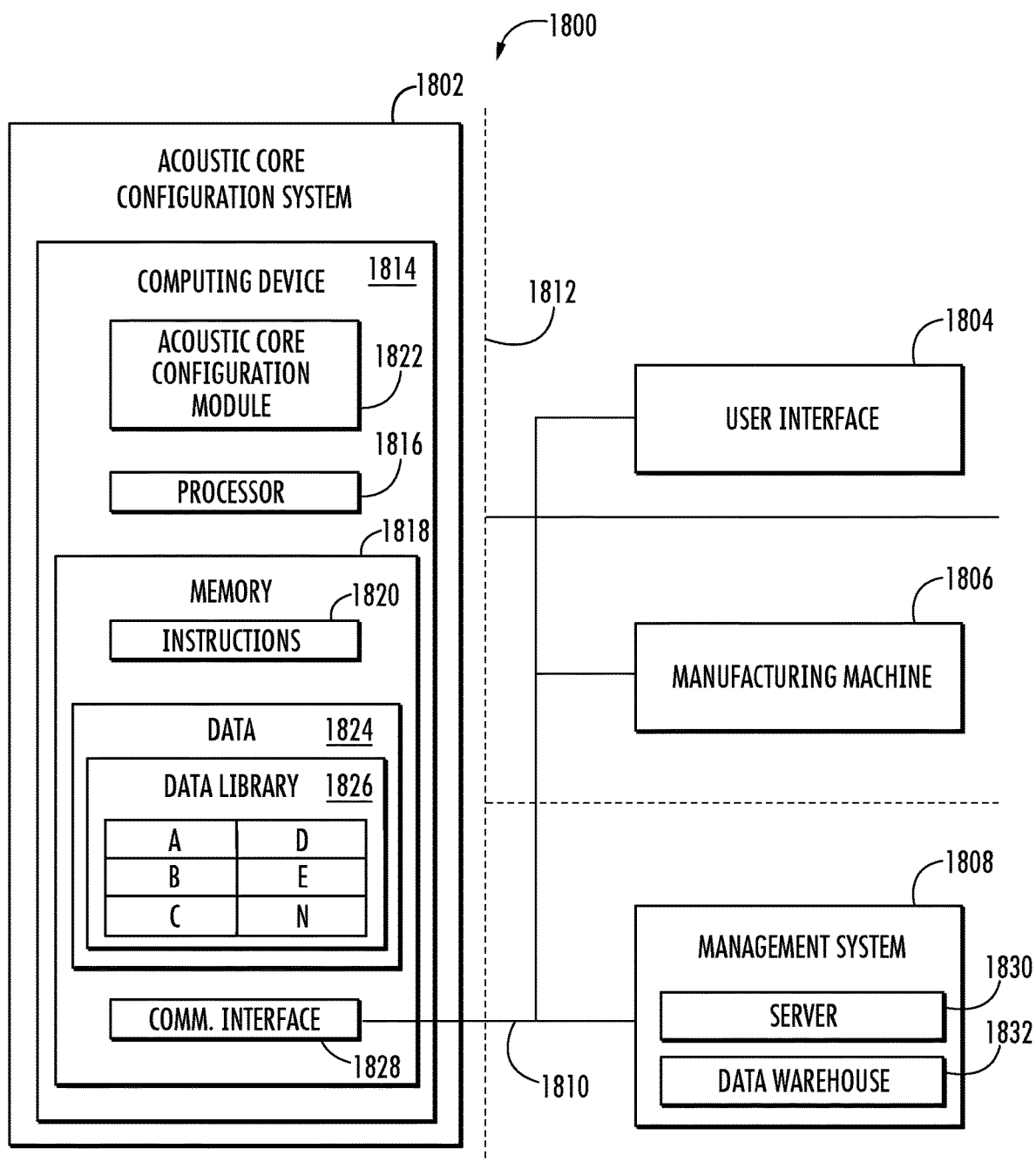
FIG. 18 schematically depicts an exemplary acoustic core manufacturing system.

Now turning to FIG. 18, and exemplary acoustic core manufacturing system 1800 will be described. An exemplary acoustic core manufacturing system 1800 may include an acoustic core configuration system 1802. An acoustic core manufacturing system 1800 may include a user interface 1804 configured to allow a user to operate the acoustic core configuration system 1802. In some embodiments, an acoustic core manufacturing system 1800 may additionally or alternatively include a manufacturing machine 1806 configured to manufacture an acoustic core according to a configuration provided by the acoustic core configuration system 1802. The acoustic core manufacturing system 1800 may additionally or alternatively include a management system 1808 configured to provide enterprise-level control for one or more elements of the core manufacturing system 1800. Various elements of the core manufacturing system 1800 may be communicatively coupled with one another via wired or wireless communication lines 1810 as part of a communication network 1812

The acoustic core configuration system 1802 may include one or more computing devices 1814, which may be located locally or remotely relative to the user interface 1804, the manufacturing machine 1806, and/or the management system 1808. For example, the one or more computing devices may be located at an acoustic core development facility, which may include a physical facility and/or a cloud-based facility. The one or more computing devices 1814 may include one or more processors 1816 and one or more memory devices 1818. The one or more processors 1816 may include any suitable processing device, such as a microprocessor, microcontroller, integrated circuit, logic device, and/or other suitable processing device. The one or more memory devices 1818 may include one or more computer-readable media, including but not limited to non-transitory computer-readable media, RAM, ROM, hard drives, flash drives, and/or other memory devices.

The one or more memory devices 1818 may store information accessible by the one or more processors 1816, including computer-executable instructions 1820 that can be executed by the one or more processors 1816. The instructions 1820 may include any set of instructions which when executed by the one or more processors 1816 cause the one or more processors 1816 to perform operations. In some embodiments, the instructions 1820 may be configured to cause the one or more processors 1816 to perform operations for which the acoustic core manufacturing system 1800, the acoustic core configuration system 1802, and/or the one or more computing devices 1814 are configured.

Exemplary operations of the acoustic core manufacturing system 1800, the acoustic core configuration system 1802, and/or the one or more computing devices 1814, may include determining a configuration for an acoustic core 200 and/or producing an acoustic core 200. The configuration for the acoustic core 200 may be determined using the acoustic core configuration system 1802. Additionally, or in the alternative, the acoustic core 200 may be produced using the manufacturing machine 1806.

The acoustic core configuration system may include one or more acoustic core configuration modules 1822. An acoustic core configuration module 1822 may be utilized by the acoustic core configuration system 1802 to determine a configuration for an acoustic core 200. Additionally, or in the alternative, an acoustic core configuration module 1822 may be utilized by a manufacturing machine 1806 to produce an acoustic core 200. The one or more acoustic core configuration modules 1822 may be implemented in hardware and/or software, including any non-transitory computer-program product and/or cloud-based solution.

An acoustic core configuration module 1822 may include proprietary modeling algorithms for determining a configuration for an acoustic core 200 and/or producing an acoustic core 200. The proprietary algorithms may include tools for determining the impact on noise attenuation for various configurations of resonant cells and/or resonant cell groups in various operating environments under given operating conditions. The proprietary algorithms may include tools for matching or grouping resonant cells with one another in an array, for example, to provide a recognizable pattern that repeats across at least a portion of the array of resonant cells, including determining configurations for resonant cells that geometrically fit with one another, and/or that are tuned to attenuate a complementary range of resonant frequencies. Additionally, or in the alternative, proprietary algorithms may include tools for grouping or aligning partitions, such as to improve buildability and mechanical integrity of the acoustic core.

An acoustic core configuration module 1822 may additionally or alternatively include proprietary modeling algorithms for determining a configuration for reduced-frequency resonant cells, including low-frequency resonant cells, high-frequency resonant cells, and/or intermediate-frequency resonant cells, for a respective range of resonant frequencies. An acoustic core configuration module 1822 may additionally or alternatively include proprietary modeling algorithms for determining a resonant length for a resonant cell and/or to compare the resonant frequency to a nominal resonant cell. For example, the acoustic core configuration module 1822 may determine a configuration for a resonant cell that provides a desired resonant length that accommodates a given acoustic core height constraint. An acoustic core configuration module 1822 may additionally or alternatively include proprietary modeling algorithms for determining configurations for coupled resonant cells, partitioned resonant cells, oblique resonant cells, and/or perpendicular resonant cells. An acoustic core configuration module 1822 may additionally or alternatively include proprietary modeling algorithms for determining configurations for top sheets 202 and/or back sheets 204 to accompany an acoustic core 200, and/or configurations for a complete acoustic liner 100. The proprietary algorithms included in an acoustic core configuration module 1822 may include finite element analysis tools, three-dimensional modeling tools, simulation modeling tools, and the like.

The memory devices 1818 may store data 1824 accessible by the one or more processors 1816. The data 1824 can include current or real-time data, past data, or a combination thereof. The data 1824 may be stored in a data library 1826. As examples, the data 1824 may include data associated with or generated by the acoustic core manufacturing system 1800, the acoustic core configuration system 1802, the user interface 1804, the manufacturing machine 1806, the management system 1808, the one or more computing devices 1814, and/or the one or more acoustic core configuration modules 1822. The data 1824 may also include other data sets, parameters, outputs, information, associated with an acoustic core manufacturing system 1800. The data 1824, including the data library 1826 and/or other data sets, parameters, outputs, information may be utilized by the one or more acoustic core configuration modules 1822 to perform operations for which they are configured.

The one or more computing devices 1814 may also include a communication interface 1828, which may be used for communications with the communication network. The communication interface 1828 may include any suitable components for interfacing with one or more network(s), including for example, transmitters, receivers, ports, controllers, antennas, and/or other suitable components. The communication interface 1828 may allow the one or more computing devices 1814 to communicate with the user interface 1804, the manufacturing machine 1806 and/or the management system 1808. The communication network 1812 may include, for example, a local area network (LAN), a wide area network (WAN), SATCOM network, VHF network, a HF network, a Wi-Fi network, a WiMAX network, a gatelink network, and/or any other suitable communication network 1812 for transmitting and/or receiving data messages. The communication lines 1810 of communication network 1812 may include a data bus or a combination of wired and/or wireless communication links.

The management system 1808 may include a server 1830 and/or a data warehouse 1832. As an example, at least a portion of the data 1824 may be stored in the data warehouse 1832, and the server 1830 may be configured to transmit data 1824 from the data warehouse 1832 to the one or more computing devices 1814, and/or to receive data 1824 from the one or more computing devices 1814 and to store the received data 1824 in the data warehouse 1832 for further purposes. The server 1830 and/or the data warehouse 1832 may be implemented as part of an acoustic core manufacturing system 1800.

Any suitable additive manufacturing technology may be utilized to manufacture various aspects of the presently disclosed acoustic liners 100. Exemplary additive manufacturing technologies include, but are not limited to: directed energy deposition (DED) systems, such as chemical vapor deposition (CVD) systems, laser metal deposition (LMD) systems, directed metal deposition (DMD) systems, laser engineered net shape (LENS) systems, electron beam additive melting (EBAM) systems, or rapid plasma deposition (RPD) systems; powder bed fusion (PBF) systems, such as direct metal laser melting (DMLM) systems, electron beam melting (EBM) systems, directed metal laser sintering (DMLS) systems, selective laser melting (SLM) systems, or selective laser sintering (SLS) systems; laminated object manufacturing (LOM) systems, such as ultrasonic additive manufacturing (UAM) systems; mater extrusion (ME) systems, such as fused deposition modeling (FDM) systems or fused filament fabrication (FFF) systems; material jetting (MJ) systems, such as smooth curvatures printing (SCP) systems, multi jet modeling (MJM) systems; and 3D printing, such as by inkjets and laserjets, including binder jetting (BJ) systems; photopolymer jetting (PJ) systems, stereolithographic (SLA) systems, and hybrid processes (HP).

Other suitable technologies that may be used to manufacture various aspects of the presently disclosed acoustic liners 100 include, without limitation, forming (e.g., rolling, stamping, joining, etc.), injection or compression molding, extruding (e.g., sheet extruding), subtractive manufacturing (e.g., machining, drilling, laser cutting, etc.), forging or casting, as well as a combination thereof, or any other manufacturing technology.

In the case of material extrusion, such as with a fused deposition modeling (FDM) system or a fused filament fabrication (FFF) system, the additive manufacturing material may be provided in the form of a filament. The filament may include a thermoplastic material, a metallic material, or a ceramic material, for example. In the case of material jetting (MJ), the additive manufacturing material may include a photosensitive material, such as a thermosetting material. The photosensitive material may be supplied in the form of a liquid, gel, or the like, and may solidify when exposed to an additive energy source such as ultraviolet light. In the case of binder jetting (BJ), the additive manufacturing material may include a binder material which is jetted into a bed of powder material. The binder material may be applied in the form of a liquid, gel, or the like. Exemplary binder materials include thermosetting materials or thermoplastic materials. Exemplary powder material for binder jetting (BJ) may include, for example, metal or metal alloys, thermoplastic materials, and ceramics. In the case of directed energy deposition (DED), the additive manufacturing material may be provided in the form of a wire, a filament, or powder. Exemplary material for directed energy deposition (DED) may include, for example, metal or metal alloys, thermoplastic materials, and ceramics.

Additive manufacturing technologies that utilize a beam of additive energy to solidify (e.g., melt, fuse, cure, etc.) an amorphous additive manufacturing material (e.g., a powder, a liquid, a gel, etc.) are sometimes referred to herein as additive energy technologies. Additive energy technologies include powder bed fusion (PBF) (e.g., selective laser sintering (SLS), direct metal laser sintering (SLM), laser melting (LM), electron beam melting (EBM), selective heat sintering (SHS), multi jet fusion (MJF), etc.), and vat photopolymerization (e.g., stereolithography apparatus (SLA), digital light processing (DLP), scan, spin, and selectively photocure (3SP), continuous liquid interface production (CLIP), etc.). In the case of powder bed fusion (PBF), the additive manufacturing material may be provided in the form of a powder. Exemplary powder material for powder bed fusion (PBF), may include, for example, metal or metal alloys, polymeric materials (e.g., thermosetting materials and/or thermoplastic materials), and ceramics. In the case of vat photopolymerization, the additive manufacturing material may include a photosensitive material. Exemplary photosensitive materials that may be utilized with additive manufacturing technologies (e.g., additive material technologies or additive energy technologies) include a formulation containing, for example, a binder, a monomer, and a photoinitiator. Exemplary binders include styrenes, methacrylates, vinyl alcohols, olefins, glycerols, and propylenes. Exemplary monomers include acrylic acids, methacrylic acids, isodecyl acrylates, and N-vinyl pyrrolidone. Exemplary photoinitiators include free radical photoinitiators such as isopropylthioxanthone, benzophenone, and 2,2-azobizisobutyronitrile, and cationic photoinitiators such as diaryliodonium salts and triarylsulfonium salts.

An acoustic core 200 may be formed of polymeric materials (e.g., a thermoplastic material, a thermoset material, or an elastomeric polymer material), synthetic fibers, metal alloys, or composite materials, and may be formed as part of an additive manufacturing technology or any other suitable process, separately or concurrently with acoustic screen 202 and/or the back sheet 204. Alternatively, an acoustic core 200 may be secured between the acoustic screen 202 and the back sheet 204 using an adhesive process. For example, a thermal, sonic, or electric welding process may be used. As another example, diffusion bonding may be used. Alternatively, an adhesive formulation such as a thermosetting or pressure sensitive adhesive or an adhesive tape may be used to secure the acoustic core 200 in position. Additionally, acoustic cores 200 may be formed from any other suitable technology and/or material, all of which are within the scope of the present disclosure.

Exemplary polymeric materials may include thermoplastic materials, and/or thermosetting materials. Exemplary thermosetting materials include, for example, epoxies, resins, acrylics, phenolics, polyesters, polyurethanes, polyimides, polyamide-imides (PAI), polysiloxanes bismaleimides, cyanate esters, phenolics, benzoxazines, phthalonitriles. Exemplary thermoplastic materials include, for example, acrylonitrile butadiene styrene (ABS), acrylonitrile styrene acrylate (ASA), styrene acrylonitrile (SAN), polyesters, polyamide-imides (PAI), polyetherimide (PEI), polyphenylsulfone (PPSF), polycarbonate (PC), polylactic acid (PLA), high-impact polystyrene (HIPS), thermoplastic polyurethane (TPU), aliphatic polyamides (nylon), polyaryletherketone (PAEK), polyetherketoneketone (PEKK), or polyether ether ketone (PEEK), as well as combinations thereof.

Exemplary synthetic fibers include extruded polymer filaments such as polyetherimide (PEI), acrylonitrile styrene acrylate (ASA), polyether ether ketone (PEEK), polycarbonate, acrylonitrile, acrylonitrile-butadiene-styrene, aramid fiber, meta-aramid fiber, para-aramid fiber, polyethylene fiber, rayon, polyester, or nylon, as well as combinations of these.

Exemplary metal alloys include aluminum alloys, steel alloys, titanium alloys, or nickel alloys (e.g., superalloys, such as austenitic nickel-chromium-based superalloys), as well as combinations of these.

Exemplary composite materials include ceramic matrix composite (CMC) materials and/or polymer matrix composite (PMC) materials. CMC materials include a ceramic matrix material and reinforcing fibers or cloth. Exemplary ceramic matrix materials include silicon carbide (SiC) and/or carbon (C). Exemplary CMC materials include carbon-fiber-reinforced carbon (C/C), carbon-fiber-reinforced silicon carbide (C/SiC), or silicon-carbide-reinforced silicon carbide (SiC/SiC). PMC materials include a polymeric matrix material and reinforcing fibers or cloth. Exemplary PMC materials include fiber-reinforced plastics and advanced composites. Exemplary polymeric matrix materials include thermosets, such as epoxies, phenolics, polyurethanes, polyimides, bismaleimides, cyanate esters, phenolics, benzoxazines, phthalonitriles. In some embodiments, polyimides may be particularly suitable. Exemplary polyimides include phenylethynyl-terminated imide (PETI) oligomers, biphenyl dianhydride-based 2,2'-dimethylbenzidine, ultrahigh-temperature HFPE. In some embodiments, exemplary polyimides may include end caps, such as 4-phenylethynylphthalic anhydride (PEPA) and/or asymmetric oxydiphthalic anhydride (a-ODPA) end caps.

Exemplary reinforcing fibers or cloth that may be utilized in CMC or PMC materials include carbon fibers, ceramic fibers, fiberglass, graphite fibers, and aramid fibers. Exemplary reinforcing fibers include monofilaments, yarns, chopped whiskers or fibers, and/or particles. In some embodiments, ceramic fibers may be formed of materials such a silicon carbide (SiC), carbon fiber (C), sapphire, alumina silicates, and/or oxides of Si, Al, Zr, Y, as well as combinations thereof. The reinforcing fibers may additionally include inorganic fillers, such as silica, quartz, pyrophyllite, wollastonite, mica, talc, kyanite, and/or montmorillonite, as well as combinations thereof.

The present disclosure provides numerous configurations for resonant cells 206 that may be included in an acoustic core 200. It will be appreciated that numerous additional configurations are within the scope of the present disclosure. By way of example and without limitation, further aspects of the present disclosure are provided by the subject matter of the following clauses:

1. An acoustic liner, comprising: an acoustic core comprising an array of resonant cells, wherein respective ones of the resonant cells comprise one or more cell walls and a resonant space defined by the one or more cell walls, and wherein the array of resonant cells comprises: a plurality of partitioned resonant cells, respective ones of the plurality of partitioned resonant cells comprising a partition integrally formed with at least one of the corresponding one or more cell walls and transecting the corresponding resonant space with at least one surface of the partition having an interface angle that is oblique or perpendicular relative to a plane parallel to a top face and/or a bottom face of the array of resonant cells.

2. The acoustic liner of any clause herein, wherein the interface angle is from 5 degrees to 90 degrees as determined from a plane parallel to a bottom face and/or a top face of the array of resonant cells.

3. The acoustic liner of any clause herein, wherein the partition comprises at least one buttress integrally formed with at least one of the one or more cell walls.

4. The acoustic liner of any clause herein, wherein the partition transects the corresponding resonant space with a substantially uniform cross-sectional thickness.

5. The acoustic liner of any clause herein, wherein the partition comprises at least one surface having an interface angle of about zero degrees as determined from a plane parallel to a bottom face and/or a top face of the array of resonant cells.

6. The acoustic liner of any clause herein, wherein the partition transects the corresponding resonant space with a substantially uniform cross-sectional thickness, and wherein the partition has an interface angle of about 90 degrees as determined from a plane parallel to the bottom face and/or the top face.

7. The acoustic liner of any clause herein, wherein the partition corresponding to at least some of the plurality of resonant cells comprises one or more partition-apertures defining a pathway between an upper resonant space and a lower resonant space.

8. The acoustic liner of any clause herein, wherein the one or more partition-apertures defining the pathway between the upper resonant space and the lower resonant space comprises a partition-aperture array defining an array of pathways between the upper resonant space and the lower resonant space.

9. The acoustic liner of any clause herein, comprising: a plurality of oblique resonant cells, respective ones of the plurality of oblique resonant cells comprising at least one cell wall having one or more wall-apertures defining a pathway between an antecedent resonant space and a subsequent resonant space; wherein the plurality of oblique resonant cells have a cell angle of from 5 to 90 degrees as determined from a plane parallel to a bottom face and/or a top face of the array of resonant cells.

10. The acoustic liner of any clause herein, wherein the array of resonant cells comprises: a plurality of converging resonant cells and/or a plurality of diverging resonant cells.

11. The acoustic liner of any clause herein, comprising: a plurality of coupled resonant cells, respective ones of the plurality of coupled resonant cells comprising at least one cell wall having one or more wall-apertures defining a pathway between an antecedent resonant space and a subsequent resonant space.

12. The acoustic liner of any clause herein, comprising: wherein a cross-sectional dimension of the one or more wall-apertures defining the pathway between the antecedent resonant space and the subsequent resonant space is less than a cross-sectional dimension of the antecedent resonant space and/or a cross-sectional dimension of the subsequent resonant space, the cross-sectional dimension of the antecedent resonant space and/or the cross-sectional dimension of the subsequent resonant space determined adjacent to the one or more wall-apertures.

13. The acoustic liner of any clause herein, wherein the one or more wall-apertures defining the pathway between the antecedent resonant space and the subsequent resonant space comprises a partition-aperture array defining an array of pathways between the antecedent resonant space and the subsequent resonant space.

14. The acoustic liner of any clause herein, wherein the one or more wall-apertures defining the pathway between the antecedent resonant space and the subsequent resonant space are disposed proximal to the bottom face.

15. The acoustic liner of any clause herein, wherein the array of resonant cells comprises: a plurality of intermediate-frequency resonant cells, respective ones of the plurality of intermediate-frequency resonant cells situated between a corresponding at least two of the plurality of coupled resonant cells.

16. The acoustic liner of any clause herein, wherein the pathway between the antecedent resonant space and the subsequent resonant space transects a respective one of the plurality of intermediate-frequency resonant cells, the respective one of the plurality of intermediate-frequency resonant cells comprising a partition separating the pathway from the intermediate resonant space.

17. The acoustic liner of any clause herein, wherein at least some of the resonant cells have a cross-sectional area that differs from one another, the cross-sectional area determined along a plane parallel to the top face and/or the bottom face.

18. The acoustic liner of any clause herein, wherein the array of resonant cells comprises one or more cell walls aligned along a linear or curvilinear trajectory that extends across a plurality of resonant cells; and/or wherein the array of resonant cells comprises one or more partitions aligned along a linear or curvilinear trajectory that extends across a plurality of resonant cells.

19. The acoustic liner of any clause herein, comprising: an acoustic screen, the acoustic screen being at least partially integrally formed with the corresponding one or more cell walls; and/or a back sheet, the back sheet being at least partially integrally formed with the corresponding one or more cell walls.

20. The acoustic liner of any clause herein, wherein the array of resonant cells is produced using an additive manufacturing technology.

21. An acoustic liner comprising an acoustic core of any clause herein.

22. An acoustic core, comprising: an array of resonant cells, wherein respective ones of the resonant cells comprise one or more cell walls and a resonant space defined by the one or more cell walls, and wherein the array of resonant cells comprises: a plurality of coupled resonant cells, respective ones of the plurality of coupled resonant cells comprising at least one cell wall having one or more wall-apertures defining a pathway between an antecedent resonant space and a subsequent resonant space; wherein a cross-sectional dimension of the one or more wall-apertures defining the pathway between the antecedent resonant space and the subsequent resonant space is less than a cross-sectional dimension of the antecedent resonant space and/or a cross-sectional dimension of the subsequent resonant space, the cross-sectional dimension of the antecedent resonant space and/or the cross-sectional dimension of the subsequent resonant space determined adjacent to the one or more wall-apertures.

23. The acoustic core of any clause herein, wherein the one or more wall-apertures defining the pathway between the antecedent resonant space and the subsequent resonant space comprises a partition-aperture array defining an array of pathways between the antecedent resonant space and the subsequent resonant space.

24. The acoustic core of any clause herein, wherein the one or more wall-apertures defining the pathway between the antecedent resonant space and the subsequent resonant space are disposed proximal to the bottom face.

25. The acoustic core of any clause herein, wherein the array of resonant cells comprises: a plurality of intermediate-frequency resonant cells, respective ones of the plurality of intermediate-frequency resonant cells situated at least partially adjacent to and/or at least partially surrounded by at least one of the plurality of coupled resonant cells.

26. The acoustic core of any clause herein, wherein the pathway between the antecedent resonant space and the subsequent resonant space transects a respective one of the plurality of intermediate-frequency resonant cells, the respective one of the plurality of intermediate-frequency resonant cells comprising a partition separating the pathway from the intermediate resonant space.

27. The acoustic core of any clause herein, wherein the partition separating the pathway from the intermediate resonant space delineates a medial resonant space that defines at least part of the pathway between the antecedent resonant space and the subsequent resonant space.

28. The acoustic core of any clause herein, wherein the intermediate-frequency resonant cells comprise a first cell wall that converges and/or adjoins with a second cell wall.

29. The acoustic core of any clause herein, wherein the array of resonant cells comprises: a plurality of converging resonant cells and/or a plurality of diverging resonant cells.

30. The acoustic core of any clause herein, wherein array of resonant cells comprises at least some oblique resonant cells.

31. The acoustic core of any clause herein, wherein the oblique resonant cells have a cell angle of from 5 to 90 degrees as determined from a plane parallel to a bottom face and/or a top face of the array of resonant cells.

32. The acoustic core of any clause herein, comprising: a plurality of partitioned resonant cells, respective ones of the plurality of partitioned resonant cells comprising a partition transecting the corresponding resonant space, the partition being integrally formed with at least one of the corresponding one or more cell walls.

33. The acoustic core of any clause herein, wherein the partition transects the corresponding resonant space with at least one surface of the partition having an interface angle that is oblique or perpendicular relative to a plane parallel to a top face and/or a bottom face of the array of resonant cells.

34. The acoustic core of any clause herein, wherein the interface angle is from 5 degrees to 90 degrees as determined from a plane parallel to a bottom face and/or a top face of the array of resonant cells.

35. The acoustic core of any clause herein, wherein the partition comprises at least one buttress integrally formed with at least one of the one or more cell walls.

36. The acoustic core of any clause herein, wherein the partition transects the corresponding resonant space with a substantially uniform cross-sectional thickness.

37. The acoustic core of any clause herein, wherein the partition transects the corresponding resonant space with a substantially uniform cross-sectional thickness, and wherein the partition has an interface angle of about zero degrees as determined from a plane parallel to the bottom face and/or the top face.

38. The acoustic core of any clause herein, wherein the partition corresponding to at least some of the plurality of resonant cells comprises one or more partition-apertures defining a pathway between the upper resonant space and the lower resonant space.

39. The acoustic core of any clause herein, wherein at least some of the resonant cells have a cross-sectional area that differs from one another, the cross-sectional area determined along a plane parallel to the top face and/or the bottom face.

40. The acoustic core of any clause herein, wherein the array of resonant cells comprises one or more cell walls aligned along a linear or curvilinear trajectory that extends across a plurality of resonant cells; and/or wherein the array of resonant cells comprises one or more partitions aligned along a linear or curvilinear trajectory that extends across a plurality of resonant cells.

41. The acoustic core of any clause herein, wherein the array of resonant cells is produced using an additive manufacturing technology.

42. An acoustic core, comprising: an array of resonant cells, comprising: a plurality of coupled resonant cells, respective ones of the plurality of coupled resonant cells defining an antecedent resonant space and a subsequent resonant space and comprising at least one cell wall having one or more wall-apertures defining a pathway between the antecedent resonant space and the subsequent resonant space; and a plurality of high-frequency resonant cells respectively defining a high-frequency resonant space, respective ones of the plurality of high-frequency resonant cells being matched with respective ones of the plurality of coupled resonant cells.

43. The acoustic core of any clause herein, wherein a cross-sectional dimension of the one or more wall-apertures defining the pathway between the antecedent resonant space and the subsequent resonant space is less than a cross-sectional dimension of the antecedent resonant space and/or a cross-sectional dimension of the subsequent resonant space, the cross-sectional dimension of the antecedent resonant space and/or the cross-sectional dimension of the subsequent resonant space determined adjacent to the one or more wall-apertures.

44. The acoustic core of any clause herein, wherein the plurality of coupled resonant cells and/or the plurality of high-frequency resonant cells comprise a plurality of oblique resonant cells.

45. The acoustic core of any clause herein, wherein respective ones of the plurality of coupled resonant cells comprising have an aperture reduction factor of from 0.2 to less than 1.0, the aperture reduction factor relating the cross-sectional dimension of the one or more wall-apertures to the cross-sectional dimension of the antecedent resonant space and/or the cross-sectional dimension of the subsequent resonant space according to the relationship: $a=c(1-\beta)$, where $\beta$ is the aperture reduction factor, "a" is the cross-sectional dimension of the one or more wall-apertures, and "c" is the cross-sectional dimension of the antecedent resonant space and/or the cross-sectional dimension of the subsequent resonant space.

46. The acoustic core of any clause herein, comprising: a plurality of partitioned resonant cells, respective ones of the plurality of partitioned resonant cells comprising a partition transecting a corresponding resonant space of the partitioned resonant cell at an interface angle that is oblique or perpendicular relative to a plane parallel to a top face and/or a bottom face of the array of resonant cells.

47. The acoustic core of any clause herein, wherein the subsequent resonant space of at least some of the plurality of coupled resonant cells defines a lower resonant space of at least some of the plurality of partitioned resonant cells, and/or wherein at least some of the high-frequency resonant cells define an upper resonant space of at least some of the plurality of partitioned resonant cells.

48. The acoustic core of any clause herein, comprising: a plurality intermediate-frequency resonant cells respectively defining an intermediate-frequency resonant space, respective ones of the plurality of intermediate-frequency resonant cells being matched with respective ones of the plurality of coupled resonant cells and/or respective ones of the plurality of high-frequency resonant cells, wherein at least some of the intermediate-frequency resonant cells define an upper resonant space of at least some of the plurality of partitioned resonant cells.

49. A method of making an acoustic core, the method comprising: determining, with an acoustic core configuration system, a configuration for an acoustic core comprising an array of resonant cells, wherein determining the configuration for the acoustic core comprises: determining a configuration for a plurality of coupled resonant cells, respective ones of the plurality of coupled resonant cells defining an antecedent resonant space and a subsequent resonant space and comprising at least one cell wall having one or more wall-apertures defining a pathway between the antecedent resonant space and the subsequent resonant space; and determining a configuration for a plurality of high-frequency resonant cells respectively defining a high-frequency resonant space, respective ones of the plurality of high-frequency resonant cells being matched with respective ones of the plurality of coupled resonant cells.

50. The method of any clause herein, wherein a cross-sectional dimension of the one or more wall-apertures defining the pathway between the antecedent resonant space and the subsequent resonant space is less than a cross-sectional dimension of the antecedent resonant space and/or a cross-sectional dimension of the subsequent resonant space, the cross-sectional dimension of the antecedent resonant space and/or the cross-sectional dimension of the subsequent resonant space determined adjacent to the one or more wall-apertures.

51. The method of any clause herein, comprising: determining a resonant frequency of low-frequency sound waves desired to be attenuated, and tuning the plurality of coupled resonant cells to the resonant frequency of the low-frequency sound waves desired to be attenuated, wherein the resonant length of respective ones of the plurality of coupled resonant cells exceeds the height of the acoustic core; and/or determining a resonant frequency of high-frequency sound waves desired to be attenuated, and tuning the plurality of high-frequency resonant cells to the resonant frequency of the high-frequency sound waves desired to be attenuated, wherein the resonant length of respective ones of the plurality of high-frequency resonant cells exceeds the height of the respective high-frequency resonant cell.

53. The method of any clause herein, wherein the resonant length of respective ones of the plurality of coupled resonant cells exceeds the height of the acoustic core at least in part by the cross-sectional dimension of the one or more wall-apertures defining the pathway between the antecedent resonant space and the subsequent resonant space being less than the cross-sectional dimension of the antecedent resonant space and/or the cross-sectional dimension of the subsequent resonant space.

54. The method of any clause herein, wherein determining the configuration for the plurality of coupled resonant cells comprises: determining a cross-sectional dimension of the one or more wall-apertures defining the pathway between the antecedent resonant space and the subsequent resonant space of respective ones of the plurality of coupled resonant cells based at least in part on an aperture reduction factor; and/or determining a cross-sectional dimension of the antecedent resonant space and/or a cross-sectional dimension of the subsequent resonant space of respective ones of the plurality of coupled resonant cells based at least in part on the aperture reduction factor; wherein the aperture reduction factor is determined based at least in part on a relationship between the aperture reduction factor and a resonant frequency of respective ones of the plurality of coupled resonant cells.

55. The method of any clause herein, wherein determining the configuration for the plurality of coupled resonant cells comprises: determining an aperture reduction factor for respective ones of the plurality of coupled resonant cells, the aperture reduction factor determined based at least in part on a relationship between the aperture reduction factor and a resonant frequency of respective ones of the plurality of coupled resonant cells.

56. The method of any clause herein, wherein the relationship between the aperture reduction factor and a resonant frequency of respective ones of the plurality of coupled resonant cells comprises a decreasing resonant frequency with increasing aperture reduction factor.

57. The method of any clause herein, wherein the determined aperture reduction factor is from 0.5 to less than 1.0.

58. The method of any clause herein, wherein the determined aperture reduction factor relates the cross-sectional dimension of the one or more wall-apertures to the cross-sectional dimension of the antecedent resonant space and/or the cross-sectional dimension of the subsequent resonant space according to the relationship: $a=c(1-\beta)$, where $\beta$ is the aperture reduction factor, "a" is the cross-sectional dimension of the one or more wall-apertures, and "c" is the cross-sectional dimension of the antecedent resonant space and/or the cross-sectional dimension of the subsequent resonant space.

59. The method of any clause herein, wherein the relationship between the aperture reduction factor and a resonant frequency of respective ones of the plurality of coupled resonant cells comprises a non-linear region, and wherein the determined aperture reduction factor corresponds to the non-linear region.

60. The method of any clause herein, wherein determining the configuration for the acoustic core comprises: determining a configuration for a plurality of partitioned resonant cells, respective ones of the plurality of partitioned resonant cells comprising a partition transecting a corresponding resonant space of the partitioned resonant cell with at least one surface of the partition having an interface angle that is oblique or perpendicular relative to a plane parallel to a top face and/or a bottom face of the array of resonant cells.

61. The method of any clause herein, wherein the subsequent resonant space of at least some of the plurality of coupled resonant cells defines a lower resonant space of at least some of the plurality of partitioned resonant cells; and/or wherein the high-frequency resonant space of at least some of the high-frequency resonant cells defines an upper resonant space of at least some of the plurality of partitioned resonant cells.

62. The method of any clause herein, wherein the plurality of coupled resonant cells comprise a plurality of oblique resonant cells, wherein the plurality of oblique resonant cells have a cell angle of from 5 to 90 degrees as determined from a plane parallel to a bottom face and/or a top face of the array of resonant cells.

63. The method of any clause herein, wherein the array of resonant cells comprises: a plurality of converging resonant cells and/or a plurality of diverging resonant cells.

64. The method of any clause herein, wherein respective ones of the plurality of high-frequency resonant cells being matched with respective ones of the plurality of coupled resonant cells comprises respective ones of the plurality of high-frequency resonant cells being geometrically fit with respective ones of the plurality of coupled resonant cells.

65. The method of any clause herein, wherein determining the configuration for the acoustic core comprises: determining a configuration for a plurality intermediate-frequency resonant cells respectively defining an intermediate-frequency resonant space, respective ones of the plurality of intermediate-frequency resonant cells being matched with respective ones of the plurality of coupled resonant cells and/or respective ones of the plurality of high-frequency resonant cells.

66. The method of any clause herein, comprising: determining a resonant frequency of intermediate-frequency sound waves desired to be attenuated, and tuning the plurality of intermediate-frequency resonant cells to the resonant frequency of the intermediate-frequency sound waves desired to be attenuated, wherein the resonant length of respective ones of the plurality of intermediate-frequency resonant cells exceeds the height of the respective intermediate-frequency resonant cell.

67. The method of any clause herein, wherein the intermediate-frequency resonant space of at least some of the intermediate-frequency resonant cells defines an upper resonant space of at least some of the plurality of partitioned resonant cells.

68. The method of any clause herein, wherein the array of resonant cells comprises one or more cell walls aligned along a linear or curvilinear trajectory that extends across a plurality of resonant cells; and/or wherein the array of resonant cells comprises one or more partitions aligned along a linear or curvilinear trajectory that extends across a plurality of resonant cells.

69. The method of any clause herein, comprising: producing the acoustic core using an additive manufacturing technology.

70. The method of any clause herein, wherein the method is configured to make the acoustic core of any clause herein.

71. The method of any clause herein, wherein the method is configured to make the acoustic liner of any clause herein.

72. An acoustic core configuration system, wherein the acoustic core configuration system is configured to determine a configuration for an acoustic core in accordance with the method of any clause herein, wherein the acoustic core comprises the acoustic core of any clause herein.

73. A computer-readable medium comprising computer-executable instructions, which when executed by a processor, cause the processor to perform a method comprising: determining a configuration for an acoustic core comprising an array of resonant cells, wherein determining the configuration for the acoustic core comprises: determining a configuration for a plurality of coupled resonant cells, respective ones of the plurality of coupled resonant cells defining an antecedent resonant space and a subsequent resonant space and comprising at least one cell wall having one or more wall-apertures defining a pathway between the antecedent resonant space and the subsequent resonant space; and determining a configuration for a plurality of high-frequency resonant cells respectively defining a high-frequency resonant space, respective ones of the plurality of high-frequency resonant cells being matched with respective ones of the plurality of coupled resonant cells.

74. The computer-readable medium of any clause herein, wherein the computer-readable medium comprises computer-executable instructions, which when executed by a processor, cause the processor to perform the method of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An acoustic core, comprising:
an array of resonant cells, the array of resonant cells comprising:
a plurality of coupled resonant cells, respective ones of the plurality of coupled resonant cells defining an antecedent resonant space and a subsequent resonant space and comprising at least one cell wall having one or more wall-apertures defining a pathway between the antecedent resonant space and the subsequent resonant space; and
a plurality of high-frequency resonant cells respectively defining a high-frequency resonant space, respective ones of the plurality of high-frequency resonant cells being matched with respective ones of the plurality of coupled resonant cells.

2. The acoustic core of claim 1, wherein a cross-sectional dimension of the one or more wall-apertures defining the pathway between the antecedent resonant space and the subsequent resonant space is less than a cross-sectional dimension of the antecedent resonant space and/or a cross-sectional dimension of the subsequent resonant space, the cross-sectional dimension of the antecedent resonant space and/or the cross-sectional dimension of the subsequent resonant space determined adjacent to the one or more wall-apertures.

3. The acoustic core of claim 1, wherein the plurality of coupled resonant cells and/or the plurality of high-frequency resonant cells comprise a plurality of oblique resonant cells.

4. The acoustic core of claim 1, wherein respective ones of the plurality of coupled resonant cells have an aperture reduction factor of from 0.2 to less than 1.0, the aperture reduction factor relating the cross-sectional dimension of the one or more wall-apertures to the cross-sectional dimension of the antecedent resonant space and/or the cross-sectional dimension of the subsequent resonant space according to the relationship: $a=c(1-\beta)$, where $\beta$ is the aperture reduction factor, "a" is the cross-sectional dimension of the one or more wall-apertures, and "c" is the cross-sectional dimension of the antecedent resonant space and/or the cross-sectional dimension of the subsequent resonant space.

5. The acoustic core of claim 1, comprising:
a plurality of partitioned resonant cells, respective ones of the plurality of partitioned resonant cells comprising a partition integrally formed with at least one of the corresponding one or more cell walls and transecting the corresponding resonant space with at least one surface of the partition having an interface angle that is oblique or perpendicular relative to a plane parallel to a top face and/or a bottom face of the array of resonant cells.

6. The acoustic core of claim 5, wherein the subsequent resonant space of at least some of the plurality of coupled resonant cells defines a lower resonant space of at least some of the plurality of partitioned resonant cells, and/or wherein at least some of the high-frequency resonant cells define an upper resonant space of at least some of the plurality of partitioned resonant cells.

7. The acoustic core of claim 5, comprising, a plurality of intermediate-frequency resonant cells respectively defining an intermediate-frequency resonant space, respective ones of the plurality of intermediate-frequency resonant cells being matched with respective ones of the plurality of coupled resonant cells and/or respective ones of the plurality of high-frequency resonant cells, wherein at least some of the plurality of intermediate-frequency resonant cells define an upper resonant space of at least some of the plurality of partitioned resonant cells.

8. The acoustic core of claim 1, comprising:
a plurality of partitioned resonant cells, respective ones of the plurality of partitioned resonant cells comprising a partition integrally formed with at least one of the one or more cell walls and oriented perpendicular to the at least one of the one or more cell walls, wherein the at least one of the one or more cell walls is oriented obliquely relative to a longitudinal axis of the corresponding antecedent resonant space and/or the corresponding subsequent resonant space.

9. An acoustic core, comprising:
an array of resonant cells, wherein respective ones of the array of resonant cells comprise one or more cell walls and a resonant space defined by the one or more cell walls, and wherein the array of resonant cells comprises:
a plurality of partitioned resonant cells, respective ones of the plurality of partitioned resonant cells comprising a partition integrally formed with at least one of the corresponding one or more cell walls and transecting the corresponding resonant space with at least one surface of the partition having an interface angle that is oblique or perpendicular relative to a plane parallel to a top face and/or a bottom face of the array of resonant cells.

10. The acoustic core of claim 9, wherein the interface angle is from 5 degrees to 90 degrees as determined from a plane parallel to a bottom face and/or a top face of the array of resonant cells.

11. The acoustic core of claim 9, wherein the partition comprises at least one buttress integrally formed with at least one of the one or more cell walls.

12. The acoustic core of claim 9, wherein the partition transects the corresponding resonant space with a substantially uniform cross-sectional thickness.

13. The acoustic core of claim 9, wherein the partition is oriented perpendicular to the at least one of the one or more cell walls, the at least one of the one or more cell walls oriented obliquely relative to a longitudinal axis of the resonant space defined by the one or more cell walls.

14. The acoustic core of claim 9, comprising:
a plurality of coupled resonant cells, respective ones of the plurality of coupled resonant cells comprising at least one cell wall having one or more wall-apertures defining a pathway between an antecedent resonant space and a subsequent resonant space.

15. The acoustic core of claim 14, wherein the one or more wall-apertures defining the pathway between the antecedent resonant space and the subsequent resonant space are disposed proximal to the bottom face; and wherein the array of resonant cells comprises a plurality of high-frequency resonant cells respectively defining a high-frequency resonant space, respective ones of the plurality of high-frequency resonant cells being matched with respective ones of the plurality of coupled resonant cells.

16. An acoustic core, comprising:
an array of resonant cells, wherein respective ones of the array of resonant cells comprise one or more cell walls and a resonant space defined by the one or more cell walls, and wherein the array of resonant cells comprises:
a plurality of coupled resonant cells, respective ones of the plurality of coupled resonant cells comprising at least one cell wall having one or more wall-apertures defining a pathway between an antecedent resonant space and a subsequent resonant space; and
wherein a cross-sectional dimension of the one or more wall-apertures defining the pathway between the antecedent resonant space and the subsequent resonant space is less than a cross-sectional dimension of the antecedent resonant space and/or a cross-sectional dimension of the subsequent resonant space, the cross-sectional dimension of the antecedent resonant space and/or the cross-sectional dimension of the subsequent resonant space determined adjacent to the one or more wall-apertures.

17. The acoustic core of claim 16, wherein the one or more wall-apertures defining the pathway between the antecedent resonant space and the subsequent resonant space comprises a partition-aperture array defining an array of pathways between the antecedent resonant space and the subsequent resonant space.

18. The acoustic core of claim 16, wherein the one or more wall-apertures defining the pathway between the antecedent resonant space and the subsequent resonant space are disposed proximal to a bottom face; and
wherein the array of resonant cells comprises a plurality of high-frequency resonant cells respectively defining a high-frequency resonant space, respective ones of the plurality of high-frequency resonant cells being matched with respective ones of the plurality of coupled resonant cells.

19. The acoustic core of claim 16, wherein the array of resonant cells comprises:
a plurality of intermediate-frequency resonant cells, respective ones of the plurality of intermediate-frequency resonant cells situated at least partially adjacent to and/or at least partially surrounded by at least one of the plurality of coupled resonant cells.

20. The acoustic core of claim 19, wherein the pathway between the antecedent resonant space and the subsequent resonant space transects a respective one of the plurality of intermediate-frequency resonant cells, the respective one of the plurality of intermediate-frequency resonant cells comprising a partition separating the pathway from intermediate resonant space.

* * * * *